United States Patent
Yamaoka et al.

(10) Patent No.: US 9,127,367 B2
(45) Date of Patent: Sep. 8, 2015

(54) PRECOATED METAL SHEET EXCELLENT IN CONDUCTIVITY AND CORROSION RESISTANCE

(75) Inventors: Ikuro Yamaoka, Tokyo (JP); Atsushi Morishita, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/819,925

(22) PCT Filed: Sep. 1, 2011

(86) PCT No.: PCT/JP2011/070414
§ 371 (c)(1),
(2), (4) Date: Feb. 28, 2013

(87) PCT Pub. No.: WO2012/029988
PCT Pub. Date: Mar. 8, 2012

(65) Prior Publication Data
US 2013/0161062 A1 Jun. 27, 2013

(30) Foreign Application Priority Data
Sep. 2, 2010 (JP) ................................. 2010-196902

(51) Int. Cl.
*C09D 5/08* (2006.01)
*H01B 7/28* (2006.01)
(Continued)

(52) U.S. Cl.
CPC ............ *C23C 30/00* (2013.01); *C08G 18/0819* (2013.01); *C08G 18/12* (2013.01); *C08G 18/423* (2013.01); *C08G 18/4277* (2013.01);
(Continued)

(58) Field of Classification Search
None
See application file for complete search history.

(56) References Cited

U.S. PATENT DOCUMENTS 4,079,163 A * 3/1978 Tanaka et al. ................. 428/328
6,465,114 B1 * 10/2002 Honda et al. ................. 428/659
(Continued)

FOREIGN PATENT DOCUMENTS

EP  1246873 B1  1/2005
JP  55-17508 A  2/1980
(Continued)

OTHER PUBLICATIONS

International Search Report issued in PCT/JP2011/070414, mailed on Dec. 13, 2011.
Extended European Search Report, dated Sep. 5, 2014, for European Application No. 11821998.9.

*Primary Examiner* — Harold Pyon
*Assistant Examiner* — Katie L Hammer
(74) *Attorney, Agent, or Firm* — Birch, Stewart, Kolasch & Birch, LLP

(57) ABSTRACT

A precoated metal sheet excellent in conductivity and corrosion resistance and able to be inexpensively produced is provided. The present invention is a conductive, corrosion resistant precoated metal sheet comprising a metal sheet on at least one surface of which is formed a coating film (α) which contains an organic resin (A) and non-oxide ceramic particles (B) with a 25° C. electrical resistivity of $0.1 \times 10^{-6}$ to $185 \times 10^{-6}$ Ωcm selected from borides, carbides, nitrides, and silicides, a volume ratio of the organic resin (A) and the non-oxide ceramic particles (B) in the coating film (a) at 25° C. being 90:10 to 99.9:0.1, the organic resin (A) including a derivative (A2) of a resin (A1) which includes at least one type of functional group selected from a carboxyl group and sulfonic acid group in a structure of the resin (A1).

16 Claims, 1 Drawing Sheet

(51) Int. Cl.
*C23C 30/00* (2006.01)
*C09D 5/24* (2006.01)
*C09D 167/02* (2006.01)
*C08G 18/66* (2006.01)
*C08G 18/08* (2006.01)
*C08G 18/12* (2006.01)
*C09D 175/06* (2006.01)
*C08G 18/42* (2006.01)
*C08G 18/46* (2006.01)
*C23C 2/26* (2006.01)
*C23C 26/00* (2006.01)
*C08L 61/28* (2006.01)

(52) U.S. Cl.
CPC .......... *C08G18/4676* (2013.01); *C08G 18/664* (2013.01); *C09D 5/084* (2013.01); *C09D 5/24* (2013.01); *C09D 167/02* (2013.01); *C09D 175/06* (2013.01); *C23C 2/26* (2013.01); *C23C 26/00* (2013.01); *H01B 7/2806* (2013.01); *C08L 61/28* (2013.01)

(56) References Cited

U.S. PATENT DOCUMENTS

| | | | |
|---|---|---|---|
| 6,905,041 | B1 | 6/2005 | Taketsu et al. |
| 7,699,916 | B1 | 4/2010 | Carter et al. |
| 2003/0235711 | A1 | 12/2003 | Seido et al. |
| 2005/0137291 | A1* | 6/2005 | Schneider ............ 523/220 |
| 2005/0271881 | A1 | 12/2005 | Hong |
| 2008/0305341 | A1* | 12/2008 | Plieth et al. ............ 428/419 |
| 2010/0136256 | A1 | 6/2010 | Hwang et al. |

FOREIGN PATENT DOCUMENTS

| | | | |
|---|---|---|---|
| JP | 7-313930 A | 12/1995 |
| JP | 8-267656 A | 10/1996 |
| JP | 9-276788 A | 10/1997 |
| JP | 10-128906 A | 5/1998 |
| JP | 11-138095 A | 5/1999 |
| JP | 2000-212764 A | 8/2000 |
| JP | 2003-268567 A | 9/2003 |
| JP | 2004-17455 A | 1/2004 |
| JP | 2005-288730 A | 10/2005 |

* cited by examiner

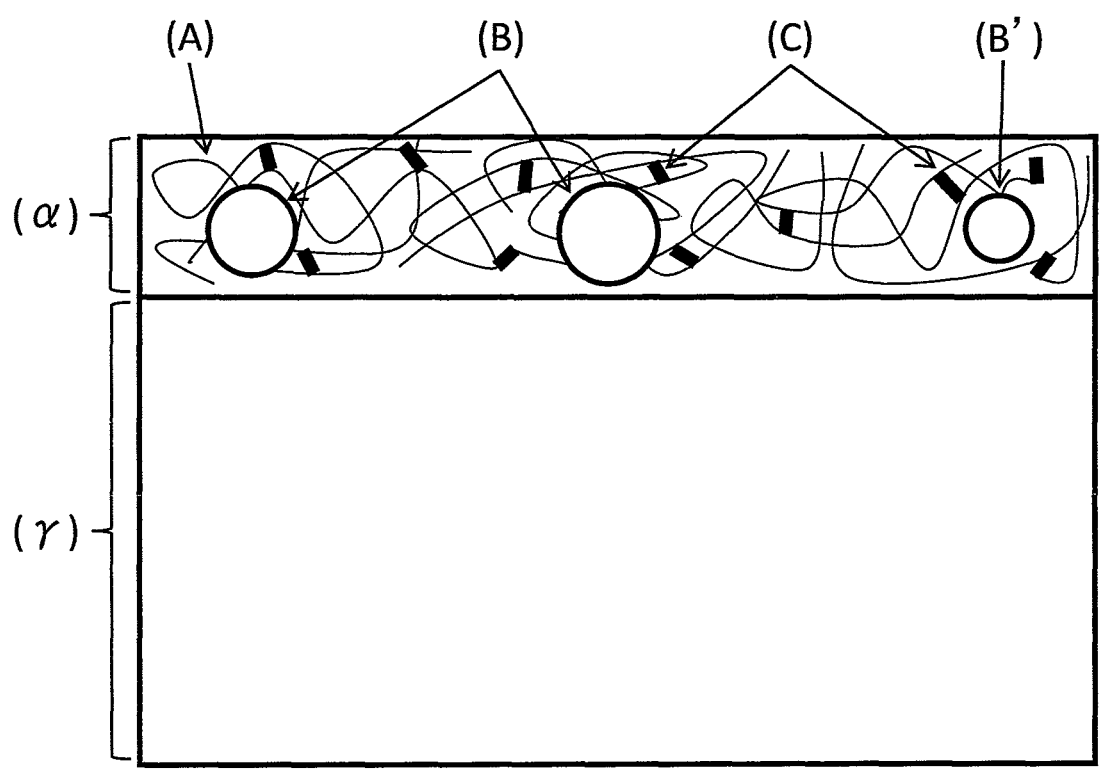

PRECOATED METAL SHEET EXCELLENT IN CONDUCTIVITY AND CORROSION RESISTANCE

TECHNICAL FIELD

The present invention relates to a precoated metal sheet which is covered by a film which contains an organic resin and particles of a non-oxide ceramic with an electrical resistivity in a specific range at least at part of its surface and which is therefore excellent in conductivity and corrosion resistance.

BACKGROUND ART

Below, the background art of the present invention will be explained.

The post-coated metal sheet which is coated after being shaped for use in home electrical appliances, building materials, automobiles, etc. is being replaced by precoated metal sheet which is covered with a colored organic film. A precoated metal sheet, in most cases, has excellent corrosion resistance and workability and coating film adhesion due to the composite effects of the metal itself (in the case of a plated metal sheet, the plating film) and the chemical conversion at the layer above it and, furthermore, the primer film at the layer above that and, furthermore, in many cases is provided with a colored organic film at its top surface, so the coating operation after working can be eliminated and a high productivity and beautiful appearance can be obtained.

When press-forming a precoated metal sheet, the film layer which is covered over the metal sheet is also shaped, so the film is also required to have workability. For this reason, a film layer based on a resin is the general practice. The covering film of a precoated metal sheet is usually insulating. However, in precoated metal sheets, a need for electroweldability at the time of assembly of parts and a need for groundability, electromagnetic shieldability, and other high conductivity when used for home electrical appliances or the housings for OA equipment have arisen. In response to these demands for imparting conductivity to films, the art has been proposed of covering a metal sheet with a film which contains conductive particles to thereby impart conductivity.

Among these, as art which uses conductive metal particles, for example, PLT 1 proposes the art of covering an aluminum or aluminum alloy substrate surface with a resin film which contains aluminum or aluminum alloy powder through a chromate film which strengthens the corrosion resistance of the substrate or the adhesion with the substrate so as to thereby obtain a precoated aluminum or aluminum alloy material for home electric appliance products or chassis parts which realizes both excellent corrosion resistance and conductivity. The amount of the aluminum or aluminum alloy powder which is used for the resin film is described as being from 10 to 50 parts by weight with respect to 100 parts by weight of the resin.

PLT 2 proposes the art of a galvannealed steel sheet which has a resin-based conductive coating film which contains zinc powder. It is stated that inclusion of zinc powder in the coating film in 30 to 90 mass % is preferable and that a coating film thickness of 2 to 30 μm is preferable.

PLT 3 proposes the art of using a resin film which contains 2 to 50 mass % of a metal powder, 1 to 50 mass % of water, and 0.5 to 30 mass % of a surfactant as essential ingredients and has a thickness of 5 μm or less so as to cover a metal sheet to raise its conductivity. It is stated that as the metal powder, nickel powder is suitable and as the coating for coating use, a water-based one is preferable.

Further, among the art for imparting conductivity to a film, as art which enables use of conductive particles other than metal particles, for example, PLT 4 discloses the art of an organic composite plated steel sheet which has, on a rust-prevention layer mainly comprised of a chrome compound, an organic resin coating of 0.5 to 20 μm thickness containing 3 to 59 vol % of a conductive powder. PLT 5 proposes the art of an organic coated plated steel sheet which has a resin-based film which contains 3 to 59 vol % of a conductive material. As the conductive material, various metals and their alloys, iron phosphate or ferrosilicon or other iron compounds, etc. may be mentioned. PLT 6 discloses the art of a conductive precoated metal sheet which has a 0.5 to 3 μm thick coating film which contains any conductive metal oxide. As the conductive metal oxide, it is stated that one which includes zinc oxide of a particle size of 5.0 μm or less and an average 2 μm in 40 to 50 parts by mass with respect to 100 parts by mass of resin is desirable. PLT 7 proposes as a metal surface coating agent which enables the formation of a conductive, weldable corrosion resistant film after curing at the metal surface, a water-based coating agent which contains a specific organic binder in 10 to 30 mass % and a conductive material powder in 30 to 60 mass %. As examples of conductive material powder which is suitable for preparation of the present coating agent, zinc, aluminum, graphite, carbon black, molybdenum sulfide, and iron phosphate may be mentioned. PLT 8 proposes the art of automobile-use organic precoated steel sheet which achieves both excellent corrosion resistance and weldability by covering the surface of zinc-based plate steel sheet or aluminum-based plated steel sheet with a first layer film which strengthens the adhesion with the plating and, through that, a resin-based second layer film which includes a rust-proofing additive and a conductive pigment. The conductive pigment is contained in the film in an amount of 5 to 70 vol %. The film thickness is 1 to 30 μm. As a suitable conductive pigment, a metal, alloy, conductive carbon, iron phosphate, carbide, and semiconductor oxide may be illustrated.

Further, as art which uses conductive ceramic particles among conductive particles other than metal particles, for example, PLT 9 proposes the art of a conductive material-coated corrosion resistant metal material which is excellent in corrosion resistance and conductivity comprised of core metal which is covered by a clad layer comprised of a corrosion resistant metal and, furthermore, is covered over that by a surface treatment layer comprised of at least one conductive material selected from a carbon material, conductive ceramic, and metal powder and of any resin which binds the same.

CITATIONS LIST

Patent Literature

PLT 1: Japanese Patent Publication No. 2000-212764 A1
PLT 2: Japanese Patent Publication No. 55-17508 A1
PLT 3: Japanese Patent Publication No. 2004-17455 A1
PLT 4: Japanese Patent Publication No. 9-276788 A1
PLT 5: Japanese Patent Publication No. 11-138095 A1
PLT 6: Japanese Patent Publication No. 7-313930 A1
PLT 7: Japanese Patent Publication No. 2003-513141 A1
PLT 8: Japanese Patent Publication No. 2005-288730 A1
PLT 9: Japanese Patent Publication No. 2003-268567 A1

SUMMARY OF INVENTION

Technical Problem

As explained in the section on "Background Art", in precoated metal sheets, a need for electroweldability at the time of assembly of parts and a need for groundability and other higher conductivity when used for household electrical appliances and parts office automation equipment have arisen. Such a trend also applies to inexpensive precoated metal sheet designed for indoor household electrical appliances and interior building materials. In this regard, if using the art such as in PLT 1 or PLT 4 with the intent of solving these problems, to obtain the desired corrosion resistance and conductivity, it is necessary to use a chromate film or chrome compound-containing rust-proofing layer as a primer layer. This does not match the current need for avoiding the effects of the toxic nature and environmental load of hexavalent chrome.

If using zinc powder as conductive particles like in PLT 2, using Fe—Si alloy, Fe—Co alloy, Fe—Mn alloy, or other ferrous alloys as conductive particles in PLT 4, or, further, using zinc or aluminum powder in PLT 7, if using plated steel sheet containing these in the coating film in a usual moist environment indoors or outdoors, there were the difficulties that a rust layer or a thick oxide insulating layer would form on the surface of the zinc powder or alloy, the powder and resin would separate at their interface, and the conductivity of the coating film would be lost.

In PLT 3 as well, use of nickel powder is recommended. Nickel is excellent in relative water resistance, so even if using a metal sheet which contains this in a coating film in a usual moist environment indoors or outdoors, the conductivity of the coating film is held to a certain extent. However, the dependency on overseas nickel resources is high. The changing situations and oligopoly etc. of the producing countries mean there is a risk of the resources not being able to be stably and inexpensively acquired over the long term in the future. Further, nickel has a specific gravity of 8.85 and is relatively heavy as conductive particles, so when using a roll coater or curtain coater etc. to coat the coating on a metal sheet in mass production, the nickel particles inside the coating rapidly settled and did not easily enter the coating film resulting in the desired conductivity often not being able to be obtained. Furthermore, in PLT 3, use of a water-based coating is recommended, but when using a water-based coating which contains nickel particles, there was the difficulty that with storage for several weeks or so, the surface layers of the particles would oxidize and blue-green color nickel oxide (II) (NiO) would form and float free in the water thereby contaminating the coating.

Further, in PLT 7, a water-based coating-use coating is used, so when using zinc and aluminum as conductive particles, in the same way as the case of PLT 3, there was the defect that the water coexisting in the water-based coating or film caused a rust layer to form on the metal powder surface and caused the conductivity to become inferior.

In this way, in the prior art, it is not easy to obtain a precoated metal sheet which achieves both sufficient conductivity and corrosion resistance without jointly using a chromate primer layer (PLTs 1 and 4). If using nickel particles as conductive particles, industrial application is difficult due to the ease of settling of nickel due to its high specific gravity, unstable prices, etc. (PLT 3). It is not possible to obtain a precoated metal sheet which maintains the corrosion resistance of the precoated metal sheet and enables use of a coloring pigment to color the sheet to a desired color tone by keeping down the amount of addition of conductive particles (PLTs 4 to 9). Further, if selecting particles of base metals for which surface oxide films easily form due to moisture, during the use of the steel sheet, an oxide insulating layer or rust layer is formed and sufficient conductivity cannot be obtained (PLTs 2, 4, and 7). In this and other ways, there have been various problems.

As explained above, a precoated metal sheet is being asked to provide both conductivity, more specifically electroweldability at the time of assembly of parts and groundability in the case of use for parts of household electrical appliances or office automation equipment, and corrosion resistance and aesthetic appearance. To provide such a precoated metal sheet, it has been necessary to provide the desired conductivity, corrosion resistance, and coloring ability by a coloring pigment by addition of a small amount of conductive particles which are stable and maintain good dispersability in the coating-use coating or during use of the precoated metal sheet.

The present invention was made in consideration of the above such problems and relates to a chromate-free conductive, corrosion resistant precoated metal sheet which is covered at least at part of its surface with a film which contains a small amount of non-oxide ceramic particles with an electrical resistivity limited to an extremely low range.

Solution to Problem

The inventors engaged in intensive research for achieving the above-mentioned such object and as a result discovered that if forming on a metal surface a film which contains a small amount of non-oxide ceramic particles with an electrical resistivity of $0.1 \times 10^{-6}$ to $185 \times 10^{-6}$ Ωcm which are selected from borides, carbides, nitrides, and silicides, which can be relatively inexpensively obtained industrially, in an organic resin, a conductive, corrosion resistant precoated metal sheet which is excellent in all of conductivity, corrosion resistance, and coloring ability by a coexisting coloring pigment can be obtained.

The present invention was completed based on the above findings and specifically is as follows:

(1) A conductive, corrosion resistant precoated metal sheet comprising a metal sheet on at least one surface of which is formed a coating film (α) which contains an organic resin (A) and non-oxide ceramic particles (B) with a 25° C. electrical resistivity of $0.1 \times 10^{-6}$ to $185 \times 10^{-6}$ Ωcm selected from borides, carbides, nitrides, non-oxide and silicides, a volume ratio of the organic resin (A) and the non-oxide ceramic particles (B) in the coating film (α) at 25° C. being 90:10 to 99.9:0.1, the organic resin (A) including a resin (A1) which includes at least one type of functional group selected from a carboxyl group and sulfonic acid group in a structure of the resin (A1) or further a derivative (A2) of that resin (A1).

(2) The conductive, corrosion resistant precoated metal sheet as set forth in (1) characterized in that the non-oxide ceramic particles (B) have a 25° C. electrical resistivity of $0.1 \times 10^{-6}$ to $100 \times 10^{-6}$ Ωcm.

(3) The conductive, corrosion resistant precoated metal sheet as set forth in (1) or (2) characterized in that the coating film (α) has a thickness of 2 to 10 μm.

(4) The conductive, corrosion resistant precoated metal sheet as set forth in (1) or (2) characterized in that the resin (A1) or derivative (A2) of the resin (A1) further includes at least one type of functional group selected from an ester group, urethane group, and urea group in the structure of the resin (A1) or the derivative (A2).

(5) The conductive, corrosion resistant precoated metal sheet as set forth in (4) characterized in that the resin (A1) is a polyurethane resin (Alu) which includes a urea group in the structure of the polyurethane resin (Alu).

(6) The conductive, corrosion resistant precoated metal sheet as set forth in (5) characterized in that the resin (A1) is a mixed resin of a polyurethane resin (Alu) which includes a urea group in the structure of the polyurethane resin (Alu) and a polyester resin (Ale) which includes an aromatic dicarboxylic acid as a carboxylic acid component and includes a sulfonic acid group in the structure of the polyester resin (Ale).

(7) The conductive, corrosion resistant precoated metal sheet as set forth in (1) or (2) characterized in that the derivative (A2) of the resin (A1) is a resin (A2$_{Si}$) of the following general formula (I):

General formula (I)

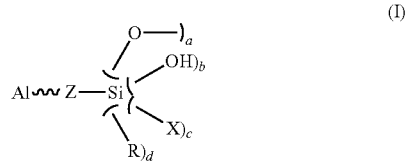

(wherein, the notation "A1" indicates the resin (A1), "Z—" indicates a $C_1$ to $C_9$, $N_0$ to $N_2$, $O_0$ to $O_2$ hydrocarbon chain, and the notation "A1~Z" indicates a covalent bond of "A1" and "Z" through functional groups of the two. Further, "—O—" is an ether bond, "—OH" is a hydroxyl group, and "—X" is a $C_1$ to $C_3$ hydrolysable alkoxy group, hydrolysable halogen group, or hydrolysable acetoxy group, "—R" is a $C_1$ to $C_3$ alkyl group, "a", "b", "c", and "d" which show the numbers of substituents are all integers of 0 to 3, and a+b+c+d=3)

(8) The conductive, corrosion resistant precoated metal sheet as set forth in (1) or (2) characterized in that the organic resin (A) is a resin which is cured by a curing agent (C).

(9) The conductive, corrosion resistant precoated metal sheet as set forth in (8) characterized in that the curing agent (C) contains a melamine resin (C1).

(10) The conductive, corrosion resistant precoated metal sheet as set forth in (1) or (2) characterized in that the nonoxide ceramic particles (B) are a boride ceramic $Mo_2B$, $MoB$, $MoB_2$, $NbB$, $NbB_2$, $TaB$, $TaB_2$, $TiB$, $TiB_2$, $VB$, $VB_2$, $W_2B_5$, or $ZrB_2$; a carbide ceramic $B_4C$, $MoC$, $Mo_2C$, $Nb_2C$, $SiC$, $Ta_2C$, $TaC$, $TiC$, $V_2C$, $VC$, $WC$, $W_2C$, or $ZrC$; a nitride ceramic $Mo_2N$, $Nb_2N$, $NbN$, $Ta_2N$, $TiN$, or $ZrN$; a silicide ceramic $Mo_3Si$, $MoSi_2$, $NbSi_2$, $Ta_2Si$, $TaSi_2$, $TiSi$, $TiSi_2$, $V_5Si_3$, $VSi_2$, $W_3Si$, $WSi_2$, $ZrSi$, or $ZrSi_2$; or a mixture of two or more types selected from these.

(11) The conductive, corrosion resistant precoated metal sheet as set forth in (1) or (2) characterized in that the coating film (α) is formed by coating a water-based precoating-use composition.

Advantageous Effects of Invention

According to the present invention, by just adding a small amount of a conductive material to a coating film, it is possible to provide a precoated metal sheet which gives a coating film conductivity realizing sufficient groundability and weldability. Further, the precoated metal sheet of the present invention also has excellent corrosion resistance. Further, by adding a coloring pigment in advance to the water-based or solvent-based or other precoating-use composition for obtaining the coating film of the present invention, it is possible to easily provide a precoated metal sheet which can be easily colored to the desired color tone.

BRIEF DESCRIPTION OF DRAWINGS

FIG. 1 is a schematic view of the cross-section of a conductive, corrosion resistant precoated metal sheet of the present invention.

DESCRIPTION OF EMBODIMENTS

Below, the present invention will be explained in detail.
<Metal Sheet>
The precoated metal sheet of the present invention is a metal sheet which is covered at least at part of its surface by a specific conductive coating film. According to the application, both surfaces of the metal sheet may be covered by the coating film or only a single surface may be covered. Further, part of the surface may be covered or the entire surface may be covered. The locations of the metal sheet which are covered by the coating film are superior in conductivity and corrosion resistance.

As the metal forming the metal sheet which can be used for the precoated metal sheet of the present invention, for example, aluminum, titanium, zinc, copper, nickel, steel, etc. may be used. The ingredients of these metals are not particularly limited. For example, when using steel, it may be ordinary steel or may be steel containing chrome or other additive elements. However, if using the metal sheet of the present invention for strong ironing or deep drawing applications, in the case of each metal, it is preferable to suitably control the types or amounts of addition of the additive elements and the metal structure so as to be suitable for strong ironing or deep drawing. Further, when using steel sheet as the metal sheet, the surface may have a covering plating layer, but the type is not particularly limited. As the applicable plating layer, for example, platings comprised of any of zinc, aluminum, cobalt, tin, or nickel and alloy platings which contain these metal elements and further other metal elements or nonmetal elements etc. may be mentioned. In particular, as zinc-based plating layers, for example, platings comprised of zinc, alloy platings of zinc and at least one of aluminum, cobalt, tin, nickel, iron, chrome, titanium, magnesium, and manganese, or various galvannealed platings which contain further other metal elements or nonmetal elements (for example, four-way alloy platings of zinc with aluminum, magnesium, and silicon) may be mentioned, but the alloy ingredients other than the zinc are not particularly limited. Further, these plating layers which contain small amounts of different metal elements or impurities such as cobalt, molybdenum, tungsten, nickel, titanium, chromium, aluminum, manganese, iron, magnesium, lead, bismuth, antimony, tin, copper, cadmium, arsenic, etc. and which have silica, alumina, titania, and other inorganic substances dispersed in them are included.

As aluminum-based plating layers, aluminum or alloy platings of aluminum and at least one of silicon, zinc, and magnesium (for example, alloy platings of aluminum and silicon, alloy platings of aluminum and zinc, three-way alloy platings of aluminum, silicon, and magnesium), etc. may be mentioned.

Furthermore, composite platings of combinations of the above platings and other types of platings, for example, iron plating, iron and phosphorus alloy plating, nickel plating, cobalt plating, etc. may also be used.

The method of forming the plating layer is not particularly limited. For example, electroplating, electroless plating, hot dipping, deposition plating, dispersal plating, etc. may be used. The plating treatment method may be either the continuous or batch type. Further, when using steel sheet, as treatment after plating, treatment for making the appearance uniform after hot dipping, that is, zero spangle treatment, treatment for reforming the plating layer, that is, annealing treatment, temper rolling for adjusting the surface conditions and material quality, etc. are possible, but the present invention is not particularly limited to these. Any may be used.

<Coating Film (α)>

The coating film (α) which covers the metal sheet of the present invention is formed on at least one surface of the metal sheet and includes an organic resin (A) and non-oxide ceramic particles (B) with a 25° C. electrical resistivity of $0.1 \times 10^{-6}$ to $185 \times 10^{-6}$ Ωcm which are selected from borides, carbides, nitrides, and silicides.

The coating film is not limited in type of solvent coated, method of forming a film on the metal sheet surface, or method of curing so long as it can be industrially produced by coating a precoating-use composition. As the precoating-use composition, a water-based resin composition or an organic solvent-based resin composition may be mentioned. As the method of forming a film on the metal sheet, for example, in the case of a water-based or a solvent-based composition, the method of using a roll coat, groove roll coat, curtain flow coat, roller curtain coat, dip, air knife coat, or other known coating method to coat the metal sheet with a precoating-use composition, then dry off the water content or solvent of the wet coating is preferable. As the curing method of these dried coating films, polymerization and curing by heating and baking the organic resin in the coating film are preferable, but polymerization and curing by irradiation with UV light if the resin in the coating film can be polymerized by UV light and polymerization and curing by irradiation by electron beams if the resin in the coating film can be polymerized by electron beams are also possible.

For the purpose of further improving the adhesion and corrosion resistance etc. of the coating film (α) to the metal sheet, it is also possible to provide a chromate-free primer film between the coating film and the metal sheet surface. In the case of providing a primer film, the number of layers and the composition are not limited, but to prevent the flexibility of the coating film when working the metal sheet and the corrosion resistance from being impaired, adhesion to the metal sheet and the top layer coating film must be excellent. Further, to secure sufficient conductivity in the coating film thickness direction, the primer film thickness is preferably made 0.5 μm or less.

When providing the primer film, the method of forming the primer film is not limited so long as a method of film formation which can be applied industrially. The methods of coating, depositing, film attachment, etc. of the precoating-use composition may be illustrated, but from the viewpoints of the film forming costs (productivity) and general applicability etc., the method of coating and drying a water-based or solvent-based precoating-use composition is preferable. When using a water-based or solvent-based precoating-use composition, it is possible to coat and dry one layer at a time from the primer layer to the topmost layer repeatedly (successive coating method) to form a multilayer coating, but as a method for simply and efficiently forming a film on a metal sheet surface, it is also possible to form a film by a lamination method including the steps, in this order, of the step of coating the layers of films from the bottommost layer contiguous with the metal sheet surface to the topmost layer in the wet state successively or simultaneously (wet-on-wet coating or multilayer simultaneous coating process of precoating-use composition), a drying step of simultaneously drying off the water content or solvent of the various layers of film in the wet state, and a film-forming step of curing this multilayer film. Here, the "wet-on-wet coating method" is the method of coating a coating solution on a metal sheet, then coating another coating solution over this in the state containing a solvent (wet) before the coating solution dries, simultaneously drying off the solvents of the obtained laminated coating solutions and making them cure to form a film. Further, the "multilayer simultaneous coating method" is the method of using a multilayer slide type curtain coater or slot die coater etc. so simultaneously coat a plurality of layers of coating solutions in a multilayer state on a metal sheet, then simultaneously drying off the solvents of the multilayer coating solutions and curing the solutions to form films.

The coating film (α) which covers the metal sheet of the present invention contains the later explained organic resin (A) and the non-oxide ceramic particles (B) which have the specific range of electrical resistivity, but the volume ratio of the organic resin (A) and non-oxide ceramic particles (B) in the coating film (α) at 25° C. is 90.0:10.0 to 99.9:0.1, preferably 95:5 to 99.9:0.1, from the viewpoint of securing the coating coloring freedom and corrosion resistance, more preferably 97:3 to 99.7:0.3. Furthermore, 99:1 to 99.9:0.1 in range is preferable from the viewpoint of securing higher coloring freedom and corrosion resistance.

In the conductive, corrosion resistant precoated metal sheet of the present invention, the amount of the addition of the conductive non-oxide ceramic particles (B) into the coating film (α) is extremely small. This is an extremely small amount compared with the conductive material in a conductive coating film of the prior art. For example, in PLTs 4 and 5, the amount of the conductive particles in the conductive coating film is made 3 to 59 vol %. PLT 7 describes to include 30 to 60 mass % of conductive powder in a metal surface coating agent which can form a conductive, weldable corrosion resistant film. In PLT 8, the amount of conductive particles in the conductive second layer film is made 5 to 70 vol % of the film. PLT 9 describes to include 10 to 90 vol % of a conductive material in a conductive surface treated layer. The reason why the coating film (α) of the present invention gives a good conductivity even with a percentage of conductive non-oxide ceramic particles (B) to the organic resin (A) of 10.0% or less is that in the coating film (α), the non-oxide ceramic particles (B) do not agglomerate but are sufficiently dispersed. It is believed that this is due to the fact that the desired size of conductive particles are uniformly arranged in the planar direction of the coating film (when thickness direction is designated as Z-axis, the X-Y-axial direction) and form paths for conduction of electricity to the metal sheet below them over the entire coating surface. If the conductive particles agglomerate in the coating film, these electrical conduction paths are hard to form and to secure conduction paths, further greater conductive materials must be added. The addition of a large amount of conductive material results in the coating appearance being governed by the color of the metal particles (in most cases, black gray color, dark gray color, gray color, burnt tea color, etc.), so the defect arises that even if adding a coloring pigment or other cooling agent, a color coating which has the desired color tone or gloss cannot be obtained. Further, it is impossible to obtain a clear coating film through which the metal surface under the coating film can be beautifully seen. For this reason, in the past, it was not possible to use this as a beautiful color coating or clear coating on the topmost layer of the precoated metal sheet. In the conductive, corrosion resistant precoated metal sheet of the present invention, this problem does not arise at all.

If the volume ratio of (B) to the total of (A) and (B) exceeds 10 vol %, the conductivity rises, but the coating film appearance is governed by the color of the conductive particles. Even if a coloring pigment is added, the desired color tone is liable to be unable to be colored to, so not more than 10 vol % is necessary. Further, if over 10 vol %, the amount of conductive particles which are dispersed in the coating film becomes greater, so conversely the conduction points increase, a corrosion current easily flows, and the corrosion resistance is liable to become insufficient. Note that, even if adding conductive particles in an amount of 5 to 10 vol % of the coating film, the corrosion resistance will sometimes become somewhat insufficient. Further, the coating film appearance is governed by the color of the particles themselves. Even if adding a coloring pigment, the desired color tone tends to be hard to color to, so addition by a volume ratio of (B) of not more than 5 vol % is preferable. Furthermore, even if adding conductive particles in an amount of 3 to 5 vol % of the coating, if the particles are dark in color, the coating film appearance will sometimes be governed by the color of the particles themselves and even if adding a coloring pigment, the desired color tone tends to be hard to color to, so addition of not more than 3 vol % is more preferable. Furthermore, to secure a high coating coloring freedom and corrosion resistance, addition of a small amount of not more than 1 vol % is particularly preferred.

On the other hand, if the volume ratio of (B) to the total of (A) and (B) is less than 0.1 vol %, the amount of the non-oxide ceramic particles which are dispersed in the coating film will be slight and the coating film will not be able to be given sufficient conductivity.

The thickness of the coating film ($\alpha$) which covers the metal sheet of the present invention is preferably 2 to 10 μm thickness in range, more preferably 2.5 to 6 μm thickness in range. If less than 2 μm, the coating is too thin and a sufficient corrosion resistance cannot be obtained. Not only this, the coloring ability and concealability by the coloring pigment are sometimes not obtained. Further, if over 10 μm, the amount of the precoating-use composition which is used increases and the manufacturing cost becomes high. Not only this, with a water-based coating, pinholes and other coating film defects sometimes occur. It is not easy to stably obtain the appearance required as an industrial product.

The thickness of the coating film ($\alpha$) can be measured by observation of the cross-section of the coating film. In addition, it can be calculated by dividing the mass of the coating film which is deposited per unit area of the metal sheet by the specific gravity of the coating film or the specific gravity after drying of the precoating-use composition. The deposited mass of the coating film may be suitably selected from existing art such as measurement of the mass difference before and after coating, the mass difference before and after peeling of the coating film after coating, or the amount of presence of elements of contents in the coating learned in advance by analysis of the coating film by fluorescent X-ray analysis. The specific gravity of the coating film or the specific gravity after drying of the precoating-use composition may be suitably selected from existing art such as measurement of the volume and mass of the separated coating film, measurement of the volume and mass after taking a suitable amount of precoating-use composition in a container and drying it, or calculation from the amounts of the coating-film forming ingredients and the known specific gravities of the ingredients.

<Organic Resin (A)>

The organic resin (A) of the present invention is the binder ingredient of the coating film ($\alpha$). When the organic resin (A) is a water-based or organic solvent-based resin, it is comprised including the later explained resin (A1) or furthermore a reaction derivative (A2) of the resin (A1).

The precoating-use composition ($\beta$) which is used for forming the coating film ($\alpha$) in the present invention contains the later explained resin (A1) in an amount of 50 to 100 mass % of the nonvolatiles. The resin (A1) is stably present in the water-based precoating-use composition ($\beta$). If coating and heating and drying such a precoating-use composition ($\beta$) on a metal sheet, the resin (A1) is dried as it is without reacting. Alternatively when the precoating-use composition ($\beta$) contains a silane coupling agent, curing agent, cross-linking agent, etc., at least part of the resin (A1) reacts with these and forms a derivative (A2) of the resin (A1). Therefore, in this case, what includes the unreacted resin (A1) and reaction derivative (A2) of the resin (A1) is the organic resin (A) of the binder ingredient of the coating film ($\alpha$).

The type of the resin (A1) is not particularly limited. For example, a polyester resin, polyurethane resin, epoxy resin, (meth)acrylic resin, polyolefin resin, phenol resin, or their modified products etc. may be mentioned. Single types or two or more types of these mixed may be used as the resin (A1) or single types or two or more types of the organic resins obtained by modifying at least one type of organic resin may be used as resin (A1). The reason why it is not necessary to particularly limit the type of the resin (A1) in the present invention in this way is that the amount of the non-oxide ceramic particles (B) present in the coating film ($\alpha$) is small and the corrosion current which flows through the non-oxide ceramic particles in the coating film in the environment of use of the metal sheet is also small, so even if making the coating film conductive, it is not necessary to make the binder ingredient of the coating film a special corrosion resistant resin. Under the usual environment of use, there is water content present in the coating film ($\alpha$), but even in such a case, since water-resistant non-oxide ceramic particles which maintain a high conductive ability are used, even if the amount of presence in the coating film is small, the groundability and weldability can be secured.

The resin (A1), as explained above, is not particularly limited in type so long as being stably present in the water-based precoating-use composition ($\beta$), but is a resin which includes at least one type of functional group selected from a carboxyl group and sulfonic acid group in its structure. While details will be explained later, the organic resin (A) in the coating film ($\alpha$) includes the resin (A1) which includes at least one type of functional group selected from a carboxyl group and sulfonic acid group in its structure or, furthermore, the derivative (A2) of that resin.

Note that, in the present invention, the resin which is used for the precoating-use composition ($\beta$) for obtaining the coating film ($\alpha$) includes water-soluble and solvent-soluble resins which completely dissolve in water or an organic solvent and resins which uniformly finely disperse in water or a solvent in the form of an emulsion or suspension etc. (water dispersable resin or solvent dispersable resin). Further, here, "(meth)acrylic resin" means an acrylic resin and methacrylic resin.

In the resin (A1), the polyester resin is not particularly limited. For example, ethylene glycol, 1,3-propanediol, 1,2-propanediol, propylene glycol, diethylene glycol, 1,6-hexanediol, neopentyl glycol, triethylene glycol, bisphenol hydroxypropyl ether, 2-methyl-1,3-propanediol, 2,2-dimethyl-1,3-propanediol, 2-butyl-2-ethyl-1,3-propanediol, 1,4-butanediol, 2-methyl-1,4-butanediol, 2-methyl-3-methyl-1, 4-butanediol, 1,5-pentanediol, 3-methyl-1,5-pentanediol, 1,6-hexanediol, 1,4-cyclohexanedimethanol, 1,3-cyclohexanedimethanol, 1,2-cyclohexanedimethanol, hydrated bisphenol-A, dimer diol, trimethylolethane, trimethylpropane, glycerin, pentaerythritol, or other polyol and phthalic acid, phthalic anhydride, tetrahydrophthalic acid, tetrahydrophthalic anhydride, hexahydrophthalic acid, hexahydrophthalic anhydride, methyltetraphthalic acid, methyltetrahydrophthalic anhydride, isophthalic acid, terephthalic acid, succinic anhydride, adipic acid, sebacic acid, maleic acid, maleic anhydride, itaconic acid, fumaric acid, himic anhydride, trimellitic acid, trimellitic anhydride, pyromellitic acid, pyromellitic anhydride, azelaic acid, succinic acid, succinic anhydride, lactic acid, dodecenylsuccinic acid, dodecenylsuccinic anhydride, cyclohexane-1,4-dicarboxylic acid, endic anhydride, or other polyhydric carboxylic acid combined by dehydration polycondensation and, furthermore, these neutralized by ammonia or an amine compound etc. and made a water-based resin etc. may be mentioned.

Among the above resins (A1), the polyurethane resin is not particularly limited. For example, one obtained by reacting a polyol compound and polyisocyanate compound, then extending the chain by a chain extender etc. may be mentioned. The polyol compound is not particularly limited so long as being a compound which has two or more hydroxyl groups per molecule. For example, ethylene glycol, propylene glycol, diethylene glycol, 1,6-hexanediol, neopentyl glycol, triethylene glycol, glycerin, trimethylolethane, trimethylolpropane, polycarbonate polyol, polyester polyol, bisphenolhydroxypropyl ether, and other polyether polyols, polyester amide polyol, acryl polyol, polyurethane polyol, or mixtures of the same may be mentioned. The polyisocyanate compounds are not particularly limited so long as being compounds which contain two or more isocyanate groups per molecule. For example, hexamethylene diisocyanate (HDI) or other aliphatic isocyanates, isophoron diisocyanate (IPDI) and other alicyclic diisocyanates, tolylene diisocyanate (TDI) and other aromatic diisocyanates, diphenylmethane diisocyanate (MDI) and other aromatic diisocyanates, or mixtures of the same may be mentioned. The chain extender is not particularly limited so long as a compound which has one or more active hydrogens in its molecule. Ethylenediamine, propylenediamine, hexamethylenediamine, diethylenetriamine, dipropylenetriamine, triethylenetetramine, tetraethylenepentamine, and other aliphatic polyamines or tolylenediamine, xylylenediamine, diaminodiphenylmethane or other aromatic polyamines or diaminocyclohexylmethane, piperadine, 2,5-dimethylpiperadine, isophorondiamine, or other alicyclic polyamines, hydrazine, dihydrazide succinate, dihydrazide adipate, dihydrazide phthalate, and other hydrazides, hydroxyethyldiethylenetriamine, 2-[(2-aminoethyl)amino] ethanol, 3-aminopropanediol, and other alkanolamines etc. may be mentioned. These compounds may be used alone or in mixtures of two or more types.

In the above resin (A1), the (meth)acrylic resin is not particularly limited. For example, one obtained by radical polymerization of ethyl(meth)acrylate, 2-ethylhexyl(meth) acrylate, n-butyl(meth)acrylate, or other alkyl(meth)acrylate, 2-hydroxyethyl(meth)acrylate, or other hydroxyalkyl(meth) acrylate, alkoxysilane(meth)acrylate, or other (meth)acrylic acid ester using a (meth)acrylic acid and a polymerization initiator in water may be mentioned. The polymerization initiator is not particularly limited. For example, potassium persulfate, ammonia persulfate, and other persulfates, azobis cyanovaleric acid, azobis isobutyronitrile, or other azo compounds etc. may be mentioned. Here, "(meth)acrylate" means acrylate and methacrylate, while "(meth)acrylic acid" means acrylic acid and methacrylic acid.

In the above resin (A1), the epoxy resin is not particularly limited. For example, a bisphenol A type epoxy resin, bisphenol F type epoxy resin, resorcine-type epoxy resin, hydrogenated bisphenol A type epoxy resin, hydrogenated bisphenol F-type epoxy resin, resorcine-type epoxy resin, novolac-type epoxy resin, or other epoxy resin can be obtained by reaction with diethanolamine, N-methylethanolamine, or other amine compound. Furthermore, one neutralized by an organic acid or inorganic acid and made a water-based resin or one obtained by radical polymerization of a high acid value acryl resin in the presence of the epoxy resin, then neutralization by ammonia or an amine compound etc. and made water-based may be mentioned.

In the above resin (A1), the phenol resin is not particularly limited. For example, phenol, resorcine, cresol, bisphenol A, p-xylylene dimethylether, or other methylolated phenol resin or phenol resin obtained by reacting an aromatic compound and formaldehyde in the presence of a reaction catalyst may be obtained by reaction with diethanolamine, N-methylethanolamine, or other amine compounds. Furthermore, compounds which have been neutralized by organic acids or inorganic acids and made water-based etc. may also be mentioned.

In the above resin (A1), the polyolefin resin is not particularly limited. For example, ones obtained by radical polymerization of ethylene and methacrylic acid, acrylic acid, maleic acid, fumaric acid, itaconic acid, crotonic acid, or other unsaturated carboxylic acids under high temperature and high pressure or these furthermore neutralized by ammonia or an amine compound, KOH, NaOH, LiOH, or other basic metal compound or ammonia or an amine compound etc. which contains the metal compounds and made water-based may be mentioned.

The above resin (A1) may be used alone or mixed in two or more types. Further, as the main ingredients of the precoating-use composition (β), one or more types of composite resins obtained by modification of at least one type of other resin (A1) in the presence of at least one type of resin (A1) may be used as the resin (A1).

Furthermore, in accordance with need, when preparing the precoating-use composition (β) which contains the resin (A1), while explained in detail below, it is also possible to add a curing agent and cross-linking agent of the resin (A1) or introduce a cross-linking agent into the resin structure. The cross-linking agent is not particularly limited. For example, at least one type of cross-linking agent selected from the group comprising an amino resin, polyisocyanate compound, blocked polyisocyanate, epoxy compound, carbodiimide group-containing compound, etc. may be mentioned. By blending in these cross-linking agents, it is possible to enhance the cross-linking density of the coating film (α) and the adhesion to a metal surface. The corrosion resistance and the flexibility of the coating film at the time of working the sheet are improved. These cross-linking agents may be used alone or may be jointly used in two or more types.

The amino resin is not particularly limited. For example, a melamine resin, benzoguanamine resin, urea resin, glycoluril resin, etc. may be mentioned.

The polyisocyanate compound is not particularly limited. For example, hexamethylene diisocyanate, isophoron diisocyanate, xylylene diisocyanate, tolylene diisocyanate, etc. may be mentioned. Further, the blocked polyisocyanate is a blocked compound of the polyisocyanate compound.

The epoxy compound is not particularly limited so long as a compound which has a plurality of epoxy groups (oxirane rings) comprised of three-member cyclic ether groups. For example, adipic acid diglycidyl ester, phthalic acid diglycidyl ester, terephthalic acid diglycidyl ester, sorbitan polyglycidyl ether, pentaerythritol polyglycidyl ether, glycerin polyglycidyl ether, trimethylpropane polyglycidyl ether, neopentylglycol polyglycidyl ether, ethylene glycol diglycidyl ether, polyethylene glycol diglycidyl ether, propylene glycol diglycidyl ether, polypropylene glycol diglycidyl ether, 2,2-bis-(4'-glycidyloxyphenyl)propane, tris(2,3-epoxypropyl)isocyanulate, bisphenol A diglycidyl ether, hydrogenated bisphenol A diglycidyl ether, etc. may be mentioned. Most of these epoxy compounds have a glycidyl group where one —$CH_2$— is added to an epoxy group, so the compound names include the term "glycidyl".

As the carbodiimide group-containing compound, for example, a compound obtained by stripping an aromatic diisocyanate, aliphatic diisocyanate, alicyclic diisocyanate, or other diisocyanate compound of carbon dioxide accompanying a condensation reaction, synthesizing an isocyanate-terminated polycarbodiimide by this, then further adding a hydrophilic segment which has a functional group which has reactivity with an isocyanate group etc. may be mentioned.

The amount of these cross-linking agents is preferably 1 to 40 parts by mass with respect to 100 parts by mass of the resin (A1) which forms the coating film (α). If less than 1 part by mass, the amount is insufficient and the effect of addition may not be obtained, while if an amount over 40 parts by mass, the coating film excessively cures and becomes fragile and the corrosion resistance and working adhesion may drop.

As explained above, in the present invention, the amount of the non-oxide ceramic particles (B) which are present in the coating film (α) is small, so in the usage environment of the metal sheet, the corrosion current which flows through the non-oxide ceramic particles in the coating film is small. Along with the coating film being made conductive, there is no particular need to make the resin forming the coating film a specific high corrosion resistance resin. However, to raise the corrosion resistance of the coating film and broaden the range of application of the precoated metal sheet of the present invention, the organic resin (A) particularly preferably contains the resin (A1) and/or the derivative thereof shown by the following general formula (I), that is, the resin ($A2_{Si}$), in total with respect to the organic resin (A) of 50 to 100 mass %.

General formula (I)

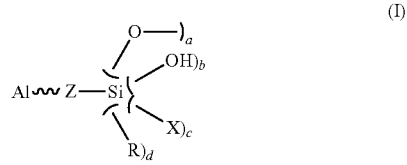

(I)

(wherein, the notation of "A1" indicates a resin (A1), "Z—" indicates a $C_1$ to $C_9$, $N_0$ to $N_1$, $O_0$ to $O_2$ hydrocarbon chain, and the notation "A1~Z" indicates "A1" and "Z" are bonded through the functional groups of the two by covalent bonding. Further, "—O—" indicates an ether bond, "—OH" a hydroxyl group, an "—X" a $C_1$ to $C_3$ hydrolysable alkoxy group, hydrolysable halogeno group, or hydrolysable acetoxy group, "—R" a $C_1$ to $C_3$ alkyl group, "a", "b", "c", and "d" indicating numbers of substituents are all integers of 0 to 3, and a+b+c+d=3)

As already explained, the precoating-use composition (β) which is used for formation of the coating film (α) of the present invention includes the resin (A1) in an amount with respect to the nonvolatiles of 50 to 100 mass %. The nonvolatiles which are contained in the precoating-use composition (β) other than the resin (A1) include, as explained in detail later, a silane coupling agent (s), a curing agent (C), cross-linking agent, polyphenol compound, phosphoric acid and hexafluorometal acid, phosphate compound, metal oxide particles, and other various rust preventive agents etc. The contents of these compounds in the coating film (α) after formation, as explained later, are in preferable ranges with respect to the total mass of the resins (A1) and ($A2_{Si}$), so when preparing the precoating-use composition (β) which contains these compounds, the amounts are adjusted so that these fall in the preferred ranges of content in the coating film (α) after formation.

The resin ($A2_{Si}$) which is contained in the organic resin (A) in the present invention is, for example, obtained by coating and drying a precoating-use composition (β) which contains the resin (A1) and the silane coupling agent (s) on the metal sheet which is used in the present invention. In general, a silane coupling agent can be chemically bonded to a metal surface which has hydroxyl groups or other functional groups or numerous functional organic resins, so in the copresence of a metal surface, functional organic resin, or silane coupling agent, enables cross-linking of the metal surface and functional organic resin or intermolecular or intramolecular cross-linking of functional organic resins together. In the present invention, by coating and drying the precoating-use composition (β) including a resin (A1) and silane coupling agent (s) on a metal sheet, at least part of the functional groups of the resin (A1) and at least part of the functional groups of the metal surface respectively react with the silane coupling agent (s) whereby the resin ($A2_{Si}$) is produced. At least part of the —O— (ether bonds) or —OH (hydroxyl groups) of the resin ($A2_{Si}$) which is shown in the general formula (I) bond with the metal surface. When providing a primer film between the coating film (α) and the metal sheet surface, at least part of the —O— (ether bonds) or —OH (hydroxyl groups) of the resin ($A2_{Si}$) which is shown in the general formula (I) bond with the primer film surface. The bonds of the ether bonds and metal surface and the bonds of the ether bonds and the primer film-forming ingredients are covalent bonds, while the bonds of the hydroxyl groups and metal surface and the bonds of the hydroxyl groups and primer film-forming ingredients are in most cases hydrogen bonds or coordinate bonds. Due to such chemical bonds between the film-forming resin and metal surface or chemical bonds between the top layer coating-forming resin and primer film, the adhesion between the two rises and the coating exhibits excellent flexibility at the time of working when working and deforming a metal sheet, so the appearance of the worked parts is not impaired and the corrosion resistance of the worked parts is improved.

When further providing a primer film between the coating film (α) which is obtained by coating and drying the precoating-use composition (β) including the silane coupling agent (s) and the metal sheet surface, as already explained, a multilayer film may be formed by the sequential coating method of repeatedly coating and drying one layer at a time from the primer layer to the outermost layer, but as a method of forming a film on a metal sheet surface simply and efficiently, it is also possible to use the wet-on-wet coating method or multilayer simultaneous coating method. These methods form the bottommost layer to the topmost layer in a multilayer state in a state containing water or containing a solvent (wet) once on the metal sheet, but in such a state, since the mobility of the silane coupling agent (s) which is contained at the topmost layer is high, at least part of the silane coupling agent (s) efficiently reacts with the functional compound which is contained in the primer layer right beneath it. Due to these chemical bonds (promoting interlayer cross-linking), the adhesion between the outermost layer and the primer layer tends to become higher than the case of sequential coating method. The flexibility of the coating at the time of working and deforming the metal sheet and the corrosion resistance of the worked parts sometimes is improved over the case of film formation by the sequential coating method.

In the present invention, the silane coupling agent (s) which is used for forming the resin ($A2_{Si}$) is one or more types of agents selected from silane coupling agents which have molecular structures which are shown by the general formula Y—Z—$SiX_mR_{3-m}$. Among the functional groups in the molecular structure, the —X group which mainly forms a reaction point with the metal surface or other silane coupling agent is a $C_1$ to $C_3$ hydrolysable alkoxy group or hydrolysable halogeno group (fluoro group (—F), chloro group (—Cl), bromo group (—Br), etc.) or hydrolysable acetoxy group (—O—CO—$CH_3$). Among these, a $C_1$ to $C_3$ hydrolysable alkoxy group is preferable since the number of carbon atoms of the alkoxy group can be changed to adjust the hydrolysability, while a methoxy group (—$OCH_3$) or ethoxy group (—$OCH_2CH_3$) is particularly preferable. A silane coupling agent with an —X group of another functional group is low in hydrolysability of the —X group or too high in hydrolysability, so is not preferred in the present invention. Note that, when the precoating-use composition (β) is not water-based, to break down the hydrolysable functional groups of the silane coupling agent, sometimes a small amount or water and further a hydrolysis use catalyst is added in advance to the precoating-use composition (β).

In the above molecular structure, the —R group is a $C_1$ to $C_3$ alkyl group. When the —R group is a methyl group or ethyl group, compared with a bulky n-propyl group or isopropyl group, the approach of water molecules to the —X group in the composition is inhibited. An —X group is relatively easily hydrolyzed, so is preferable. Among these, a methyl group is particularly preferable. A silane coupling agent with an —R group of another functional group is extremely low in hydrolysability of the —X group or is too high in reactivity, so is not preferred in the present invention.

In the molecular structure, the "m" which shows the number of substituents is an integer of 1 to 3. The larger the number of the hydrolysable —X groups, the greater the number of reaction points with the metal surface, so the "m" which shows the number of substituents is preferably 2 or 3.

In the molecular structure of the above silane coupling agent (s), —Z— is a $C_1$ to $C_9$, $N_0$ to $N_2$, $O_0$ to $O_2$ hydrocarbon chain. Among these, a $C_2$ to $O_5$, $N_0$ or $N_0$, $O_0$ or $O_1$ hydrocarbon chain is excellent in the balance of the dispersability of the silane coupling agent in water or a solvent and reactivity, so is preferred. If the number of carbon atoms of —Z— is 10 or more, the number of nitrogen atoms is 3 or more or the number of oxygen atoms is 3 or more, the balance of the dispersability of the silane coupling agent in water or a solvent and reactivity is poor, so this is not preferred in the present invention.

In the molecular structure Y—Z—$SiX_mR_{3-m}$ of the silane coupling agent (s), the —Y group which serves as the reaction point with the functional groups of the resin (A1) or other coexisting resin is not particularly limited so long as reacting with the resin (A1) or other coexisting resin, but from the high level of the reactivity, an epoxy group, amino group, mercapto group, or methylidene group ($H_2C$=) is preferable and an epoxy group or amino group is particularly preferable.

When forming the covering coating film of the present invention, if the —$SiX_m$ groups of the molecule of the silane coupling agent (s) which is shown by the molecular structure Y—Z—$SiX_mR_{3-m}$ react with the metal surface etc. and, further, the —Y groups react with the resin (A1) etc., the result becomes the resin ($A2_{Si}$) which is shown by the general formula (I). That is, at least part of the —Si—X at the ends of the molecules of the silane coupling agent (s) are hydrolyzed to form —Si—OH (silanol groups), at least part of that metal surface or hydroxyl groups of other silane coupling agent (s) molecules are combined with by dehydration polycondensation, and, through ether bonds, covalent bonds —Si—O-Me (Me indicates metal atoms) or —Si—O—Si*— (Si* indicates Si atoms derived from other silane coupling agent molecules) are produced. On the other hand, the —Y group at the other end of the molecule of the silane coupling agent (s) reacts with the functional groups of the resin (A1) and forms a bond of A1~Z resulting in the resin ($A2_{Si}$) which has a structure of the following general formula (I). If the numbers of the —O—, —OH, —X, and —R groups which bond with the Si atoms in the resin ($A2_{Si}$) when these reactions end and the ($A2_{Si}$) is produced are "a", "b", "c", and "d", a+b+c=m. Further, the —R groups in the silane coupling agent (s) remain in the resin (A2) without being involved in the above reaction, so the number "d" of —R group becomes d=3-m=3-(a+b+c), a+b+c+d=3. Note that, in the general formula (I), the notation "A1~Z" indicates A1 and Z are bonded through the functional groups of the two by covalent bonds.

As specific examples of the silane coupling agent (s), as ones which have molecular structures which are shown by the general formula Y—Z—$SiX_mR_{3-m}$ (—X group is a $O_1$ to $C_3$ hydrolysable alkoxy group, hydrolysable halogeno group, or hydrolysable acetoxy group, —R group is a $C_1$ to $C_3$ alkyl group, "m" indicating the number of substituents is an integer of 1 to 3, —Z— is a $C_1$ to $C_9$, $N_0$ to $N_2$, $O_0$ to $O_2$ hydrocarbon chain, and —Y group is a functional group which reacts with the resin (A1)), for example, vinyltrimethoxysilane, vinyltriethoxysilane, 3-aminopropyltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-glycidoxypropyltriethoxysilane, 3-glycidoxypropylmethyldiethoxysilane, 3-glycidoxypropyltrimethoxysilane, N-2-(aminoethyl)-3-aminopropyltrimethoxysilane, N-2-(aminoethyl)-3-aminopropyltriethoxysilane, N-2-(aminoethyl)-3-aminopropylmethyl-dimethoxysilane, 2-(3,4-epoxycyclohexyl)ethyl-trimethoxysilane, N-phenyl-3-aminopropyltrimethoxysilane, 3-mercaptopropyltrimethoxysilane, etc. may be mentioned.

In the present invention, when forming the coating film (α) which contains the organic resin (A) on a metal surface, the precoating-use composition (β) which is used preferably contains a silane coupling agent (s) in 1 to 100 parts by mass with respect to 100 parts by mass of the resin (A1). If less than 1 part by mass, the amount of the silane coupling agent (s) is small and the cross-linked structure by the silane coupling agent is not developed that much, so a sufficiently denseness coating film cannot be obtained and the corrosion resistance may become insufficient or the working adhesion with a metal surface etc. may become insufficient. On the other hand, if over 100 parts by mass, the effect of improvement of adhesion becomes saturated and more than the necessary amount of expensive silane coupling agent is used, so not only is the result uneconomical, but also the stability of the precoating-use composition may be lowered.

In the present invention, the organic resin (A) preferably contains the resin (A1), or furthermore the resin ($A2_{Si}$) in total, in 50 to 100 mass % of the resin (A), more preferably contains the resin (A1) and the resin ($A2_{Si}$) in total in 75 to 100 mass % of the organic resin (A). If the total of the resin (A1) and the resin ($A2_{Si}$) is less than 50 mass % of the organic resin (A), the denseness of the coating film and the adhesion with a metal surface may become insufficient and the desired corrosion resistance and coating film adhesion or the flexibility of the coating film when working the sheet may not be able to be obtained.

In the present invention, the coating film (α) which contains the resin (A1) and the resin ($A2_{Si}$) preferably contains, with respect to 100 parts by mass of the total of the resins (A1) and ($A2_{Si}$), 0.1 to 30 parts by mass of Si atoms which form the —C—Si—O— bonds in the resin ($A2_{Si}$). If less than 0.1 part by mass, the amount of —C—Si—O— bonds which govern the denseness of the coating film, the adhesion with a metal surface etc., and flexibility of the coating film when working the metal sheet is small and there is a possibility that a sufficient corrosion resistance or adhesion may not be obtained. Further, if over 30 parts by mass, the effect of improvement of adhesion with a metal surface etc. become saturated and more than the necessary amount of expensive silane coupling agent is used for forming the coating film, so the result is uneconomical and the stability of the precoating-use composition is sometimes lowered. Note that, the Si atoms which form the —C—Si—O— bonds can be identified and quantified by utilizing the FT-IR spectrum of the coating film on the metal sheet or $^{29}$Si-NMR or other analysis methods.

As already explained, the resin (A1) is contained as one ingredient of the precoating-use composition (β) which is used for the coating film (α) of the present invention in an amount of 50 to 100 mass % of its nonvolatiles. After application to the metal sheet and formation of the coating film (α), the organic resin (A) in the coating film is comprised of the resin (A1) or furthermore its reaction derivative (A2). The resin (A1), as already explained, is not particularly limited in type or structure so long as stably present in the precoating-use composition (β), but is a resin which includes at least one type of functional group selected from a carboxyl groups and a sulfonic acid group in its structure. That is, the organic resin (A) in the coating film (α) includes the resin (A1) which includes at least one type of functional group selected from a carboxyl group and sulfonic acid group in its structure or a derivative (A2) of that resin.

The reason why the resin (A1) is a resin which includes at least one type of functional group selected from a carboxyl group and a sulfonic acid group in its structure is as follows:

The precoating-use composition (β) contains the resin (A1) which forms at least part of the organic resin (A) after film formation. If the precoating-use composition (β) is water-based, during storage of the precoating-use composition (β) or in an environment with much water right after coating, the high polarity, extremely highly hydrophilic carboxyl group or sulfonic acid group parts which are present in the low polarity structure of the resin (A1) which is mainly comprised of a hydrocarbon chain extend in the water and are hydrated with the surrounding water. As a result, the resin (A1) easily disperses and stabilizes in the precoating-use composition (β). Further, these carboxyl groups or sulfonic acid groups are adsorbed at the surfaces of the polar non-oxide ceramic particles (B) which are coexisting in the precoating-use composition and have the effect of preventing agglomeration and maintaining the dispersion of the non-oxide ceramic particles (B).

In general, a water-based coating differs from an organic solvent-based coating in that it contains a large amount of water and is high in polarity during storage and right after application of the coating, but when the water evaporates in the coating film forming process, the atmosphere in the coating greatly changes from a high polarity to a low polarity. In the case of the present invention, if, due to the carboxyl groups or sulfonic acid groups in the structure of the resin (A1), the water evaporates in the process of coating film formation and the polarity sharply drops, at least part of the carboxyl groups or sulfonic acid groups will be desorbed from the metal surface and shrink in a coil shape. On the other hand, the low polarity resin chain part of the resin (A1) extends and forms a 3D barrier layer so as to perform the role of preventing agglomeration of non-oxide ceramic particles (B) with each other.

In this way, if there is high polarity, extremely high hydrophilic carboxyl group or sulfonic acid group in the low polarity structure of the resin (A1) mainly comprised of hydrocarbon chains, groups or chains matching that polarity will extend in accordance with the change in polarity during storage of the water-based coating or in the coating (coating film) at the time of formation of the coating film. The dispersability of the non-oxide ceramic particles becomes easy to maintain.

On the other hand, when the precoating-use composition (β) is organic solvent-based, if there are high polarity, extremely high hydrophilic carboxyl groups or sulfonic acid groups in the low polarity structure of the resin (A1) mainly comprised of hydrocarbon chains, these are adsorbed at the surface of the polar non-oxide ceramic particles (B) coexisting in the precoating-use composition. In the organic solvent, the low polarity resin chain part of the resin (A1) extends and the carboxyl groups or sulfonic acid groups in the structure of the resin separate from each other, so there is the effect of preventing agglomeration of non-oxide ceramic particles (B) and maintaining dispersability in the precoating-use composition and in the process of forming the coating film.

As other merits of the resin (A1) and the organic resin (A) containing a carboxyl group or sulfonic acid group, inclusion of these functional groups improves the adhesion with the substrate metal sheet (in the case of priming, the primed layer) and improves the corrosion resistance, workability (coating film adhesion of worked part when working metal sheet, crack resistance, color fastness, etc.), and scratch resistance of the coating film (α).

When the resin which contains the carboxyl group or sulfonic acid group is a polyester resin which contains a sulfonic acid group in its structure, the polyol, polyhydric carboxylic acid, and sulfonic acid-group containing compound which is used as the starting material for synthesizing the resin is not particularly limited. As the polyol and polyhydric carboxylic acid, the already illustrated ones may be used. Further, as the sulfonic acid group-containing compound, for example, 5-sulfoisophthalic acid, 4-sulfonaphthalene-2,7-dicarboxylic acid, 5(4-sulfophenoxy)isophthalic acid, or other dicarboxylic acids containing sulfonic acid groups or 2-sulfo-1,4-butanediol, 2,5-dimethyl-3-sulfo-2,5-hexyldiol or other glycols may be used.

The sulfonic acid group indicates a functional group expressed by —$SO_3H$. This may be neutralized by an alkali metal, amine including ammonia, etc. (for example, 5-sulfosodium isophthalic acid, dimethyl 5-sulfosodium isophthalate, etc.) When neutralizing it, an already neutralized sulfonic acid group may be introduced into the resin or a sulfonic acid group may be introduced into the resin, then neutralized. When the precoating-use composition (β) is water-based, to make the resin uniformly finely disperse in the water, the number of sulfonate groups which are neutralized by alkali metals, amines including ammonia, etc. is preferably greater than the number of sulfonic acid groups not neutralized. The reason why is that sulfonate groups which are neutralized by alkali metals, amines including ammonia, etc. easily electrolytically disassociate in water and are hydrated, so a resin which includes a large amount of these groups in its structure easily uniformly finely disperses in water. Among these, sulfonic acid metal salt groups which are neutralized by Li, Na, K, or other alkali metals suppress agglomeration of non-oxide ceramic particles (B) during storage of the water-based precoating-use composition (β) or in an environment with a large water content right after coating and improve adhesion of the coating film (α) and substrate, so are particularly preferred. Sodium sulfonate groups are most preferable.

The amount of use of dicarboxylic acid or glycol which contains the sulfonic acid groups is preferably 0.1 to 10 mol % with respect to the entire polyhydric carboxylic acid component or entire polyol component. If less than 0.1 mol %, during storage of the water-based precoating-use composition (β) or in an environment with a large water content right after coating, there are little sulfonic acid group parts for stabilizing the dispersion of the resin including the carboxyl group or sulfonic acid group and a sufficient resin dispersability may not be able to be obtained. Further, the amount of the sulfonic acid groups which are adsorbed at the non-oxide ceramic particles (B) coexisting in the precoating-use composition is small, so the effect of preventing agglomeration of non-oxide ceramic particles may be insufficient. Further, the amount of sulfonic acid groups which act on the substrate metal sheet (in the case of priming, the primed layer) is small, so the effect of improvement of the adhesion or corrosion resistance sometimes cannot be obtained. If over 10 mol %, the amount of water which the coating film holds due to the sulfonic acid groups increases and the corrosion resistance will sometimes fall. If considering the balance of performance, 0.5 to 5 mol % in range is more preferable.

When the resin which contains the carboxyl group or sulfonic acid group is a polyester resin which contains a carboxyl group in its structure, the method in the case of introducing the carboxyl group to the polyester resin is not particularly limited, but, for example, the method of polymerizing the polyester resin, then selecting and later adding, at ordinary pressure and a nitrogen atmosphere, one or more compounds from trimellitic anhydride, phthalic anhydride, pyromellitic anhydride, succinic anhydride, 1,8-naphthalic anhydride, 1,2-cyclohexanedicarboxylic anhydride, cyclohexane-1,2,3,4-tetracarboxylic acid-3,4-anhydride, ethyleneglycolbisanhydrotrimellitate, 5-(2,5-dioxotetrahydro-3-furanyl)-3-methyl-3-cyclohexene-1,2-dicarboxylic anhydride, naphthalene-1,4,5,8-tetracarboxylic anhydride, etc., the method of introducing these acid anhydrides to a polyester in the oligomer state before rendering it high in molecular weight, then rendering it high in molecular weight by polycondensation under reduced pressure, etc. may be mentioned.

The carboxyl group indicates a functional group which is expressed by —COOH. This may be neutralized by an alkali metal, amines including ammonia, etc. When neutralizing it, an already neutralized carboxyl group may be introduced into the resin or a carboxyl group may be introduced into the resin, then neutralized. When the precoating-use composition (β) is water-based, to make the resin uniformly finely disperse in the water, the number of carboxylate groups which are neutralized by alkali metals, amines including ammonia, etc. is preferably greater than the number of carboxylic acid groups not neutralized. The reason why is that carboxylate groups which are neutralized by alkali metals, amines including ammonia, etc. easily electrolytically disassociate in water and are hydrated, so a resin which includes a large amount of these groups in its structure easily uniformly finely disperses in water.

The amount of introduction of the carboxyl groups is not particularly limited, but by acid value, 0.1 to 50 mgKOH/g in range is preferable. If less than 0.1 mgKOH/g, during storage of the water-based precoating-use composition (β) or in an environment with a large water content right after coating, there are little carboxyl group parts for stabilizing the dispersion of the resin including the carboxyl group or sulfonic acid group and a sufficient resin dispersability may not be able to be obtained. Further, the amount of the carboxyl groups which are adsorbed at the non-oxide ceramic particles (B) coexisting in the precoating-use composition is small, so the effect of preventing agglomeration of non-oxide ceramic particles may be insufficient. Further, the amount of carboxyl groups which act on the substrate metal sheet (in the case of priming, the primed layer) is small, so the effect of improvement of the adhesion or corrosion resistance sometimes cannot be obtained. If over 50 mgKOH/g, the amount of water which the coating film holds due to the carboxyl groups increases and the corrosion resistance will sometimes fall. If considering the balance of performance, 0.5 to 25 mgKOH/g in range is more preferable.

Further, the organic resin (A) preferably includes at least one type of functional group selected from an ester group, urethane group, and urea group in its structure so as to improve all of the workability, scratch resistance, and corrosion resistance of the coating film (α). Such a coating film (α) can be obtained by the resin including carboxyl groups or sulfonic acid groups in the coating film (α) including at least one type of functional group selected from an ester group, urethane group, and urea group in its structure or by the resin reacting with the curing agent or cross-linking agent etc. coexisting in the precoating-use composition (β) to form a derivative having an ester group, urethane group, or urea group.

To improve all of the workability, scratch resistance, and corrosion resistance, it is important to design a resin which is excellent in both elongation and strength and is excellent in adhesion with the substrate metal sheet (in the case of priming, the primed layer), but by introducing functional groups which have a relatively high cohesive energy in its structure, it is possible to design a resin which is excellent in elongation and strength giving excellent workability and scratch resistance and excellent in adhesion and blocking of corrosive factors (denseness of coating) giving excellent corrosion resistance. When stressing among these the workability and the corrosion resistance, a resin which contains an ester group which has a suitable cohesive energy in its structure is preferable. When stressing the scratch resistance and corrosion resistance, a resin which contains a urethane group or urea group which has a high cohesive energy in its structure is preferable. To enhance all of the workability, scratch resistance, and corrosion resistance, a resin which contains both an ester group and a urethane group or a resin which contains an ester group, urethane group, and urea group is more preferable. The resin which contains at least one type of functional group selected from an ester group, urethane group, and urea group in its structure is not particularly limited, but, for example, a polyester resin which contains an ester group, a polyurethane resin which contains a urethane group, a polyurethane resin which contains both a urethane group and a urea group, etc. may be mentioned. These may be used as single types or as two or more types mixed. For example, it is possible to use a polyester resin which contains an ester group and a polyurethane resin which contains both a urethane group and a urea group mixed together.

If the organic resin (A) contains at least one type of functional group selected from an ester group, urethane group, and urea group in its structure, the content of the resin which contains at least one type of functional group selected from an ester group, urethane group, and urea group in its structure is preferably 60 to 100 mass % of the resin which contains a carboxyl group or sulfonic acid, more preferably 80 to 100 mass %. If less than 60 mass %, the workability and scratch resistance and the corrosion resistance may not be able to be both achieved.

The organic resin (A) is preferably a resin which is cured by a curing agent (C). The curing agent (C) is not particularly limited so long as curing the organic resin (A), but among those already illustrated as cross-linking agents of the resin (A1), at least one type of cross-linking agent which is selected from a melamine resin, which is one type of amino resin, or a polyisocyanate compound may be used as the curing agent (C).

A melamine resin is a product obtained by condensation of melamine and formaldehyde in which part or all of the methylol groups are etherified by methanol, ethanol, butanol, or another lower alcohol. The polyisocyanate compound is not particularly limited. For example, compounds already illustrated as cross-linking agents of the resin (A1) such as hexamethylene diisocyanate, isophoron diisocyanate, xylylene diisocyanate, tolylene diisocyanate, etc. may be mentioned. Further, as blocked forms, a blocked polyisocyanate compound such as blocked hexamethylene diisocyanate, blocked isophoron diisocyanate, blocked xylylene diisocyanate, blocked tolylene diisocyanate, etc. may be mentioned. These curing agents may be used alone as single types or may be used jointly as two or more types.

The content of the curing agent (C) is preferably 5 to 35 mass % of the organic resin (A). If less than 5 mass %, the baking/curing becomes insufficient and the corrosion resistance and scratch resistance sometimes fall. If over 35 mass %, the baking/curing becomes excessive and the corrosion resistance and workability sometimes fall.

From the viewpoint of the scratch resistance of the coating film ($\alpha$), the curing agent (C) preferably contains a melamine resin (C1). The content of the melamine resin (C1) is preferably 30 to 100 mass % of the curing agent (C). If less than 30 mass %, sometimes the obtained coating film ($\alpha$) falls in scratch resistance.

<Non-Oxide Ceramic Particles (B)>

The non-oxide ceramic particles (B) which are contained in the coating film of the present invention must be a boride ceramic, carbide ceramic, nitride ceramic, or silicide ceramic with a 25° C. electrical resistivity (volume resistivity, specific electrical resistance) of $0.1 \times 10^{-6}$ to $185 \times 10^{-6}$ $\Omega$cm in range. The "non-oxide ceramic" referred to here is a ceramic which is comprised of elements or compounds not containing oxygen. Further, the "boride ceramic", "carbide ceramic", "nitride ceramic", and "silicide ceramic" referred to here are non-oxide ceramic which respectively have boron B, carbon C, nitrogen N, and silicon Si as main nonmetal component elements. Among these, none can be found with a 25° C. electrical resistivity of less than $0.1 \times 10^{-6}$ $\Omega$cm. Further, if the 25° C. electrical resistivity (volume resistivity, specific electrical resistance) exceeds $185 \times 10^{-6}$ $\Omega$cm, a large amount must be added to impart sufficient conductivity to the resin coating film. During use of the precoated metal sheet of the present invention, a large number of conduction paths for corrosive current which pass through coating film are formed and the corrosion resistance deteriorates, so this is not suitable. Further, with a large amount of addition, the coating film appearance is dominated by the color of the large amount of conductive particles. Even if adding a coloring pigment, the desired color tone cannot be colored to.

The non-oxide ceramic particles (B) which are contained in the coating film of the present invention are preferably a boride ceramic, carbide ceramic, nitride ceramic, or silicide ceramic with a 25° C. electrical resistivity of $0.1 \times 10^{-6}$ to $100 \times 10^{-6}$ $\Omega$cm in range. These particles have a higher conductivity than particles with a 25° C. electrical resistivity of over $100 \times 10^{-6}$ $\Omega$cm to $185 \times 10^{-6}$ $\Omega$cm in range, so the amount of addition for imparting sufficient conductivity to the resin coating film may be made smaller and as a result the detrimental effect on the corrosion resistance or coating film appearance of the precoated metal sheet becomes smaller. Note that, by way of reference, pure metal has an electrical resistivity of $1.6 \times 10^{-6}$ $\Omega$cm (Ag alone) to $185 \times 10^{-6}$ $\Omega$cm (Mn alone) in range. It is learned that the non-oxide ceramic which are used as conductive particles in the present invention (electrical resistivity $0.1 \times 10^{-6}$ to $185 \times 10^{-6}$ $\Omega$cm) have excellent conductivities of the same extent as pure metals.

As the non-oxide ceramic which can be used in the present invention, the following may be illustrated: That is, as boride ceramic, borides of transition metals or rare earth elements of Group IV (Ti, Zr, Hf), Group V (V, Nb, Ta), or Group VI (Cr, Mo, W) of the Periodic Table, as carbide ceramic, carbides of Group IV, Group V, and Group VI transition metals and rare earth elements or B or Si, as nitride ceramic, nitrides of Group IV, Group V, and Group VI transition metals or rare earth elements, as silicide ceramic, Group IV, Group V, and Group VI transition metals or rare earth elements, or mixtures of two or more types of compounds selected from these borides, carbides, nitrides, and silicides or these ceramic mixed with metal binding materials and sintered to obtain cermets etc. may be illustrated.

When preparing the coating film ($\alpha$) from the water-based coating, the metal forming part of the cermet preferably has a standard electrode potential of −0.3V or more and water resistance. If the metal forming part of the cermet has a standard electrode potential of less than −0.3V, if the precoated metal sheet which has this cermet powder in its coating film is used in a moist environment for a long period of time, a rust layer or a thick oxide insulating layer may form on the surface of the powder, the interface between the powder and resin may separate, and the coating film may lose conductivity. As examples of such water resistant cermet powder, WC-12Co, WC-12Ni, TiC-20TiN-15WC-10Mo$_2$C-5Ni, etc. may be mentioned. The standard electrode potentials of Co and Ni are respectively −0.28V, −0.25V or both more precious than −0.3V. Both metals have water resistance.

Among the non-oxide ceramic, Cr-based ceramic are not available on the market due to concerns over the environmental load. Further, most rare earth element-based and Hf-based ceramic are high in price. Therefore, in the present invention, it is preferable to use a boride, carbide, nitride, or silicide of elements other than these in the group such as Ti, Zr, V, Nb, Ta, Mo, or W or carbides of B or Si or mixtures of two or more types selected from these.

Furthermore, from the viewpoint of the existence of industrial products and the stable availability in the domestic and foreign markets, price, electrical resistivity, etc., the following non-oxide ceramic are more preferred. That is, Mo$_2$B (electrical resistivity of $40 \times 10^{-6}$ $\Omega$cm), MoB (same, $35 \times 10^{-6}$ $\Omega$cm), MoB$_2$ (same, $45 \times 10^{-6}$ $\Omega$cm), NbB (same, $6.5 \times 10^{-6}$ $\Omega$cm), NbB$_2$ (same, $10 \times 10^{-6}$ $\Omega$cm), TaB (same, $100 \times 10^{-6}$ $\Omega$cm), TaB$_2$ (same, $100 \times 10^{-6}$ $\Omega$cm), TiB (same, $40 \times 10^{-6}$ $\Omega$cm), TiB$_2$ (same, $28 \times 10^{-6}$ $\Omega$cm), VB (same, $35 \times 10^{-6}$ $\Omega$cm), VB$_2$ (same, $150 \times 10^{-6}$ $\Omega$cm), W$_2$B$_5$ (same, $80 \times 10^{-6}$ $\Omega$cm), ZrB$_2$ (same, $60 \times 10^{-6}$ $\Omega$cm), B$_4$C (same, $0.3 \times 10^{-6}$ $\Omega$cm), MoC (same, $97 \times 10^{-6}$ $\Omega$cm), Mo$_2$C (same, $100 \times 10^{-6}$ $\Omega$cm), Nb$_2$C (same, $144 \times 10^{-6}$ $\Omega$cm), NbC (same, $74 \times 10^{-6}$ $\Omega$cm), SiC (same, $107 \times 10^{-6}$ $\Omega$cm), Ta$_2$C (same, $49 \times 10^{-6}$ $\Omega$cm), TaC (same, $30 \times 10^{-6}$ $\Omega$cm), TiC (same, $180 \times 10^{-6}$ $\Omega$cm), V$_2$C (same, $140 \times 10^{-6}$ $\Omega$cm), VC (same, $150 \times 10^{-6}$ Ωcm), WC (same, 80×10⁻⁶ Ωcm), W₂C (same, 80×10⁻⁶ Ωcm), ZrC (same, 70×10⁻⁶ Ωcm), Mo₂N (same, 20×10⁻⁶ Ωcm), Nb₂N (same, 142×10⁻⁶ Ωcm), NbN (same, 54×10⁻⁶ Ωcm), Ta₂N (same, 135×10⁻⁶ Ωcm), TiN (same, 22×10⁻⁶ Ωcm), ZrN (same, 14×10⁻⁶ Ωcm), Mo₃Si (same, 22×10⁶ Ωcm), MoSi₂ (same, 22×10⁻⁶ Ωcm), NbSi₂ (same, 6.3×10⁻⁶ Ωcm), Ta₂Si (same, 124×10⁻⁶ Ωcm), TaSi₂ (same, 8.5×10⁻⁶ Ωcm), TiSi (same, 63×10⁻⁶ Ωcm), TiSi₂ (same, 123×10⁻⁶ Ωcm), V₅Si₃ (same, 115×10⁻⁶ Ωcm), VSi₂ (same, 9.5×10⁻⁶ Ωcm), W₃Si (same, 93×10⁻⁶ Ωcm), WSi₂ (same, 33×10⁻⁶ Ωcm), ZrSi (same, 49×10⁻⁶ Ωcm), ZrSi₂ (same, 76×10⁻⁶ Ωcm), or mixtures of two or more types selected from these are preferably used.

Among these as well, non-oxide ceramic with an electrical resistivity at 25° C. of 0.1×10⁻⁶ to 100×10⁻⁶ Ωcm are particularly preferable. The reason is that these have higher conductivity than non-oxide ceramic with a 25° C. electrical resistivity of over 100×10⁻⁶ Ωcm to 185×10⁻⁶ Ωcm in range, so the amount of addition of particles for imparting sufficient conductivity to the resin coating film may be made smaller, only a few conduction paths for corrosion current which pass through the coating film are formed, and the corrosion resistance does not drop much at all. Further, due to the addition of the very small amount of particles, the coating film appearance is not dominated by the color of the conductive particles and even if adding a coloring pigment, the desired colored tone can be easily colored to.

The electrical resistivities which are given to the non-oxide ceramic are respectively representative values (documented values) of ceramic being sold and used as industrial materials. These electrical resistivities increase and decrease depending on the types or amounts of impurity elements which entering into the crystal lattices of the non-oxide ceramic, so when using the ceramics in the present invention, for example, it is sufficient to use them after measuring the 25° C. electrical resistivity based on JIS K7194 by the four-terminal, four-probe method using a Mitsubishi Chemical resistance meter Loresta EP (Model MCP-T360) and ASP probes and the constant current application method and confirming that it is 0.1×10⁻⁶ to 185×10⁻⁶ Ωcm in range.

The non-oxide ceramic particles (B) preferably have particle shapes of spherical particles or quasi spherical particles (for example, ellipsoid shapes, egg shapes, rugby ball shapes, etc.) or polyhydral particles (for example, soccer ball shapes, dice shapes, various brilliant cut gemstone shapes, etc.) or other such shapes close to spheres. Elongated shapes (for example, rod shapes, needle shapes, fiber shapes, etc.) or planar shapes (for example, flake shapes, plate shapes, thin slice shapes, etc.) are not suitable for the applications of the present invention since in the coating process, they align in parallel on the coating surface or settle near the interface of the substrate and coating and make it difficult to form effective conduction paths passing through the coating film in the thickness direction.

The non-oxide ceramic particles (B) are not particularly limited in average particle size, but in the precoating-use composition of the present invention, they are preferably present as particles with a volume average diameter of 0.05 to 8 μm and are more preferably present as particles with a volume average diameter of 0.2 to 5 μm. The dispersed particles having these volume average diameters may be single particles or may be secondary particles comprised of a plurality of single particles strongly agglomerated so long as stably present in the precoating-use composition in the process of production of the precoating-use composition, at the time of storage and transport, and in the process of coating the coat-use substrate metal sheet (in the case of priming the metal surface, the primed layer). In the process of coating the precoating-use composition on the substrate, there is no problem even if the (B) particles agglomerate along with the film formation and become larger in volume average diameter in the coating film.

Note that, the "volume average diameter" referred to here means the average size, based on volume, which is found from the volume distribution data of the particles. This is because while it is possible to find this using any generally known particle size distribution measurement method, it is preferable to use the average value of the equivalent spherical diameter which is measured by the Coulter method (aperture electrical resistance method). The reason is that the Coulter method, compared with other methods of measurement of the distribution of particle size (calculation from volume distribution obtained by laser diffraction scattering method, conversion of circular area equivalent diameter distribution obtained by image analysis method to volume distribution, calculation from mass distribution obtained by centrifugal precipitation method, etc.), enables accurate, high precision measurement with almost no differences in measurement values due to the manufacturer or model of the measuring equipment. In the Coulter method, test particles are suspended in an electrolyte aqueous solution, a constant current is run through an aperture of a glass tube, and particles pass through the aperture by negative voltage. When a particle passes through the aperture, the volume of the electrolyte aqueous solution which the particle displaces (=volume of particle) causes the electrical resistance at the aperture to increase. If applying a constant current, the change in resistance at the time of passage of a particle is reflected in a change in voltage pulse, so by counting this voltage pulse height one at a time, it is possible to directly measure the volume of the individual particles. Particles are usually irregular in shape, so a sphere of a volume the same as a particle is assumed and the size of that sphere (=equivalent spherical diameter) is converted to. The method of measurement of the equivalent spherical diameter by such a Coulter method is well known and, for example, is described in detail in the web page of the official Internet site of Beckman Coulter [http://www.beckmancoulter.co.jp/product/product03/Multisizer3.html (Precision Particle Size Distribution Measurement System Multisizer 3).

Non-oxide ceramic particles with a volume average diameter of less than 0.05 μm are not only more expensive than larger non-oxide ceramic particles, but also have extremely large specific areas, so, for example, even if using a wet dispersant in a water-based or organic solvent-based precoating-use composition, it is difficult to wet the particle surface and disperse the particles. Further, non-oxide ceramic particles with a volume average diameter of over 8 μm settle faster and more easily in a water-based or organic solvent-based precoating-use composition than smaller non-oxide ceramic particles (clear from Stokes equation). Therefore, sometimes it is difficult to secure stability of dispersion and particles settle, agglomerate, and solidify in a short time.

When defining the volume average diameter of the non-oxide ceramic particles (B) which are dispersed in the coating film (α) as "c" μm and the thickness of the coating film (α) as "b" μm, the relation of $0.5 \leq c/b \leq 1.5$ is preferably satisfied. FIG. 1 is a schematic view of the cross-section of the conductive, corrosion resistant precoated metal sheet of the present invention. (A) indicates an organic resin, (B), (B') indicate non-oxide ceramic particles, (C) indicates parts cross-linked by a curing agent, and (γ) indicates the metal sheet. (B) indicates particles with ratios c/b of particle size to thickness of 0.5 or more. In this case, conductivity in the thickness direction is secured. (B') indicates particles with ratios c/b of particle size to thickness of less than 0.5. In this case, sometimes conductivity is not sufficiently secured. If the ratios c/b of particle size to thickness exceed 1.5, sometimes the corrosion resistance and the workability fall.

<Rust Preventive Agent>

In the case of a water-based precoating-use composition, the organic resin (A) preferably contains a polyphenol compound as a rust preventive agent. A polyphenol compound is a compound which has two or more phenolic hydroxyl groups bonded to a benzene ring or its condensate. It can be bonded to a metal surface by a chelation action by coordinate bonds and, further, can be bonded with hydrophilic groups of a coexisting water-based resin by hydrogen bonds. By blending in such a polyphenol compound, the adhesion between the substrate constituted by the metal sheet (in the case of priming, the primed layer) and the coating film ($\alpha$) and the flexibility of the coating time at the time of the sheet being worked are strikingly improved and, in turn, the corrosion resistance of the worked part is also improved.

The polyphenol compound which is used in the present invention is not particularly limited so long as it can be uniformly dissolved or finely dispersed in the water-based precoating-use composition which is used for forming the covering coating film. Even if not water soluble or water dispersable, it may be used so long as able to penetrate between the hydrophobic chains of the resin (A1) coexisting in the water-based precoating-use composition ($\beta$) and able to uniformly finely disperse.

As the compound which has two or more phenolic hydroxyl groups bonded with a benzene ring, for example, gallic acid, pyrogallol, catechol, etc. may be mentioned. The condensate of the compound which has two or more phenolic hydroxyl groups bonded with a benzene ring is not particularly limited, but, for example, polyphenol compounds etc. which are usually called tannic acid and which are widely distributed in the plant kingdom may be mentioned. "Tannic acid" is the general name for the aromatic compounds, widely distributed in the plant kingdom, of a complicated structure which have a large number of phenolic hydroxyl groups. The tannic acid may be a hydrolysable tannic acid or a condensation type tannic acid. The tannic acid is not particularly limited. For example, hamamelis tannin, persimmon tannin, tea tannin, sumac gallnut tannin, gallnut tannin, myrobalan tannin, divi divi tannin, algarovilla tannin, valonia tannin, catechin tannin, etc. may be mentioned. The polyphenol compound may be used as single types or may be used jointly as two or more types.

The polyphenol compound preferably is contained in 1 to 100 parts by mass with respect to 100 parts by mass of the organic resin (A). If less than 1 part by mass, the amount of the polyphenol compound is insufficient, so a sufficient coating film adhesion cannot be obtained or as a result the worked parts may become insufficient in corrosion resistance. If over 100 parts by mass, the amount of the polyphenol compound in the coating film is too great and therefore the coating film adhesion at the time of being worked, the coating film flexibility, and the corrosion resistance of the worked parts fall or the stability of the precoating-use composition is sometimes lowered.

In the case of a water-based and organic solvent-based precoating-use composition, the organic resin (A) preferably contains, as a rust preventive agent, one or more types of compounds which are selected from the group of phosphoric acid and hexafluorometal acids. These phosphoric acid and hexafluorometal acids may be used alone or may be used jointly. These acids activate the metal surface by etching and promote the action of the silane coupling agent (s) or the polyphenol compound on the metal surface. Further, phosphoric acid has, in addition to the above action, the action of forming a phosphate layer on a metal surface so as to passivate it, so improves the corrosion resistance. Further, hexafluorometal acids, in addition to the above action, enable the formation of a stable thin film containing oxides of a metal supplied from hexafluorometal acids on the metal surface on which the coating film is formed and, as a result, improves the corrosion resistance. The phosphoric acid which can be used in the present invention is not particularly limited. For example, o-phosphoric acid, p-phosphoric acid (linear polymer of polymerization degree of o-phosphoric acid of up to 6 alone or mixture of two or more types of these), or m-phosphoric acid (cyclic polymer of polymerization degree of o-phosphoric acid of 3 to 6 alone or a mixture of two or more types of these), may be mentioned. The phosphoric acid may be used in single types or may be jointly used as two or more types. A polyphosphoric acid with a polymerization degree larger than 2 can be easily industrially obtained as a mixture of polyphosphoric acids with several polymerization degrees, so in the present invention, such a mixture may be used.

The hexafluorometal acids which can be used in the present invention are not particularly limited. For example, hexafluoro-phosphoric acid, hexafluorotitanic acid, hexafluorozirconic acid, hexafluorosilicic acid, hexafluoroniobic acid, hexafluoroantimonic acid, or their ammonium salts, potassium salts, sodium salts, calcium salts, magnesium salts, etc. may be mentioned. Hexafluorometal acids, in the above way, form stable thin films which contain metal oxides on metal surfaces, but to give rise to such effects, preferably include as the metals one or two or more elements which are selected from the group comprised of Ti, Si, Zr, and Nb. The hexafluorometal acids may be used as single types or may be jointly used as two or more types.

One or more acids selected from the group of phosphoric acid and hexafluorometal acids are preferably contained in 0.1 to 100 parts by mass with respect to 100 parts, by mass of the organic resin (A). If less than 0.1 part by mass, the action by these acids will be insufficient, so the corrosion resistance will sometimes drop. If over 100 parts by mass, the coating film will become fragile and cohesive failure of the coating film may cause the coating film adhesion when being worked and the flexibility of the coating film to drop.

In the case of a water-based and organic solvent-based precoating-use composition, the organic resin (A) preferably contains a phosphate compound as a rust preventive agent. By blending in this phosphate compound, when forming a coating film, an insoluble phosphate thin film can be formed on the metal surface. That is, if the melt dissolves due to the phosphoric acid ions of the phosphate, the pH will rise at the metal surface and, as a result, a settled film of the phosphate will be formed and the corrosion resistance will be improved.

The phosphate compound which can be used in the present invention is not particularly limited. For example, o-phosphoric acid, p-phosphoric acid (linear polymer of o-phosphoric acid up to polymerization degree 6 alone or mixture of two or more types of the same), m-phosphoric acid (cyclic polymer of o-phosphoric acid up to polymerization degree 3 to 6 alone or mixture of two or more types of the same), or other metal salts, phytic acid, phosphonic acid, phosphinic acid, and other organic metal salts may be mentioned. The type of cation is not particularly limited. For example, Cu, Co, Fe, Mn, Sn, V, Mg, Ba, Al, Ca, Sr, Nb, Y, Ni, Zn, etc. may be mentioned, but Mg, Mn, Al, Ca, and Ni are preferably used. The phosphate compound may be used alone as single types or may be jointly used as two or more types.

The phosphate compound is preferably contained in 0.1 to 100 parts by mass with respect to 100 parts by mass of the organic resin (A). If less than 0.1 part by mass, the action of the phosphate compound is insufficient, so the corrosion resistance sometimes falls. If over 100 part by mass, the coating film becomes fragile and cohesive failure of the coating film sometimes cause the coating film adhesion when worked and the coating film flexibility to fall.

In the case of a water-based and organic solvent-based precoating-use composition, the organic resin (A) preferably contains, as a rust preventive agent, metal oxide particles comprised of at least one type of metal element selected from the group of Si, Ti, Al, and Zr. By blending in these metal oxide particles, the corrosion resistance can be enhanced more.

As the metal oxide particles which can be used in the present invention, for example, silica particles, alumina particles, titania particles, zirconia particles, etc. may be mentioned. Ones with a volume average diameter of 1 to 300 nm or so are preferable. These may be used alone or may be jointly used in two or more types. Among these, silica particles are added when both improvement of the corrosion resistance of the coating and strengthening and toughening are required. The silica particles are not particularly limited, but the coating film is a thin film, so primary particle size 3 to 50 nm colloidal silica, fumed silica, or other silica particles are preferred.

The metal oxide particles are preferably contained in 1 to 100 parts by mass with respect to 100 parts by mass of the organic resin (A). If less than 1 part by mass, the amount of the metal oxide particles is insufficient, so sometimes the effect of raising the corrosion resistance cannot be obtained. If over 100 parts by mass, the coating film becomes fragile and coating film cohesive failure sometimes causes a drop in the coating film adhesion at the time of working and the flexibility of the coating film.

The above various types of rust preventive agents are preferably dissolved or dispersed and stabilized in suitable amounts in the precoating-use composition (β) and introduced into the organic resin (A) in the coating film (α) in advance.

<Coloring Pigment>

The coating film (α) may further contain a coloring pigment. The type of the coloring pigment is not particularly limited. As an inorganic coloring pigment, for example, titanium dioxide powder, alumina powder, Venetian Red, Burnt Sienna, and other iron oxide powder, zinc oxide powder, carbon black, graphite powder, coal dust, talc powder, Cadmium Yellow, Cadmium Red, Chrome Yellow, Cobalt Yellow, Cobalt Blue, Cerulean Blue, Cobalt Green, etc. may be used. As the organic coloring pigment, for example, Phthalocyanine Blue, Phthalocyanine Green, quinacridone, perylene, anthrapyrimidine, Carbazole Violet, anthrapyridine, Azo Orange, Flavanthrone Yellow, Isoindoline Yellow, Azo Yellow, Indanthrone Blue, Dibromanzathrone Red, Perylene Red, Azo Red, Anthraquinone Red, etc. may be used. Further, if able to give the coating film (α) the necessary coloring or gloss, feeling, and other appearance, for example, copper powder, tin powder, nickel powder, bronze (Cu—Sn-based alloy) powder, or other water resistant metal particles may be used as coloring pigments. Even aluminum powder or zinc powder etc. which are somewhat inferior in water resistance can be used as coloring pigments. Further, aluminum flakes, mica flakes, sheet-like iron oxide, glass flakes, and other flake-like bright materials, mica powder, metal coating mica powder, titanium dioxide coated mica powder, titanium dioxide coated glass powder, or other powdered bright materials can also be used.

<Preparation of Precoating-Use Composition (β)>

The method of production of the precoating-use composition (β) which is used for forming the coating film (α) of the present invention is not particularly limited, but, for example, the method of adding the ingredients forming the coating film (α) in water or an organic solvent, stirring them by a disperser, and thereby dissolving or dispersing them may be mentioned. In the case of a water-based precoating-use composition, to improve the solubility or the dispersability of the ingredients forming the coating film (α), if necessary it is also possible to add a known hydrophilic solvent etc.

In particular, in the case of a water-based precoating-use composition (β), in addition to the resin (A1) and the non-oxide ceramic particles (B), it is also possible to add various water-soluble or water-dispersable additives in accordance with need in a range not impairing the water-based nature or coatability of the coating. For example, the above various rust preventive agents, defoamers, settling preventive agents, leveling agents, wet dispersants, and other surfactants and thickeners, viscosity adjusters, etc. may also be added. Furthermore, to stabilize etc. the resin or other organic compounds or other component ingredients of the precoating-use composition, it is also possible to add a small amount of organic solvent not falling under the organic solvents defined by the enforcement regulations of the Labor Safety and Sanitation Act (Regulations Preventing Poisoning by Organic Solvents, Chapter 1, Article 1) (type 1 organic solvents, type 2 organic solvents, type 3 organic solvents, or compositions containing these organic solvents in over 5 mass %).

When forming the coating film (α) of the present invention from a water-based precoating-use composition (β), since it is a water-based precoating-use composition, the surface tension is higher compared with an organic solvent-based coating, the wettability with the substrate metal sheet (in the case of priming, the primed layer) or the non-oxide ceramic particles (B) is inferior, and when coating a predetermined amount to the substrate, uniform coatability and particle dispersability sometimes cannot be obtained. In such a case, the above wet dispersant or thickener may be added. As the wet dispersant, it is possible to use a surfactant which lowers the surface tension, but it is better to use a molecular weight 2000 or more high molecular weight surfactant (high molecular weight dispersant). A low molecular weight surfactant can move relatively easily through a resin coating film which contains moisture, so easily invites water adsorbed at the polar groups of the surfactant or solute oxygen, solute salt, or other corrosive factors to the metal surface through that water. Further, it bleeds out itself and easily elutes, so often causes deterioration of the rust-proofing ability of the coating film. On the other hand, a high molecular weight surfactant can be adsorbed at many points on the surface of a metal, ceramic particles, or pigment, so once adsorbed, is difficult to separate. This is effective for improving the wettability even in low concentrations. On top of this, the molecules are bulky, so have difficulty moving through the resin coating film and corrosive factors are not easily called up to the metal surface. In the section on <Organic Resin (A)>, part of the acrylic resins which are recommended for addition to the organic resin (A) have such a function as high molecular weight surfactants and have the effect of suppressing the settling of the non-oxide ceramic particles (B) and coloring pigment etc. in the water-based coating and causing uniform dispersion.

A thickener is sometimes added as a measure when a sufficient surface coverability cannot be obtained by a wet dispersant alone at a shedding location of the substrate surface or when the water-based precoating-use composition is too low in viscosity and the necessary coating film thickness cannot be secured. Most have molecular weights of several thousands or several tens of thousands. They are adsorbed at multiple points on the surface of the pigment etc. The thickener itself joins with itself to form a weak network structure and raises the viscosity of the precoating-use composition.

When the water-based precoating-use composition (β) contains high specific gravity non-oxide ceramic particles, coloring pigment, etc., in accordance with need, it is possible to add a viscosity adjuster which enables the coating to be given a thixotropic property. In the same way as the case of the thickener, this is adsorbed at many points on the surface of the pigment etc. in the water-based and creates a network structure. Such a viscosity adjuster has a molecular weight of an extremely high hundreds of thousands to millions, so forms a strong network structure having a large yield value in a water-based coating. Therefore, the coating is difficult to deform by a low shear velocity and is high in viscosity. On the other hand, if a large shear stress exceeding the yield value is given to the coating, the network structure collapses and the viscosity rapidly falls. Therefore, if adding a viscosity adjuster, at the time of storage or transport when the water-based precoating-use composition is in a substantially stationary state, the precoating-use composition is raised in viscosity to suppress settling of the heavy pigments. On the other hand, when flowing through pipes at a coating plant, when being coated on a substrate, or otherwise when a high shear stress (high shear velocity) is applied, the coating viscosity is lowered to facilitate flow.

In the case of an organic solvent-based precoating-use composition (β), the precoating-use composition comprised of the organic solvent in which a resin is dissolved is relatively high in viscosity and easily adjustable in viscosity. For this reason, the viscosity of the precoating-use composition can be easily and stably held at the 100 mPa·s which is considered advantageous for suppressing pigment precipitation, or more. Further, the non-oxide ceramic which is used as a conductive material is a substance which has hydrophobic locations at its surface as well, so in general dispersion in the organic solvent-based precoating-use composition is easy and, at the time of coating, coating is possible without settling of the non-oxide ceramic particles in the precoating-use composition, so this is preferable.

In the case where the organic solvent-based precoating-use composition (β) for forming the coating film has a viscosity of 100 to 2000 mPa·s, if coating the precoating-use composition by a roll coater or curtain coater on a metal sheet, then drying and baking it, the non-oxide ceramic particles will not easily settle, so this is more preferable. If the coating viscosity is less than 100 mPa·s, the non-oxide ceramic particles easily settle, while if over 2000 mPa·s, the viscosity will become too high and defects in appearance at the time of coating generally called "ribbing" are liable to occur. More preferably, the viscosity is 250 to 1000 mPa·s. The viscosity of the organic solvent-based precoating-use composition (β) can be measured by using a B-type viscosity meter at the same temperature as the temperature of the precoating-use composition at the time of coating by the roll coater or curtain coater.

The viscosity can be adjusted by the type of the organic solvent which is used and the amount of the solvent. As the organic solvent, a generally known solvent can be used, but a high boiling point organic solvent is preferable. On a production line of a precoated metal sheet, the baking time is short, so if using a low boiling point solvent, coating defects generally called "boiling" are liable to occur. The boiling point of the solvent is preferably 120° C. or more. As such high boiling point organic solvents, generally known solvents, for example, cyclohexane and the hydrocarbon-based organic solvent Sorbesso etc. may be used.

<Formation of Coating Film (α)>

The coating film (α) of the present invention, as explained in the section on <Coating Film (α)>, is preferably formed by the method of, when the precoating-use composition (β) is a water-based or organic solvent-based composition, coating the precoating-use composition on a metal sheet by the roll coat, groove roll coat, curtain flow coat, roller curtain coat, dipping, air knife, or other known coating method, then drying off the water content or solvent content of the wet coating. Among these, in the case of a water-based or organic solvent-based UV light curing type composition or electron beam curing type composition, it is preferable to use the above coating method to coat the metal sheet, then dry off the water content or solvent content and use UV light or electron beams to cause polymerization.

The baking and drying method when the precoating-use composition (β) is a water-based or organic solvent-based baking/curing type composition will be explained specifically next. When the precoating-use composition (β) is a water-based or organic solvent-based baking/curing type composition, the baking and drying method is not particularly limited. It is possible to heat the metal sheet in advance, heat the metal sheet after coating, or combine these for drying. The heating method is not particularly limited. Hot air, induction heating, near infrared rays, direct flame, etc. may be used alone or in combination.

Regarding the baking and drying temperature, when the precoating-use composition (β) is a water-based baking/curing type composition, the peak temperature of the metal sheet surface is preferably 120° C. to 250° C., more preferably 150° C. to 230° C., most preferably 180° C. to 220° C. If the peak temperature is less than 120° C., the coating film insufficiently cures and the corrosion resistance sometimes drops, while if over 250° C., the baking/curing becomes excessive and the corrosion resistance and workability sometimes fall. The baking and drying time is preferably 1 to 60 seconds, more preferably 3 to 20 seconds. If less than 1 second, the baking/curing is insufficient and the corrosion resistance sometimes drops, while if over 60 seconds, the productivity sometimes falls.

Further, when the precoating-use composition (β) is an organic solvent-based baking/curing type composition, the peak temperature of the metal sheet surface is preferably 180° C. to 260° C., more preferably 210° C. to 250° C. If the peak temperature is less than 180° C., the coating film insufficiently cures and the corrosion resistance sometimes drops, while if over 260° C., the baking/curing becomes excessive and the corrosion resistance and workability sometimes fall. The baking and drying time is preferably 10 to 80 seconds, more preferably 40 to 60 seconds. If less than 10 seconds, the baking/curing is insufficient and the corrosion resistance sometimes drops, while if over 80 seconds, the productivity sometimes falls.

Next, the method of film formation in the case where the precoating-use composition (β) is a water-based or organic solvent-based UV light curing type composition or electron beam curing type composition will be specifically explained. Each of these compositions is coated by a method similar to the case of the above water-based or organic solvent-based compositions, then the water content or solvent content of the wet coating is dried off and then UV light or electron beams are fired. The coating film is mainly formed by curing starting from the radicals which are generated by irradiating UV light or electron beams, so the drying temperature may be a drying temperature lower than the case of a baking/curing type composition. In the drying step, it is preferable to make most of the water content or solvent evaporate at a relatively low peak temperature of the metal surface of 80 to 120° C. or so, then fire UV light or electron beams at the surface.

UV light irradiation where the UV light curing type resin in the coating film is radically polymerized and cured by UV light is usually performed in an air atmosphere, in an inert gas atmosphere, in a mixed atmosphere of air and inert gas, etc., but in the UV light curing of the present invention, the UV light is preferably irradiated in a mixed atmosphere of air and inert gas which has been adjusted to an oxygen concentration of 10 vol % or less or in an inert gas atmosphere. Oxygen becomes a radical polymerization inhibitor, so if the concentration of oxygen in the atmosphere at the time of irradiation by UV light is low, there is little deactivation or blocking of the cross-linking reaction due to the addition of oxygen to the generated radicals and the UV light curing type composition which is used in the present invention is sufficiently rendered high in molecular weight through radical polymerization or cross-linking. For this reason, the adhesion to the non-oxide ceramic particles or the metal sheet rises and as a result the corrosion resistance of the coating film is improved compared with the case of curing by UV light in an air atmosphere. As the "inert gas" which is used here, a nitrogen gas, $CO_2$ gas, argon gas, and mixed gases of the same etc. may be illustrated.

As the UV light source, for example, by using a metal vapor discharge type high voltage mercury lamp, metal halide lamp or other rare gas discharge type xenon lamp or other electrodeless lamp using microwaves etc., UV light can be emitted. In the precoated metal sheet of the present invention, any lamp may be used so long as able to sufficiently cure a UV light curing type coating film and able to give the desired corrosion resistance and conductivity. Further, in general, the peak intensity or cumulative amount of the UV light which the coating film receives governs the curability of the coating film, but the UV light emitting conditions are not particularly limited so long as they enable the UV light curing type coating film to be sufficiently cured and the desired corrosion resistance to be obtained.

When the precoating-use composition (β) is an electron beam curing type composition, for electron beam curing, usual electron beam emission systems which are used in the fields of printing, painting, film coating, packaging, sterilization, etc. may be used. These generate hot electrons from hot filaments in a high vacuum, accelerate them by application of a high voltage, take out the obtained electron stream in an inert gas atmosphere, and fire it to a polymerizable substance. In the precoated metal sheet of the present invention, if an electron beam curing type coating film can be sufficiently cured and the desired corrosion resistance and conductivity can be obtained, any system may be used. Further, in general, the acceleration voltage of an electron beam which a coating film absorbs governs the depth by which the electron beam penetrates the coating film, while the amount of absorbed beams governs the polymerization speed (curability of coating film), but the conditions for irradiating the electron beam are not particularly limited so long as the beam can sufficiently cure the electron beam curing type coating film and the desired corrosion resistance can be obtained. However, in the case of radical polymerization using an electron beam, even if a trace amount of oxygen is present, deactivation or blocking of cross-linking due to addition of oxygen to the generated radicals occurs and the curing becomes insufficient, so the electron beam is preferably fired in an inert gas atmosphere with an oxygen concentration of not more than 500 ppm. As the inert gas which is used here, nitrogen gas, $CO_2$ gas, argon gas, and mixed gases of the same etc. may be illustrated.

Examples

Below, the present invention will be explained more specifically using examples which use the water-based precoating-use composition.

1. Metal sheets for precoating use

The following galvanized steel sheets M1 to M4 were prepared, were dipped in an aqueous solution of a water-based degreasing agent (made by Nihon Parkerizing, FC-4480) to degrease the surfaces, then were rinsed and dried to obtain the metal sheets for precoating use.

M1: Electrogalvanized Steel Sheet
(made by Nippon Steel Corporation, Zincoat™, sheet thickness 0.8 mm, plating thickness about 2.8 μm)

M2: ElectroZn—Ni Alloy Plated Steel Sheet
(made by Nippon Steel Corporation, Zinclight™, sheet thickness 0.8 mm, plating thickness about 2.8 μm)

M3: Hot Dip Galvanized Steel Sheet
(made by Nippon Steel Corporation, Silverzinc™, sheet thickness 0.8 mm, plating thickness about 7 μm)

M4: Hot Dip Zn-11% AL-3% Mg-0.2% Si Alloy Plated Steel Sheet
(made by Nippon Steel Corporation, Superdimer™, sheet thickness 0.8 mm, plating thickness about 6 μm)

2. Water-based precoating-use composition

To prepare a water-based precoating-use composition, first, the resin (A1), non-oxide ceramic particles (B), curing agent (C), silane coupling agent (s), rust preventive agent, coloring pigment, and viscosity adjuster were prepared.

(1) Resin (A1)

The resins A11 to A13 and A19 were synthesized and, further, commercially available resins A16 and A17 were prepared. These are all resins which are used in the present invention.

A11: Carboxyl group-containing polyester-based urethane resin aqueous dispersion (synthesized in Production Example 1)

Production Example 1

A 10 liter reaction vessel provided with a stirrer, reflux cooler, nitrogen gas introduction pipe, thermometer, and thermostat was charged with 2,2-dimethylol botanic acid: 1628 g and ε-caprolactone: 3872 g. As a catalyst, stannous chloride: 27.5 mg was added, the temperature inside the reaction vessel was held at 120° C., and the reaction was performed for 3 hours. Due to this, a liquid carboxyl group-containing polyester diol (a11) with a hydroxyl group value of 225.5 mgKOH/g and an acid value of 114.6 mgKOH/g was obtained.

Next, a 2 L reaction vessel provided with a stirrer, reflux cooler, nitrogen gas introduction pipe, thermometer, and thermostat was charged with 2,4-tolylenediisocyanate: 149.9 g and acetone: 140.0 g. While stirring under a nitrogen stream, the carboxyl group-containing polyester diol (a11): 124.6 g, number average molecular weight 1000 polycaprolactonediol (PLACCEL 210 made by Daicel Corporation): 273.1 g, and 1,4-butanediol: 12.4 g were added. The temperature inside the reaction vessel was held at 60° C. for four hours to cause the urethanization reaction to progress and prepare an NCO group-terminated urethane prepolymer. While stirring this urethane prepolymer: 168.3 g, ion exchanged water:

230 g containing triethylamine: 6.1 g was added. Further, ion exchanged water: 230 g containing hexamethylenediamine: 1.67 g was added. Next, under reduced pressure, the acetone was distilled off at 60° C. over 3 hours to obtain a carboxyl group-containing polyester-based urethane resin aqueous dispersion (A11) with a solid content concentration of 35% and an acid value of 24.6 mgKOH/g (converted to solid content).

A12: Sulfonic acid group-containing polyester-based urethane resin aqueous dispersion (synthesized in Production Example 2)

Production Example 2

A pressure resistant reaction vessel provided with a stirrer, reflux cooler, nitrogen gas introduction pipe, thermometer, and thermostat was charged with adipic acid: 1100 g, 3-methyl-1,5-pentanediol: 900 g, and tetrabutyl titanate 0.5 g while stirring in a nitrogen stream. The temperature inside the reaction vessel was held at 170° C. and a reaction caused until the acid value became 0.3 mgKOH/g or less. Next, the reaction was performed for 2 hours at 180° C. under 5 kPa or less reduced pressure conditions to obtain polyester with a hydroxyl group value of 112 mgKOH/g and an acid value of 0.2 mgKOH/g.

Next, to a separate reaction vessel with the same equipment as the above reaction vessel, this polyester polyol: 500 g, dimethyl 5-sulfosodium isophthalate: 134 g, and tetrabutyl titanate: 2 g were charged. The same procedure was followed as above, while stirring under a nitrogen stream, to hold the temperature inside of the reaction vessel at 180° C. for an esterification reaction and to finally obtain a sulfonic acid group-containing polyester (a12) with a molecular weight of 2117, a hydroxyl group value of 53 mgKOH/g, and an acid value of 0.3 mgKOH/g.

The sulfonic acid group-containing polyester (a12): 280 g, polybutylene adipate: 200 g, 1,4-butanediol: 35 g, hexamethylene diisocyanate: 118 g, and methylethylketone: 400 g were charged into a reaction vessel provided with a stirrer, reflux cooler, nitrogen gas introduction pipe, thermometer, and thermostat under a nitrogen stream. While stirring, the solution temperature was held at 75° C. to cause a urethanization reaction and obtain a urethane polymer with an NCO content of 1%. Next, the temperature inside the above reaction vessel was lowered to 40° C. and, while sufficiently stirring, ion exchanged water: 955 g was uniformly added dropwise for phase inversion emulsion. Next, the internal temperature was lowered to room temperature and an adipic hydrazide aqueous solution comprised of adipic hydrazide: 13 g and ion exchanged water: 110 g mixed together was added for amine extension. Under some reduced pressure, the solvent was distilled off at 60° C., then ion exchanged water was added to obtain a sulfonic acid group-containing polyester-based urethane resin aqueous dispersion (A12) with a solid content concentration of 35% and an acid value of 11 mgKOH/g (converted to solid content).

A13: carboxyl group-containing polyester resin aqueous solution in which hydroxyl groups are introduced (synthesized in Production Example 3)

Production Example 3

A pressure resistant reaction vessel provided with a stirrer, reflux cooler, nitrogen gas introduction pipe, thermometer, and thermostat was charged with trimethylolpropane: 174 g, neopentyl glycol: 327 g, adipic acid: 352 g, isophthalic acid: 109 g, and 1,2-cyclohexanedicarboxylic anhydride: 101 g, was raised in temperature from 160° C. to 230° C. over 3 hours, then, while distilling off the produced condensed water by a water separator, was held at 230° C. to cause a reaction until the acid value became 3 mgKOH/g or less. To this reaction product, trimellitic anhydride: 59 g was added, the mixture was subjected to an addition reaction at 170° C. for 30 minutes, then the result was cooled to 50° C. or less. 2-(dimethylamino)ethanol was added in an equivalent amount to the acid group to neutralize it, then de-ion exchanged water was gradually added to thereby obtain a solid content concentration 45%, acid value 35 mgKOH/g, hydroxyl group value 128 mgKOH/g, weight average molecular weight 13,000 carboxyl group-containing polyester resin aqueous solution (A13) in which hydroxyl groups are introduced.

A19: sulfonic acid group-containing polyester resin aqueous dispersion (synthesized in Production Example 4)

Production Example 4

A pressure resistant reaction vessel provided with a stirrer, reflux cooler, nitrogen gas introduction pipe, thermometer, and thermostat was charged with, while stirring under a nitrogen stream, terephthalic acid: 199 g and isophthalic acid: 232 g and adipic acid: 199 g, 5-sulfosodium isophthalic acid: 33 g, ethylene glycol: 312 g and 2,2-dimethyl-1,3-propanediol: 125 g and 1,5-pentanediol: 187 g, and tetrabutyl titanate: 0.41 g. The temperature in the reaction vessel was raised from 160° C. to 230° C. over 4 hours and an esterification reaction was performed. Next, the inside of the container was gradually reduced in pressure to 5 mmHg over 20 minutes and, furthermore, a polycondensation reaction was performed at 0.3 mmHg or less at 260° C. for 40 minutes. To the obtained copolymerized polyester resin: 100 g, butyl cellusolve: 20 g and methylethylketone: 42 g were added, then the mixture stirred at 80° C. for 2 hours to dissolve the ingredients. Furthermore, 213 g of ion exchanged water was added to disperse them in water. After that, while heating, the solvent was distilled off to obtain a solid content concentration 30% sulfonic acid group-containing polyester resin aqueous dispersion (A19).

A16: carboxyl group-, urea group-containing polyurethane resin aqueous dispersion (made by Mitsui Chemical Polyurethane, Takelac WS-5000)

A17: acrylic resin aqueous dispersion (made by DIC, Boncoat R-3380-E)

(2) Resins Other than A1 (Comparative Examples)

A15: nonionic polyether-based urethane resin aqueous dispersion (made by DIC, Bondic 1520)

A18: amino group-containing epoxy resin aqueous solution (made by ADEKA, Adeka Resin EM-0718)

(3) Non-Oxide Ceramic Particles (B)

Commercially available particles (reagents) were used. The electrical resistivity was measured by using the particles to prepare a length 80 mm, width 50 mm, and thickness 2 to 4 mm sintered plate and measuring it by the four-terminal, four-probe method using a Mitsubishi Chemical resistance meter Loresta EP (Model MCP-T360) and ASP probes and the constant current application method based on JIS K7194 at 25° C. The volume average diameter was measured using a Beckman Coulter Multisizer 3 (precision particle size distribution measuring apparatus using Coulter principle).

BC: $B_4C$ particles (made by Soekawa Chemical Co., Ltd., volume average diameter 2.2 μm, electrical resistivity $0.7 \times 10^{-6}$ Ωcm)

TiN: TiN particles (made by Wako Pure Chemical Industries, volume average diameter 1.6 μm, electrical resistivity $20\times10^{-6}$ Ωcm)

TiB: $TiB_2$ particles (made by Kojundo Chemical Laboratory, TII11PB, volume average diameter 2.9 μm, electrical resistivity $30\times10^{-6}$ Ωcm)

VC: VC particles (made by Wako Pure Chemical Industries, volume average diameter 2.3 μm, electrical resistivity $140\times10^{-6}$ Ωcm)

ZrB: $ZrB_2$ particles (made by Wako Pure Chemical Industries, volume average diameter 2.2 μm, electrical resistivity $70\times10^{-6}$ Ωcm)

SiC: SiC particles (made by Kojundo Chemical Laboratory, SII01PB, volume average diameter 2.9 μm, electrical resistivity $125\times10^{-6}$ Ωcm)

(4) Non-Oxide Ceramic Particles Other than (B) (Comparative Example)

Commercially available particles (reagents) were used. The electrical resistivity was measured in the same way as the above (2).

TaN: TaN particles (made by Soekawa Chemical, volume average diameter 3.7 μm, actual measured value of electrical resistivity $205\times10^{-6}$ Ωcm)

BN: BN particles (made by Kojundo Chemical Laboratory, BBI03PB, volume average diameter about 8 μm, electrical resistivity $2000\times10^{-6}$ Ωcm)

(5) Curing Agent (C)

C1: melamine resin (made by Nihon Cytec Industries, Cymel 303)

C2: isocyanate compound (made by Mitsui Chemical Polyurethane, Takenate WD-725)

(6) Silane Coupling Agent s1: 3-glycidoxypropyltrimethoxysilane (made by Shin-Etsu Chemical, KBM-403)

s2: 3-aminopropyltrimethoxysilane (made by Shin-Etsu Chemical, KBM-903)

s3: 3-mercaptopropyltrimethoxysilane (made by Shin-Etsu Chemical, KBM-803)

(7) Rust Preventive Agent i1: hexafluorotitanic acid (made by Wako Pure Chemical Industries, hexafluorotitanic acid 60% aqueous solution)

i2: magnesium hydrogen phosphate (made by Kanto Chemical)

i3: silica particles (made by Nissan Chemical Industries, Snotex N, silica sol of particle size 10 to 20 nm stabilized by ammonia)

(8) Coloring Pigment p1: solid solution of ZnO and CoO (made by Kusakabe, Pigment No. 068 Cobalt Green Deep, green colored pigment)

p2: potassium cobaltinitrite (made by Kusakabe, Pigment No. 117 Aureolin (Cobalt Yellow), yellow pigment)

p3: carbon black (Special Black 6 made by Ebonic Industries)

(9) Viscosity Adjuster v1: cross-linkable polyacrylic acid (made by Toagosei, Junron PW-111, not neutralized)

Next, the above resins, pigments and additives, and distilled water were used to prepare water-based coatings.

The resin (A1), non-oxide ceramic particles, and curing agent (C) were used in various ratios of formulation to prepare water-based coatings.

When using the silane coupling agent s1, s2, or s3 in the present embodiments, in each case, it was added to the water-based precoating-use composition to 5 parts by mass with respect to 100 parts by mass of the nonvolatiles of the resin (A1).

If using the rust preventive agent i1 or i3 in the present example, in each case, it is added to the precoating-use composition so as to become 10 parts by mass with respect to 100 parts by mass of the nonvolatiles of the water-based precoating-use composition. If using the rust preventive agent i2, it is added to the precoating-use composition so as to become 5 parts by mass with respect to 100 parts by mass of the nonvolatiles of the precoating-use composition.

If using the coloring pigment p1 or p2 in the present example, it is added to the precoating-use composition so as to become 20 parts by mass with respect to 100 parts by mass of the nonvolatiles of the water-based precoating-use composition. If using p3, in each case, it is added to the precoating-use composition so as to become 10 parts by mass with respect to 100 parts by mass of the nonvolatiles of the water-based precoating-use composition.

To inhibit settling of non-oxide ceramic particles which were dispersed in the water-based coating, a viscosity adjuster v1 which can give a thixotropic property to the precoating-use composition is added to all of the water-based precoating-use compositions of the present embodiment. The viscosity adjuster v1 is added in 0.03 to 0.1 part by mass with respect to 100 parts by mass of the overall amount including the water content and nonvolatiles of the water-based precoating-use composition. The amount of v1 added was adjusted so that when giving a shear stress (stirring) to the respective precoating-use compositions, the property falls to the viscosity level.

Table 1 to Table 13 show the presence and types of resins which are contained in the water-based coatings ((A1) or resin other than (A1)), non-oxide ceramic particles ((B) or non-oxide ceramic particles other than (B)), curing agents (C), silane coupling agent (s), rust preventive agents, coloring pigments, and viscosity adjusters. As the resin (A1), a mixed resin of a mass ratio of nonvolatiles of the resins A16 and A19 of 1:1 was also used. This was denoted as the "A16/A19 mixture" (Table 12). Further, regarding the non-oxide ceramic particles, the ratio of the non-oxide ceramic particles to the total of the resin nonvolatiles and non-oxide ceramic particles was shown by vol %. Regarding the curing agent (C), the ratio of the curing agent (C) to the total of the resin nonvolatiles and curing agent (C) was shown by mass %.

Here, "nonvolatiles" means the ingredients which remain after the water or solvents which are contained as solvents in the coating or composition are volatilized.

The concentration of nonvolatiles of the water-based precoating-use composition was suitably adjusted while changing the amount of water added so as to obtain the targeted coating deposition or good coatability.

The above water-based precoating-use composition was prepared, the ingredients were uniformly dispersed, and the container was sealed and allowed to stand at 25° C. for 2 days. After that, the above metal sheet for coating use was coated using a roll coater, then was dried in a hot air oven at a metal surface peak temperature of 200° C., water cooled, then air dried. Further, to make the comparative sheet for the following "3. Evaluation of performance, (5) Changes in color of coating due to inclusion of non-oxide ceramic particles", a water-based precoating-use composition comprised of the water-based coating from which only the non-oxide ceramic particles have been omitted was separately prepared. A similar film formation method as the above is used to prepare a comparative sheet for use for evaluation of the coloring impairment so as to obtain a coating thickness similar to the precoated metal sheet being evaluated. Table 1 to Table 13 show the coating film thicknesses after film formation (μm units). Note that, the coating film thicknesses were calculated by dividing the difference in mass before and after stripping the once applied coating film by the specific gravity of the coating film. The specific gravity of the coating film was calculated from the amounts of the coating film-forming ingredients and the known specific gravities of the ingredients.

3. Evaluation of Performance

The precoated metal sheets which were prepared by the above method were used to evaluate weldability, surface contact resistance, corrosion resistance, and change in color of coating film due to inclusion of non-oxide ceramic particles. Below, the tests and methods of evaluation will be shown.

(1) Spot Weldability

Using tip size 5 mm, R40 CF type Cr—Cu electrodes, a consecutive welding type spot welding test was performed at an applied pressure of 1.96 kN, welding current of 8 kA, and electrification time of 12 cycles/50 Hz so as to find the number of welds right before the nugget size becomes less than $3\sqrt{t}$ ("t" is sheet thickness). The following scores were used to evaluate the relative superiority of the spot weldability.

4: Number of welds of 2000 or more
3: 1000 welds to less than 2000 welds
2: 500 welds to less than 1000 welds
1: less than 500 welds
Unweldable: Nugget not formed and not even one weld able to be formed (2) Groundability Using the four-terminal, four-probe method using a Mitsubishi Chemical resistance meter Loresta EP (Model MCP-T360) and ESP probes and the constant current application method, 10 different points on the precoated metal sheet were measured for contact resistance. The arithmetic mean was made the value of the surface contact resistance of the precoated metal sheet. The following scores were used to evaluate the relative superiority of groundability.

6: surface contact resistance less than $10^{-4}\Omega$
5: $10^{-4}\Omega$ to less than $10^{-3}\Omega$
4: $10^{-3}\Omega$ to less than $10^{-1}\Omega$
3: $10^{-1}\Omega$ to less than $10^{3}\Omega$
2: $10^{3}\Omega$ to less than $10^{6}\Omega$
1: $10^{6}\Omega$ or more (3) Corrosion Resistance of Flat Part From the above metal sheet, a 50×100 mm size test piece was cut. The ends of the sheet were sealed, then a salt spray test based on JIS-Z2371 was performed. After 120 hours, the area ratio of white rust was measured. Using the following scores, the relative superiority of the corrosion resistance of the flat part was evaluated.

6: No white rust formed
5: White rust area ratio less than 3%
4: White rust area ratio 3% to less than 5%
3: White rust area ratio 5% to less than 10%
2: White rust area ratio 10% to less than 20%
1: White rust area ratio 20% or more (4) Corrosion Resistance of Worked Part From the above metal sheet, a 50×100 mm size test piece was cut. An Erichsen tester was used to create a bulge of a 7 mm height from the back side of the coated surface. The ends of the sheet were sealed, then a salt spray test based on JIS-Z2371 was performed. After 120 hours, the area ratio of white rust at the projecting part was measured. Using the following scores, the relative superiority of the corrosion resistance of the worked part was evaluated.

6: No white rust at projecting parts
5: White rust area ratio less than 5%
4: White rust area ratio 5% to less than 10%
3: White rust area ratio 10% to less than 20%
2: White rust area ratio 20% to less than 30%
1: White rust area ratio 30% or more (5) Color Change of Coating Film Due to Inclusion of Non-Oxide Ceramic Particle From the above precoated metal sheet and a comparison sheet for evaluation of coloring inhibition (the above precoated metal sheet from the coating film of which only non-oxide ceramic particles have been removed), two measurement pieces each were cut. The measurement pieces were measured for lightness L* and color degrees a*, b* of the L*a*b* color scale using a spectrocolorimeter SC-T45 made by Suga Test Instruments. The arithmetic mean of the measurement results of the 20 pieces were used as the L*, a*, b* values of the precoated metal sheet. From the L*, a*, b* values of the precoated metal sheet and comparative sheet, the color difference ΔE* of the two sheets was calculated. Using the following scores, the color change of the coating film due to inclusion of non-oxide ceramic particles was evaluated.

6: Color difference ΔE* less than 0.3
5: 0.3 to less than 0.6
4: 0.6 to less than 1.0
3: 1.0 to less than 2.0
2: 2.0 to less than 4.0
1: 4.0 or more Table 1 to Table 13 show the results of evaluation together.

TABLE 1

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 1 | M1 | A11 | TiN | 0.12 | — | — | — | — | — | 3.0 |
| 2 | M1 | A11 | TiN | 0.5 | — | — | — | — | — | 2.9 |
| 3 | M1 | A11 | TiN | 0.9 | — | — | — | — | — | 3.0 |
| 4 | M1 | A11 | TiN | 2.8 | — | — | — | — | — | 2.9 |
| 5 | M1 | A11 | TiN | 4.8 | — | — | — | — | — | 3.1 |
| 6 | M1 | A11 | TiN | 9.5 | — | — | — | — | — | 3.0 |
| 7 | M1 | A11 | — | — | — | — | — | — | — | 3.0 |
| 8 | M1 | A11 | TiN | 0.08 | — | — | — | — | — | 2.9 |
| 9 | M1 | A11 | TiN | 11.0 | — | — | — | — | — | 2.9 |
| 10 | M1 | A11 | TiN | 0.5 | — | — | — | — | — | 1.5 |
| 11 | M1 | A11 | TiN | 0.5 | — | — | — | — | — | 4.0 |
| 12 | M1 | A11 | TiN | 0.5 | — | — | — | — | — | 5.5 |
| 13 | M1 | A11 | TiN | 0.5 | — | — | — | — | — | 8.0 |
| 14 | M1 | A11 | TiN | 0.5 | — | — | — | — | — | 11.1 |
| 15 | M1 | A11 | TiN | 0.12 | — | — | — | — | p1 | 3.0 |
| 16 | M1 | A11 | TiN | 0.5 | — | — | — | — | p1 | 3.1 |
| 17 | M1 | A11 | TiN | 2.8 | — | — | — | — | p1 | 2.9 |

TABLE 1-continued

| | | | | | | | | | | |
|---|---|---|---|---|---|---|---|---|---|---|
| 18 | M1 | A11 | TiN | 4.8 | — | — | — | — | p1 | 2.9 |
| 19 | M1 | A11 | — | — | — | — | — | — | p1 | 3.0 |
| 20 | M1 | A11 | TiN | 0.08 | — | — | — | — | p1 | 3.0 |
| 21 | M1 | A11 | TiN | 11.0 | — | — | — | — | p1 | 3.1 |
| 22 | M1 | A11 | TiN | 0.5 | — | — | — | — | p1 | 1.5 |
| 23 | M1 | A11 | TiN | 0.5 | — | — | — | — | p1 | 4.0 |
| 24 | M1 | A11 | TiN | 0.5 | — | — | — | — | p1 | 5.5 |
| 25 | M1 | A11 | TiN | 0.5 | — | — | — | — | p1 | 7.9 |
| 26 | M1 | A11 | TiN | 0.5 | — | — | — | — | p1 | 11.0 |
| 27 | M1 | A11 | TiN | 0.12 | C1 | 15 | — | — | p1 | 3.0 |
| 28 | M1 | A11 | TiN | 0.5 | C1 | 15 | — | — | p1 | 2.9 |
| 29 | M1 | A11 | TiN | 0.9 | C1 | 15 | — | — | p1 | 3.1 |
| 30 | M1 | A11 | TiN | 2.8 | C1 | 15 | — | — | p1 | 3.2 |
| 31 | M1 | A11 | TiN | 4.8 | C1 | 15 | — | — | p1 | 3.1 |
| 32 | M1 | A11 | TiN | 9.5 | C1 | 15 | — | — | p1 | 3.0 |
| 33 | M1 | A11 | — | — | C1 | 15 | — | — | p1 | 3.0 |
| 34 | M1 | A11 | TiN | 0.08 | C1 | 15 | — | — | p1 | 3.0 |
| 35 | M1 | A11 | TiN | 11.0 | C1 | 15 | — | — | p1 | 2.8 |
| 36 | M1 | A11 | TiN | 0.5 | C1 | 15 | — | — | p1 | 1.5 |
| 37 | M1 | A11 | TiN | 0.5 | C1 | 15 | — | — | p1 | 4.0 |
| 38 | M1 | A11 | TiN | 0.5 | C1 | 15 | — | — | p1 | 5.4 |
| 39 | M1 | A11 | TiN | 0.5 | C1 | 15 | — | — | p1 | 8.0 |
| 40 | M1 | A11 | TiN | 0.5 | C1 | 15 | — | — | p1 | 11.2 |
| 41 | M1 | A11 | TiN | 0.5 | C1 | 40 | — | — | p1 | 3.0 |
| 42 | M1 | A11 | TiN | 0.12 | — | — | s1 | — | p1 | 3.0 |
| 43 | M1 | A11 | TiN | 0.5 | — | — | s1 | — | p1 | 3.1 |
| 44 | M1 | A11 | TiN | 0.12 | — | — | s2 | — | p1 | 3.2 |
| 45 | M1 | A11 | TiN | 0.5 | — | — | s2 | — | p1 | 3.1 |
| 46 | M1 | A11 | TiN | 0.12 | — | — | — | i2 | p1 | 3.0 |
| 47 | M1 | A11 | TiN | 0.12 | — | — | — | i3 | p1 | 3.0 |

| Precoated metal sheet no. | Conductivity | | Corrosion resistance | | Coating film color change | Remarks |
|---|---|---|---|---|---|---|
| | Weldability | Groundability | Flat part | Worked part | | |
| 1 | 3 | 3 | 6 | 5 | 6 | Inv. ex. |
| 2 | 4 | 5 | 6 | 5 | 5 | Inv. ex. |
| 3 | 4 | 5 | 6 | 5 | 5 | Inv. ex. |
| 4 | 4 | 6 | 5 | 5 | 4 | Inv. ex. |
| 5 | 4 | 6 | 4 | 4 | 3 | Inv. ex. |
| 6 | 4 | 6 | 3 | 3 | 2 | Inv. ex. |
| 7 | Unweldable | 1 | 6 | 5 | 6 | Comp. ex. (no ceramic particles) |
| 8 | 2 | 2 | 6 | 5 | 6 | Comp. ex. |
| 9 | 4 | 6 | 3 | 2 | 1 | Comp. ex. |
| 10 | 4 | 6 | 4 | 4 | 6 | Inv. ex. |
| 11 | 4 | 6 | 6 | 5 | 6 | Inv. ex. |
| 12 | 4 | 6 | 6 | 5 | 6 | Inv. ex. |
| 13 | 3 | 5 | 6 | 5 | 6 | Inv. ex. |
| 14 | 3 | 4 | 6 | 5 | 6 | Inv. ex. |
| 15 | 3 | 3 | 6 | 5 | 6 | Inv. ex. |
| 16 | 4 | 6 | 5 | 5 | 5 | Inv. ex. |
| 17 | 4 | 6 | 5 | 5 | 4 | Inv. ex. |
| 18 | 4 | 6 | 4 | 4 | 3 | Inv. ex. |
| 19 | Unweldable | 1 | 6 | 5 | 6 | Comp. ex. (no ceramic particles) |
| 20 | 2 | 2 | 6 | 4 | 6 | Comp. ex. |
| 21 | 4 | 6 | 2 | 2 | 1 | Comp. ex. |
| 22 | 4 | 6 | 4 | 4 | 6 | Inv. ex. |
| 23 | 4 | 6 | 6 | 5 | 6 | Inv. ex. |
| 24 | 4 | 6 | 6 | 5 | 6 | Inv. ex. |
| 25 | 3 | 5 | 6 | 5 | 6 | Inv. ex. |
| 26 | 3 | 4 | 6 | 5 | 6 | Inv. ex. |
| 27 | 3 | 3 | 6 | 6 | 6 | Inv. ex. |
| 28 | 4 | 5 | 6 | 6 | 5 | Inv. ex. |
| 29 | 4 | 5 | 6 | 6 | 5 | Inv. ex. |
| 30 | 4 | 6 | 6 | 6 | 4 | Inv. ex. |
| 31 | 4 | 6 | 6 | 5 | 3 | Inv. ex. |
| 32 | 4 | 6 | 4 | 3 | 2 | Inv. ex. |
| 33 | Unweldable | 1 | 6 | 6 | 6 | Comp. ex. (no ceramic particles) |
| 34 | 2 | 2 | 6 | 4 | 6 | Comp. ex. |
| 35 | 4 | 6 | 3 | 1 | 1 | Comp. ex. |
| 36 | 4 | 6 | 5 | 5 | 6 | Inv. ex. |
| 37 | 4 | 6 | 6 | 6 | 6 | Inv. ex. |
| 38 | 4 | 6 | 6 | 6 | 6 | Inv. ex. |
| 39 | 3 | 5 | 6 | 6 | 6 | Inv. ex. |
| 40 | 3 | 4 | 6 | 6 | 6 | Inv. ex. |
| 41 | 4 | 6 | 4 | 4 | 5 | Inv. ex. |
| 42 | 3 | 3 | 6 | 6 | 6 | Inv. ex. |
| 43 | 4 | 6 | 6 | 6 | 6 | Inv. ex. |

TABLE 1-continued

| | | | | | | |
|---|---|---|---|---|---|---|
| 44 | 4 | 5 | 6 | 6 | 6 | Inv. ex. |
| 45 | 4 | 6 | 6 | 6 | 5 | Inv. ex. |
| 46 | 3 | 3 | 6 | 6 | 6 | Inv. ex. |
| 47 | 3 | 3 | 6 | 6 | 6 | Inv. ex. |

TABLE 2

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (µm) |
|---|---|---|---|---|---|---|---|---|---|---|
| 48 | M1 | A12 | TiN | 0.12 | — | — | — | — | — | 3.0 |
| 49 | M1 | A12 | TiN | 0.5 | — | — | — | — | — | 3.0 |
| 50 | M1 | A12 | TiN | 0.9 | — | — | — | — | — | 3.0 |
| 51 | M1 | A12 | TiN | 2.8 | — | — | — | — | — | 3.0 |
| 52 | M1 | A12 | TiN | 4.8 | — | — | — | — | — | 3.0 |
| 53 | M1 | A12 | TiN | 9.5 | — | — | — | — | — | 3.0 |
| 54 | M1 | A12 | — | — | — | — | — | — | — | 3.0 |
| 55 | M1 | A12 | TiN | 0.08 | — | — | — | — | — | 3.1 |
| 56 | M1 | A12 | TiN | 11.0 | — | — | — | — | — | 3.0 |
| 57 | M1 | A12 | TiN | 0.5 | — | — | — | — | — | 1.4 |
| 58 | M1 | A12 | TiN | 0.5 | — | — | — | — | — | 3.9 |
| 59 | M1 | A12 | TiN | 0.5 | — | — | — | — | — | 5.5 |
| 60 | M1 | A12 | TiN | 0.5 | — | — | — | — | — | 8.1 |
| 61 | M1 | A12 | TiN | 0.5 | — | — | — | — | — | 11.0 |
| 62 | M1 | A12 | TiN | 0.12 | — | — | — | — | p1 | 3.0 |
| 63 | M1 | A12 | TiN | 0.5 | — | — | — | — | p1 | 3.0 |
| 64 | M1 | A12 | TiN | 2.8 | — | — | — | — | p1 | 3.1 |
| 65 | M1 | A12 | TiN | 4.8 | — | — | — | — | p1 | 2.9 |
| 66 | M1 | A12 | — | — | — | — | — | — | p1 | 3.1 |
| 67 | M1 | A12 | TiN | 0.08 | — | — | — | — | p1 | 3.0 |
| 68 | M1 | A12 | TiN | 11.0 | — | — | — | — | p1 | 2.9 |
| 69 | M1 | A12 | TiN | 0.5 | — | — | — | — | p1 | 1.5 |
| 70 | M1 | A12 | TiN | 0.5 | — | — | — | — | p1 | 4.0 |
| 71 | M1 | A12 | TiN | 0.5 | — | — | — | — | p1 | 5.5 |
| 72 | M1 | A12 | TiN | 0.5 | — | — | — | — | p1 | 7.9 |
| 73 | M1 | A12 | TiN | 0.5 | — | — | — | — | p1 | 11.1 |
| 74 | M1 | A12 | TiN | 0.12 | C1 | 15 | — | — | p1 | 3.0 |
| 75 | M1 | A12 | TiN | 0.5 | C1 | 15 | — | — | p1 | 2.9 |
| 76 | M1 | A12 | TiN | 0.9 | C1 | 15 | — | — | p1 | 3.1 |
| 77 | M1 | A12 | TiN | 2.8 | C1 | 15 | — | — | p1 | 3.1 |
| 78 | M1 | A12 | TiN | 4.8 | C1 | 15 | — | — | p1 | 2.9 |
| 79 | M1 | A12 | TiN | 9.5 | C1 | 15 | — | — | p1 | 3.0 |
| 80 | M1 | A12 | — | — | C1 | 15 | — | — | p1 | 3.1 |
| 81 | M1 | A12 | TiN | 0.08 | C1 | 15 | — | — | p1 | 2.9 |
| 82 | M1 | A12 | TiN | 11.0 | C1 | 15 | — | — | p1 | 3.1 |
| 83 | M1 | A12 | TiN | 0.5 | C1 | 15 | — | — | p1 | 1.5 |
| 84 | M1 | A12 | TiN | 0.5 | C1 | 15 | — | — | p1 | 4.1 |
| 85 | M1 | A12 | TiN | 0.5 | C1 | 15 | — | — | p1 | 5.5 |
| 86 | M1 | A12 | TiN | 0.5 | C1 | 15 | — | — | p1 | 8.1 |
| 87 | M1 | A12 | TiN | 0.5 | C1 | 15 | — | — | p1 | 11.1 |
| 88 | M1 | A12 | TiN | 0.5 | C1 | 40 | — | — | p1 | 3.0 |
| 89 | M1 | A12 | TiN | 0.12 | — | — | s1 | — | p1 | 3.0 |
| 90 | M1 | A12 | TiN | 0.5 | — | — | s1 | — | p1 | 3.1 |
| 91 | M1 | A12 | TiN | 0.12 | — | — | s2 | — | p1 | 3.1 |
| 92 | M1 | A12 | TiN | 0.5 | — | — | s2 | — | p1 | 3.0 |
| 93 | M1 | A12 | TiN | 0.12 | — | — | — | i2 | p1 | 3.0 |
| 94 | M1 | A12 | TiN | 0.12 | — | — | — | i3 | p1 | 3.0 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 48 | 3 | 3 | 6 | 5 | 6 | Inv. ex. |
| 49 | 4 | 6 | 6 | 5 | 5 | Inv. ex. |
| 50 | 4 | 6 | 6 | 5 | 5 | Inv. ex. |
| 51 | 4 | 6 | 6 | 5 | 4 | Inv. ex. |
| 52 | 4 | 6 | 5 | 5 | 3 | Inv. ex. |
| 53 | 4 | 6 | 4 | 3 | 2 | Inv. ex. |
| 54 | Unweldable | 1 | 6 | 5 | 6 | Comp. ex. (no ceramic particles) |
| 55 | 2 | 2 | 5 | 5 | 6 | Comp. ex. |
| 56 | 4 | 6 | 4 | 2 | 1 | Comp. ex. |
| 57 | 4 | 6 | 4 | 4 | 6 | Inv. ex. |

TABLE 2-continued

| | | | | | | |
|---|---|---|---|---|---|---|
| 58 | 4 | 6 | 6 | 5 | 6 | Inv. ex. |
| 59 | 4 | 6 | 6 | 5 | 6 | Inv. ex. |
| 60 | 3 | 5 | 6 | 5 | 6 | Inv. ex. |
| 61 | 3 | 4 | 6 | 5 | 6 | Inv. ex. |
| 62 | 3 | 3 | 6 | 5 | 6 | Inv. ex. |
| 63 | 4 | 6 | 5 | 5 | 5 | Inv. ex. |
| 64 | 4 | 6 | 6 | 5 | 4 | Inv. ex. |
| 65 | 4 | 6 | 5 | 4 | 3 | Inv. ex. |
| 66 | Unweldable | 1 | 6 | 5 | 6 | Comp. ex. (no ceramic particles) |
| 67 | 2 | 2 | 5 | 4 | 6 | Comp. ex. |
| 68 | 4 | 6 | 3 | 2 | 1 | Comp. ex. |
| 69 | 4 | 6 | 4 | 4 | 6 | Inv. ex. |
| 70 | 4 | 6 | 6 | 5 | 6 | Inv. ex. |
| 71 | 4 | 6 | 6 | 5 | 6 | Inv. ex. |
| 72 | 3 | 5 | 6 | 5 | 6 | Inv. ex. |
| 73 | 3 | 4 | 6 | 5 | 6 | Inv. ex. |
| 74 | 3 | 3 | 6 | 6 | 6 | Inv. ex. |
| 75 | 4 | 6 | 6 | 6 | 5 | Inv. ex. |
| 76 | 4 | 5 | 6 | 6 | 5 | Inv. ex. |
| 77 | 4 | 6 | 6 | 6 | 4 | Inv. ex. |
| 78 | 4 | 6 | 6 | 6 | 3 | Inv. ex. |
| 79 | 4 | 6 | 4 | 3 | 2 | Inv. ex. |
| 80 | Unweldable | 1 | 6 | 6 | 6 | Comp. ex. (no ceramic particles) |
| 81 | 2 | 2 | 6 | 5 | 5 | Comp. ex. |
| 82 | 4 | 6 | 3 | 2 | 1 | Comp. ex. |
| 83 | 4 | 6 | 5 | 5 | 6 | Inv. ex. |
| 84 | 4 | 6 | 6 | 6 | 6 | Inv. ex. |
| 85 | 4 | 6 | 6 | 6 | 6 | Inv. ex. |
| 86 | 3 | 5 | 6 | 6 | 6 | Inv. ex. |
| 87 | 3 | 4 | 6 | 6 | 6 | Inv. ex. |
| 88 | 4 | 6 | 4 | 4 | 5 | Inv. ex. |
| 89 | 3 | 3 | 6 | 6 | 6 | Inv. ex. |
| 90 | 4 | 6 | 6 | 6 | 6 | Inv. ex. |
| 91 | 4 | 5 | 6 | 6 | 6 | Inv. ex. |
| 92 | 4 | 6 | 6 | 6 | 5 | Inv. ex. |
| 93 | 3 | 3 | 6 | 6 | 6 | Inv. ex. |
| 94 | 3 | 3 | 6 | 6 | 6 | Inv. ex. |

TABLE 3

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 95 | M1 | A12 | TiN | 0.12 | — | — | — | — | p2 | 3.0 |
| 96 | M1 | A12 | TiN | 0.5 | — | — | — | — | p2 | 3.0 |
| 97 | M1 | A12 | TiN | 0.9 | — | — | — | — | p2 | 3.2 |
| 98 | M1 | A12 | TiN | 2.8 | — | — | — | — | p2 | 3.0 |
| 99 | M1 | A12 | TiN | 4.8 | — | — | — | — | p2 | 3.0 |
| 100 | M1 | A12 | TiN | 9.5 | — | — | — | — | p2 | 2.8 |
| 101 | M1 | A12 | — | — | — | — | — | — | p2 | 3.1 |
| 102 | M1 | A12 | TiN | 0.08 | — | — | — | — | p2 | 3.0 |
| 103 | M1 | A12 | TiN | 11.0 | — | — | — | — | p2 | 2.9 |
| 104 | M1 | A12 | TiN | 0.5 | — | — | — | — | p2 | 1.6 |
| 105 | M1 | A12 | TiN | 0.5 | — | — | — | — | p2 | 4.0 |
| 106 | M1 | A12 | TiN | 0.5 | — | — | — | — | p2 | 5.4 |
| 107 | M1 | A12 | TiN | 0.5 | — | — | — | — | p2 | 8.0 |
| 108 | M1 | A12 | TiN | 0.5 | — | — | — | — | p2 | 11.2 |
| 109 | M1 | A12 | TiN | 0.12 | C2 | 15 | — | — | p2 | 3.0 |
| 110 | M1 | A12 | TiN | 0.5 | C2 | 15 | — | — | p2 | 3.0 |
| 111 | M1 | A12 | TiN | 0.9 | C2 | 15 | — | — | p2 | 3.0 |
| 112 | M1 | A12 | TiN | 2.8 | C2 | 15 | — | — | p2 | 3.0 |
| 113 | M1 | A12 | TiN | 4.8 | C2 | 15 | — | — | p2 | 2.9 |
| 114 | M1 | A12 | TiN | 9.5 | C2 | 15 | — | — | p2 | 3.0 |
| 115 | M1 | A12 | — | — | C2 | 15 | — | — | p2 | 3.0 |
| 116 | M1 | A12 | TiN | 0.08 | C2 | 15 | — | — | p2 | 2.9 |
| 117 | M1 | A12 | TiN | 11.0 | C2 | 15 | — | — | p2 | 2.9 |
| 118 | M1 | A12 | TiN | 0.5 | C2 | 15 | — | — | p2 | 1.6 |
| 119 | M1 | A12 | TiN | 0.5 | C2 | 15 | — | — | p2 | 4.0 |
| 120 | M1 | A12 | TiN | 0.5 | C2 | 15 | — | — | p2 | 5.4 |
| 121 | M1 | A12 | TiN | 0.5 | C2 | 15 | — | — | p2 | 8.0 |
| 122 | M1 | A12 | TiN | 0.5 | C2 | 15 | — | — | p2 | 11.0 |
| 123 | M1 | A12 | TiN | 0.5 | C2 | 40 | — | — | p2 | 3.0 |
| 124 | M1 | A12 | TiN | 0.12 | — | — | s1 | — | p2 | 3.0 |
| 125 | M1 | A12 | TiN | 0.5 | — | — | s1 | — | p2 | 2.9 |

TABLE 3-continued

| | | | | | | | | | | |
|---|---|---|---|---|---|---|---|---|---|---|
| 126 | M1 | A12 | TiN | 0.12 | — | — | s2 | — | p2 | 2.9 |
| 127 | M1 | A12 | TiN | 0.5 | — | — | s2 | — | p2 | 3.2 |
| 128 | M1 | A12 | TiN | 0.12 | — | — | — | i2 | p2 | 3.0 |
| 129 | M1 | A12 | TiN | 0.12 | — | — | — | i3 | p2 | 3.0 |
| 130 | M1 | A12 | TiN | 0.12 | C2 | 15 | — | — | p3 | 3.0 |
| 131 | M1 | A12 | TiN | 0.5 | C2 | 15 | — | — | p3 | 3.0 |
| 132 | M1 | A12 | TiN | 0.9 | C2 | 15 | — | — | p3 | 2.8 |
| 133 | M1 | A12 | TiN | 2.8 | C2 | 15 | — | — | p3 | 3.0 |
| 134 | M1 | A12 | TiN | 4.8 | C2 | 15 | — | — | p3 | 2.9 |
| 135 | M1 | A12 | TiN | 9.5 | C2 | 15 | — | — | p3 | 2.8 |
| 136 | M1 | A12 | — | — | C2 | 15 | — | — | p3 | 3.0 |
| 137 | M1 | A12 | TiN | 0.08 | C2 | 15 | — | — | p3 | 2.9 |
| 138 | M1 | A12 | TiN | 11.0 | C2 | 15 | — | — | p3 | 2.9 |
| 139 | M1 | A12 | TiN | 0.5 | C2 | 15 | — | — | p3 | 1.6 |
| 140 | M1 | A12 | TiN | 0.5 | C2 | 15 | — | — | p3 | 4.0 |
| 141 | M1 | A12 | TiN | 0.5 | C2 | 15 | — | — | p3 | 5.5 |
| 142 | M1 | A12 | TiN | 0.5 | C2 | 15 | — | — | p3 | 8.1 |
| 143 | M1 | A12 | TiN | 0.5 | C2 | 15 | — | — | p3 | 11.2 |
| 144 | M1 | A12 | TiN | 0.5 | C2 | 40 | — | — | p3 | 3.1 |
| 145 | M1 | A12 | TiN | 0.12 | — | — | s1 | — | p3 | 3.0 |
| 146 | M1 | A12 | TiN | 0.5 | — | — | s1 | — | p3 | 3.0 |
| 147 | M1 | A12 | TiN | 0.12 | — | — | s2 | — | p3 | 3.1 |
| 148 | M1 | A12 | TiN | 0.5 | — | — | s2 | — | p3 | 3.2 |
| 149 | M1 | A12 | TiN | 0.12 | — | — | — | i2 | p3 | 3.1 |
| 150 | M1 | A12 | TiN | 0.12 | — | — | — | i3 | p3 | 3.0 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 95 | 3 | 3 | 6 | 5 | 6 | Inv. ex. |
| 96 | 4 | 6 | 5 | 5 | 5 | Inv. ex. |
| 97 | 4 | 6 | 5 | 5 | 5 | Inv. ex. |
| 98 | 4 | 6 | 5 | 4 | 4 | Inv. ex. |
| 99 | 4 | 6 | 5 | 4 | 3 | Inv. ex. |
| 100 | 4 | 6 | 4 | 3 | 2 | Inv. ex. |
| 101 | Unweldable | 1 | 6 | 5 | 6 | Comp. ex. (no ceramic particles) |
| 102 | 2 | 2 | 6 | 5 | 6 | Comp. ex. |
| 103 | 4 | 6 | 3 | 1 | 1 | Comp. ex. |
| 104 | 4 | 6 | 4 | 4 | 6 | Inv. ex. |
| 105 | 4 | 6 | 6 | 5 | 6 | Inv. ex. |
| 106 | 4 | 6 | 6 | 5 | 6 | Inv. ex. |
| 107 | 3 | 5 | 6 | 5 | 6 | Inv. ex. |
| 108 | 3 | 4 | 6 | 5 | 6 | Inv. ex. |
| 109 | 3 | 3 | 6 | 6 | 6 | Inv. ex. |
| 110 | 4 | 6 | 6 | 6 | 5 | Inv. ex. |
| 111 | 4 | 6 | 6 | 6 | 5 | Inv. ex. |
| 112 | 4 | 6 | 6 | 5 | 4 | Inv. ex. |
| 113 | 4 | 6 | 6 | 5 | 3 | Inv. ex. |
| 114 | 4 | 6 | 4 | 3 | 2 | Inv. ex. |
| 115 | Unweldable | 1 | 6 | 6 | 6 | Comp. ex. (no ceramic particles) |
| 116 | 2 | 1 | 6 | 6 | 6 | Comp. ex. |
| 117 | 4 | 6 | 3 | 2 | 1 | Comp. ex. |
| 118 | 4 | 6 | 5 | 5 | 6 | Inv. ex. |
| 119 | 4 | 6 | 6 | 6 | 6 | Inv. ex. |
| 120 | 4 | 6 | 6 | 6 | 6 | Inv. ex. |
| 121 | 3 | 5 | 6 | 6 | 6 | Inv. ex. |
| 122 | 3 | 4 | 6 | 6 | 6 | Inv. ex. |
| 123 | 4 | 6 | 4 | 4 | 5 | Inv. ex. |
| 124 | 3 | 3 | 6 | 6 | 6 | Inv. ex. |
| 125 | 4 | 6 | 6 | 6 | 6 | Inv. ex. |
| 126 | 3 | 3 | 6 | 6 | 6 | Inv. ex. |
| 127 | 4 | 6 | 6 | 6 | 5 | Inv. ex. |
| 128 | 3 | 3 | 6 | 6 | 6 | Inv. ex. |
| 129 | 3 | 3 | 6 | 6 | 6 | Inv. ex. |
| 130 | 3 | 3 | 6 | 6 | 6 | Inv. ex. |
| 131 | 4 | 6 | 6 | 6 | 5 | Inv. ex. |
| 132 | 4 | 6 | 6 | 6 | 5 | Inv. ex. |
| 133 | 4 | 6 | 6 | 6 | 4 | Inv. ex. |
| 134 | 4 | 6 | 6 | 5 | 4 | Inv. ex. |
| 135 | 4 | 6 | 4 | 3 | 2 | Inv. ex. |
| 136 | Unweldable | 1 | 6 | 6 | 6 | Comp. ex. (no ceramic particles) |
| 137 | 2 | 1 | 6 | 6 | 6 | Comp. ex. |
| 138 | 4 | 6 | 3 | 2 | 1 | Comp. ex. |
| 139 | 4 | 6 | 5 | 5 | 6 | Inv. ex. |
| 140 | 4 | 6 | 6 | 6 | 6 | Inv. ex. |
| 141 | 4 | 6 | 6 | 6 | 6 | Inv. ex. |
| 142 | 3 | 5 | 6 | 6 | 6 | Inv. ex. |

TABLE 3-continued

| | | | | | | |
|---|---|---|---|---|---|---|
| 143 | 3 | 4 | 6 | 6 | 6 | Inv. ex. |
| 144 | 4 | 6 | 4 | 4 | 5 | Inv. ex. |
| 145 | 3 | 3 | 6 | 6 | 6 | Inv. ex. |
| 146 | 4 | 6 | 6 | 6 | 6 | Inv. ex. |
| 147 | 3 | 3 | 6 | 6 | 6 | Inv. ex. |
| 148 | 4 | 6 | 6 | 6 | 5 | Inv. ex. |
| 149 | 3 | 3 | 6 | 6 | 6 | Inv. ex. |
| 150 | 3 | 3 | 6 | 6 | 6 | Inv. ex. |

TABLE 4

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 151 | M1 | A12 | TiB | 0.12 | — | — | — | — | — | 3.0 |
| 152 | M1 | A12 | TiB | 0.5 | — | — | — | — | — | 2.9 |
| 153 | M1 | A12 | TiB | 0.9 | — | — | — | — | — | 3.0 |
| 154 | M1 | A12 | TiB | 2.8 | — | — | — | — | — | 3.0 |
| 155 | M1 | A12 | TiB | 4.8 | — | — | — | — | — | 3.0 |
| 156 | M1 | A12 | TiB | 9.5 | — | — | — | — | — | 2.9 |
| 157 | M1 | A12 | TiB | 0.08 | — | — | — | — | — | 2.9 |
| 158 | M1 | A12 | TiB | 11.0 | — | — | — | — | — | 3.0 |
| 159 | M1 | A12 | TiB | 0.12 | — | — | — | — | p1 | 3.0 |
| 160 | M1 | A12 | TiB | 0.5 | — | — | — | — | p1 | 2.9 |
| 161 | M1 | A12 | TiB | 0.9 | — | — | — | — | p1 | 3.0 |
| 162 | M1 | A12 | TiB | 2.8 | — | — | — | — | p1 | 2.9 |
| 163 | M1 | A12 | TiB | 4.8 | — | — | — | — | p1 | 3.0 |
| 164 | M1 | A12 | TiB | 9.5 | — | — | — | — | p1 | 3.2 |
| 165 | M1 | A12 | TiB | 0.08 | — | — | — | — | p1 | 2.9 |
| 166 | M1 | A12 | TiB | 11.0 | — | — | — | — | p1 | 3.0 |
| 167 | M1 | A12 | BC | 0.12 | — | — | — | — | p1 | 3.0 |
| 168 | M1 | A12 | BC | 0.5 | — | — | — | — | p1 | 3.1 |
| 169 | M1 | A12 | BC | 0.9 | — | — | — | — | p1 | 3.3 |
| 170 | M1 | A12 | BC | 2.8 | — | — | — | — | p1 | 3.1 |
| 171 | M1 | A12 | BC | 4.8 | — | — | — | — | p1 | 3.0 |
| 172 | M1 | A12 | BC | 9.5 | — | — | — | — | p1 | 3.1 |
| 173 | M1 | A12 | BC | 0.08 | — | — | — | — | p1 | 3.1 |
| 174 | M1 | A12 | BC | 11.0 | — | — | — | — | p1 | 3.0 |
| 175 | M1 | A12 | VC | 0.12 | — | — | — | — | p1 | 3.0 |
| 176 | M1 | A12 | VC | 0.5 | — | — | — | — | p1 | 2.9 |
| 177 | M1 | A12 | VC | 0.9 | — | — | — | — | p1 | 3.0 |
| 178 | M1 | A12 | VC | 2.8 | — | — | — | — | p1 | 3.0 |
| 179 | M1 | A12 | VC | 4.8 | — | — | — | — | p1 | 3.0 |
| 180 | M1 | A12 | VC | 9.5 | — | — | — | — | p1 | 3.0 |
| 181 | M1 | A12 | VC | 0.08 | — | — | — | — | p1 | 3.1 |
| 182 | M1 | A12 | VC | 11.0 | — | — | — | — | p1 | 3.2 |
| 183 | M1 | A12 | ZrB | 0.12 | — | — | — | — | p1 | 3.1 |
| 184 | M1 | A12 | ZrB | 0.5 | — | — | — | — | p1 | 3.0 |
| 185 | M1 | A12 | ZrB | 0.9 | — | — | — | — | p1 | 2.8 |
| 186 | M1 | A12 | ZrB | 2.8 | — | — | — | — | p1 | 3.0 |
| 187 | M1 | A12 | ZrB | 4.8 | — | — | — | — | p1 | 3.1 |
| 188 | M1 | A12 | ZrB | 0.08 | — | — | — | — | p1 | 3.1 |
| 189 | M1 | A12 | ZrB | 9.5 | — | — | — | — | p1 | 2.9 |
| 190 | M1 | A12 | ZrB | 11.0 | — | — | — | — | p1 | 3.0 |
| 191 | M1 | A12 | SiC | 0.12 | — | — | — | — | p1 | 2.9 |
| 192 | M1 | A12 | SiC | 0.5 | — | — | — | — | p1 | 3.0 |
| 193 | M1 | A12 | SiC | 0.9 | — | — | — | — | p1 | 3.2 |
| 194 | M1 | A12 | SiC | 2.8 | — | — | — | — | p1 | 3.0 |
| 195 | M1 | A12 | SiC | 4.8 | — | — | — | — | p1 | 3.0 |
| 196 | M1 | A12 | SiC | 9.5 | — | — | — | — | p1 | 3.1 |
| 197 | M1 | A12 | SiC | 0.08 | — | — | — | — | p1 | 3.1 |
| 198 | M1 | A12 | SiC | 11.0 | — | — | — | — | p1 | 3.0 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 151 | 3 | 3 | 6 | 5 | 6 | Inv. ex. |
| 152 | 4 | 6 | 5 | 5 | 5 | Inv. ex. |
| 153 | 4 | 6 | 5 | 5 | 5 | Inv. ex. |
| 154 | 4 | 6 | 5 | 5 | 3 | Inv. ex. |
| 155 | 4 | 6 | 5 | 5 | 3 | Inv. ex. |

TABLE 4-continued

| | | | | | | |
|---|---|---|---|---|---|---|
| 156 | 4 | 6 | 4 | 3 | 2 | Inv. ex. |
| 157 | 2 | 2 | 6 | 5 | 6 | Comp. ex. |
| 158 | 4 | 6 | 2 | 2 | 1 | Comp. ex. |
| 159 | 3 | 3 | 6 | 5 | 6 | Inv. ex. |
| 160 | 4 | 6 | 5 | 5 | 5 | Inv. ex. |
| 161 | 4 | 6 | 5 | 5 | 5 | Inv. ex. |
| 162 | 4 | 6 | 5 | 5 | 4 | Inv. ex. |
| 163 | 4 | 6 | 5 | 5 | 3 | Inv. ex. |
| 164 | 4 | 6 | 4 | 3 | 2 | Inv. ex. |
| 165 | 1 | 2 | 6 | 5 | 6 | Comp. ex. |
| 166 | 4 | 6 | 3 | 2 | 1 | Comp. ex. |
| 167 | 3 | 3 | 5 | 5 | 6 | Inv. ex. |
| 168 | 4 | 6 | 5 | 5 | 5 | Inv. ex. |
| 169 | 4 | 6 | 5 | 5 | 5 | Inv. ex. |
| 170 | 4 | 6 | 5 | 5 | 4 | Inv. ex. |
| 171 | 4 | 6 | 5 | 5 | 4 | Inv. ex. |
| 172 | 4 | 6 | 4 | 3 | 2 | Inv. ex. |
| 173 | 2 | 2 | 6 | 5 | 6 | Comp. ex. |
| 174 | 4 | 6 | 3 | 1 | 1 | Comp. ex. |
| 175 | 3 | 3 | 5 | 5 | 6 | Inv. ex. |
| 176 | 4 | 6 | 5 | 5 | 5 | Inv. ex. |
| 177 | 4 | 6 | 5 | 5 | 5 | Inv. ex. |
| 178 | 4 | 6 | 5 | 5 | 4 | Inv. ex. |
| 179 | 4 | 6 | 5 | 5 | 3 | Inv. ex. |
| 180 | 4 | 6 | 3 | 3 | 3 | Inv. ex. |
| 181 | 1 | 2 | 6 | 5 | 6 | Comp. ex. |
| 182 | 4 | 6 | 3 | 1 | 1 | Comp. ex. |
| 183 | 3 | 3 | 6 | 5 | 6 | Inv. ex. |
| 184 | 4 | 6 | 5 | 5 | 5 | Inv. ex. |
| 185 | 4 | 6 | 5 | 5 | 5 | Inv. ex. |
| 186 | 4 | 6 | 5 | 5 | 4 | Inv. ex. |
| 187 | 4 | 6 | 5 | 5 | 3 | Inv. ex. |
| 188 | 2 | 2 | 6 | 5 | 6 | Comp. ex. |
| 189 | 4 | 6 | 3 | 3 | 2 | Inv. ex. |
| 190 | 4 | 6 | 2 | 1 | 1 | Comp. ex. |
| 191 | 3 | 3 | 6 | 5 | 6 | Inv. ex. |
| 192 | 4 | 6 | 5 | 5 | 5 | Inv. ex. |
| 193 | 4 | 6 | 5 | 5 | 5 | Inv. ex. |
| 194 | 4 | 6 | 5 | 5 | 4 | Inv. ex. |
| 195 | 4 | 6 | 5 | 5 | 3 | Inv. ex. |
| 196 | 4 | 6 | 3 | 3 | 2 | Inv. ex. |
| 197 | 2 | 2 | 6 | 5 | 6 | Comp. ex. |
| 198 | 4 | 6 | 3 | 2 | 1 | Comp. ex. |

TABLE 5

| Precoated metal sheet no. | Metal sheet | Resin (A1) | Ceramic particles | | Curing agent (C) | | Silane coupling agent | Rust preventive agent | Coloring pigment | Coating film thickness (μm) |
|---|---|---|---|---|---|---|---|---|---|---|
| | | | Type | Content (vol %) | Type | Content (mass %) | | | | |
| 199 | M1 | A12 | BN | 0.12 | — | — | — | — | — | 3.0 |
| 200 | M1 | A12 | BN | 0.5 | — | — | — | — | — | 3.0 |
| 201 | M1 | A12 | BN | 2.8 | — | — | — | — | — | 3.0 |
| 202 | M1 | A12 | BN | 4.8 | — | — | — | — | — | 3.0 |
| 203 | M1 | A12 | BN | 9.5 | — | — | — | — | — | 3.2 |
| 204 | M1 | A12 | BN | 0.08 | — | — | — | — | — | 3.0 |
| 205 | M1 | A12 | BN | 11.0 | — | — | — | — | — | 2.9 |
| 206 | M1 | A12 | BN | 0.12 | — | — | — | — | p1 | 3.0 |
| 207 | M1 | A12 | BN | 0.5 | — | — | — | — | p1 | 3.1 |
| 208 | M1 | A12 | BN | 2.8 | — | — | — | — | p1 | 3.1 |
| 209 | M1 | A12 | BN | 4.8 | — | — | — | — | p1 | 3.2 |
| 210 | M1 | A12 | BN | 9.5 | — | — | — | — | p1 | 3.0 |
| 211 | M1 | A12 | BN | 0.08 | — | — | — | — | p1 | 3.1 |
| 212 | M1 | A12 | BN | 11.0 | — | — | — | — | p1 | 3.0 |
| 213 | M1 | A12 | TaN | 0.12 | — | — | — | — | — | 2.9 |
| 214 | M1 | A12 | TaN | 0.5 | — | — | — | — | — | 2.9 |
| 215 | M1 | A12 | TaN | 2.8 | — | — | — | — | — | 3.0 |
| 216 | M1 | A12 | TaN | 4.8 | — | — | — | — | — | 3.0 |
| 217 | M1 | A12 | TaN | 9.5 | — | — | — | — | — | 3.0 |
| 218 | M1 | A12 | TaN | 0.08 | — | — | — | — | — | 3.0 |
| 219 | M1 | A12 | TaN | 11.0 | — | — | — | — | — | 2.9 |
| 220 | M1 | A12 | TaN | 0.12 | — | — | — | — | p1 | 3.0 |
| 221 | M1 | A12 | TaN | 0.5 | — | — | — | — | p1 | 3.0 |
| 222 | M1 | A12 | TaN | 2.8 | — | — | — | — | p1 | 2.7 |
| 223 | M1 | A12 | TaN | 4.8 | — | — | — | — | p1 | 2.8 |

TABLE 5-continued

| | | | | | | | | | | | |
|---|---|---|---|---|---|---|---|---|---|---|---|
| 224 | M1 | A12 | TaN | 9.5 | — | — | — | — | p1 | 3.0 |
| 225 | M1 | A12 | TaN | 0.08 | — | — | — | — | p1 | 3.0 |
| 226 | M1 | A12 | TaN | 11.0 | — | — | — | — | p1 | 3.1 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 199 | 1 | 1 | 6 | 5 | 6 | Comp. ex. |
| 200 | 1 | 1 | 5 | 5 | 5 | Comp. ex. |
| 201 | 1 | 1 | 5 | 5 | 4 | Comp. ex. |
| 202 | 2 | 1 | 5 | 4 | 3 | Comp. ex. |
| 203 | 2 | 2 | 4 | 3 | 1 | Comp. ex. |
| 204 | 1 | 1 | 6 | 5 | 6 | Comp. ex. |
| 205 | 2 | 2 | 3 | 2 | 1 | Comp. ex. |
| 206 | 1 | 1 | 6 | 5 | 6 | Comp. ex. |
| 207 | 1 | 1 | 5 | 5 | 5 | Comp. ex. |
| 208 | 1 | 1 | 5 | 5 | 4 | Comp. ex. |
| 209 | 2 | 1 | 5 | 4 | 3 | Comp. ex. |
| 210 | 2 | 2 | 4 | 3 | 1 | Comp. ex. |
| 211 | 1 | 1 | 6 | 5 | 6 | Comp. ex. |
| 212 | 2 | 1 | 3 | 2 | 1 | Comp. ex. |
| 213 | 1 | 1 | 6 | 5 | 6 | Comp. ex. |
| 214 | 1 | 1 | 5 | 5 | 5 | Comp. ex. |
| 215 | 1 | 2 | 5 | 5 | 4 | Comp. ex. |
| 216 | 2 | 2 | 5 | 4 | 2 | Comp. ex. |
| 217 | 2 | 3 | 4 | 2 | 1 | Comp. ex. |
| 218 | 1 | 1 | 6 | 5 | 6 | Comp. ex. |
| 219 | 2 | 3 | 3 | 2 | 1 | Comp. ex. |
| 220 | 1 | 1 | 6 | 5 | 6 | Comp. ex. |
| 221 | 2 | 1 | 5 | 4 | 5 | Comp. ex. |
| 222 | 2 | 1 | 5 | 4 | 4 | Comp. ex. |
| 223 | 2 | 2 | 5 | 3 | 2 | Comp. ex. |
| 224 | 2 | 3 | 4 | 3 | 1 | Comp. ex. |
| 225 | 1 | 1 | 6 | 5 | 6 | Comp. ex. |
| 226 | 2 | 3 | 3 | 2 | 1 | Comp. ex. |

TABLE 6

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 227 | M1 | A13 | TiN | 0.12 | — | — | — | — | — | 3.0 |
| 228 | M1 | A13 | TiN | 0.5 | — | — | — | — | — | 3.1 |
| 229 | M1 | A13 | TiN | 0.9 | — | — | — | — | — | 3.1 |
| 230 | M1 | A13 | TiN | 2.8 | — | — | — | — | — | 3.0 |
| 231 | M1 | A13 | TiN | 4.8 | — | — | — | — | — | 3.0 |
| 232 | M1 | A13 | TiN | 9.5 | — | — | — | — | — | 3.0 |
| 233 | M1 | A13 | — | — | — | — | — | — | — | 3.0 |
| 234 | M1 | A13 | TiN | 0.08 | — | — | — | — | — | 3.0 |
| 235 | M1 | A13 | TiN | 11.0 | — | — | — | — | — | 2.9 |
| 236 | M1 | A13 | TiN | 0.5 | — | — | — | — | — | 1.5 |
| 237 | M1 | A13 | TiN | 0.5 | — | — | — | — | — | 4.0 |
| 238 | M1 | A13 | TiN | 0.5 | — | — | — | — | — | 5.6 |
| 239 | M1 | A13 | TiN | 0.5 | — | — | — | — | — | 8.0 |
| 240 | M1 | A13 | TiN | 0.5 | — | — | — | — | — | 11.1 |
| 241 | M1 | A13 | TiN | 0.12 | — | — | — | — | p1 | 3.0 |
| 242 | M1 | A13 | TiN | 0.5 | — | — | — | — | p1 | 3.0 |
| 243 | M1 | A13 | TiN | 0.9 | — | — | — | — | p1 | 3.0 |
| 244 | M1 | A13 | TiN | 2.8 | — | — | — | — | p1 | 3.0 |
| 245 | M1 | A13 | TiN | 4.8 | — | — | — | — | p1 | 3.2 |
| 246 | M1 | A13 | TiN | 9.5 | — | — | — | — | p1 | 3.2 |
| 247 | M1 | A13 | — | — | — | — | — | — | p1 | 3.0 |
| 248 | M1 | A13 | TiN | 0.08 | — | — | — | — | p1 | 3.0 |
| 249 | M1 | A13 | TiN | 11.0 | — | — | — | — | p1 | 3.0 |
| 250 | M1 | A13 | TiN | 0.5 | — | — | — | — | p1 | 1.5 |
| 251 | M1 | A13 | TiN | 0.5 | — | — | — | — | p1 | 3.9 |
| 252 | M1 | A13 | TiN | 0.5 | — | — | — | — | p1 | 5.5 |
| 253 | M1 | A13 | TiN | 0.5 | — | — | — | — | p1 | 8.0 |
| 254 | M1 | A13 | TiN | 0.5 | — | — | — | — | p1 | 11.0 |
| 255 | M1 | A13 | TiN | 0.12 | C1 | 15 | — | — | p1 | 3.0 |
| 256 | M1 | A13 | TiN | 0.5 | C1 | 15 | — | — | p1 | 3.0 |

TABLE 6-continued

| Precoated metal sheet no. | Metal sheet | Resin (A1) | Ceramic particles Type | Content (vol %) | Curing agent (C) Type | Content (mass %) | Silane coupling agent | Rust preventive agent | Coloring pigment | Coating film thickness (μm) |
|---|---|---|---|---|---|---|---|---|---|---|
| 257 | M1 | A13 | TiN | 0.9 | C1 | 15 | — | — | p1 | 3.0 |
| 258 | M1 | A13 | TiN | 2.8 | C1 | 15 | — | — | p1 | 3.1 |
| 259 | M1 | A13 | TiN | 4.8 | C1 | 15 | — | — | p1 | 3.0 |
| 260 | M1 | A13 | TiN | 9.5 | C1 | 15 | — | — | p1 | 3.0 |
| 261 | M1 | A13 | — | — | C1 | 15 | — | — | p1 | 2.9 |
| 262 | M1 | A13 | TiN | 0.08 | C1 | 15 | — | — | p1 | 3.0 |
| 263 | M1 | A13 | TiN | 11.0 | C1 | 15 | — | — | p1 | 3.0 |
| 264 | M1 | A13 | TiN | 0.5 | C1 | 15 | — | — | p1 | 1.5 |
| 265 | M1 | A13 | TiN | 0.5 | C1 | 15 | — | — | p1 | 4.0 |
| 266 | M1 | A13 | TiN | 0.5 | C1 | 15 | — | — | p1 | 5.5 |
| 267 | M1 | A13 | TiN | 0.5 | C1 | 15 | — | — | p1 | 8.0 |
| 268 | M1 | A13 | TiN | 0.5 | C1 | 15 | — | — | p1 | 11.0 |
| 269 | M1 | A13 | TiN | 0.5 | C1 | 40 | — | — | p1 | 3.0 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 227 | 3 | 3 | 4 | 4 | 6 | Inv. ex. |
| 228 | 4 | 6 | 4 | 4 | 6 | Inv. ex. |
| 229 | 4 | 6 | 4 | 4 | 6 | Inv. ex. |
| 230 | 4 | 6 | 4 | 4 | 5 | Inv. ex. |
| 231 | 4 | 6 | 4 | 4 | 3 | Inv. ex. |
| 232 | 4 | 6 | 3 | 3 | 2 | Inv. ex. |
| 233 | Unweldable | 1 | 4 | 4 | 6 | Comp. ex. (no ceramic particles) |
| 234 | 2 | 2 | 4 | 4 | 6 | Comp. ex. |
| 235 | 4 | 6 | 3 | 1 | 1 | Comp. ex. |
| 236 | 4 | 6 | 3 | 3 | 6 | Inv. ex. |
| 237 | 4 | 6 | 5 | 4 | 6 | Inv. ex. |
| 238 | 4 | 6 | 5 | 4 | 6 | Inv. ex. |
| 239 | 3 | 5 | 5 | 4 | 6 | Inv. ex. |
| 240 | 3 | 4 | 5 | 5 | 6 | Inv. ex. |
| 241 | 3 | 3 | 4 | 4 | 6 | Inv. ex. |
| 242 | 4 | 6 | 4 | 4 | 6 | Inv. ex. |
| 243 | 4 | 6 | 4 | 4 | 5 | Inv. ex. |
| 244 | 4 | 6 | 4 | 4 | 4 | Inv. ex. |
| 245 | 4 | 6 | 4 | 2 | 3 | Inv. ex. |
| 246 | 4 | 6 | 3 | 1 | 3 | Inv. ex. |
| 247 | Unweldable | 1 | 4 | 4 | 6 | Comp. ex. (no ceramic particles) |
| 248 | 2 | 2 | 4 | 4 | 6 | Comp. ex. |
| 249 | 4 | 6 | 2 | 1 | 1 | Comp. ex. |
| 250 | 4 | 6 | 3 | 3 | 6 | Inv. ex. |
| 251 | 4 | 6 | 5 | 4 | 6 | Inv. ex. |
| 252 | 4 | 6 | 5 | 4 | 6 | Inv. ex. |
| 253 | 3 | 5 | 5 | 4 | 6 | Inv. ex. |
| 254 | 3 | 4 | 5 | 4 | 6 | Inv. ex. |
| 255 | 3 | 3 | 5 | 5 | 6 | Inv. ex. |
| 256 | 4 | 6 | 5 | 4 | 6 | Inv. ex. |
| 257 | 4 | 6 | 5 | 4 | 6 | Inv. ex. |
| 258 | 4 | 6 | 5 | 4 | 4 | Inv. ex. |
| 259 | 4 | 6 | 5 | 3 | 3 | Inv. ex. |
| 260 | 4 | 6 | 3 | 3 | 2 | Inv. ex. |
| 261 | Unweldable | 1 | 5 | 5 | 6 | Comp. ex. (no ceramic particles) |
| 262 | 2 | 2 | 5 | 5 | 6 | Comp. ex. |
| 263 | 4 | 6 | 2 | 2 | 1 | Comp. ex. |
| 264 | 4 | 6 | 4 | 4 | 6 | Inv. ex. |
| 265 | 4 | 6 | 5 | 5 | 6 | Inv. ex. |
| 266 | 4 | 6 | 5 | 5 | 6 | Inv. ex. |
| 267 | 3 | 5 | 5 | 5 | 6 | Inv. ex. |
| 268 | 3 | 4 | 6 | 5 | 6 | Inv. ex. |
| 269 | 4 | 6 | 3 | 3 | 5 | Inv. ex. |

TABLE 7

| Precoated metal sheet no. | Metal sheet | Resin (A1) | Ceramic particles Type | Content (vol %) | Curing agent (C) Type | Content (mass %) | Silane coupling agent | Rust preventive agent | Coloring pigment | Coating film thickness (μm) |
|---|---|---|---|---|---|---|---|---|---|---|
| 270 | M1 | A15 | TiN | 0.12 | — | — | — | — | — | 3.0 |
| 271 | M1 | A15 | TiN | 0.5 | — | — | — | — | — | 3.1 |
| 272 | M1 | A15 | TiN | 0.9 | — | — | — | — | — | 3.1 |
| 273 | M1 | A15 | TiN | 2.8 | — | — | — | — | — | 3.1 |
| 274 | M1 | A15 | TiN | 4.8 | — | — | — | — | — | 3.0 |

TABLE 7-continued

| No. | | | | | | | | | | |
|---|---|---|---|---|---|---|---|---|---|---|
| 275 | M1 | A15 | TiN | 9.5 | — | — | — | — | — | 3.0 |
| 276 | M1 | A15 | — | — | — | — | — | — | — | 3.0 |
| 277 | M1 | A15 | TiN | 0.08 | — | — | — | — | — | 3.0 |
| 278 | M1 | A15 | TiN | 11.0 | — | — | — | — | — | 3.0 |
| 279 | M1 | A15 | TiN | 0.5 | — | — | — | — | — | 1.5 |
| 280 | M1 | A15 | TiN | 0.5 | — | — | — | — | — | 4.0 |
| 281 | M1 | A15 | TiN | 0.5 | — | — | — | — | — | 5.6 |
| 282 | M1 | A15 | TiN | 0.5 | — | — | — | — | — | 8.0 |
| 283 | M1 | A15 | TiN | 0.5 | — | — | — | — | — | 11.1 |
| 284 | M1 | A15 | TiN | 0.12 | — | — | — | — | p1 | 3.0 |
| 285 | M1 | A15 | TiN | 0.5 | — | — | — | — | p1 | 3.0 |
| 286 | M1 | A15 | TiN | 0.9 | — | — | — | — | p1 | 3.0 |
| 287 | M1 | A15 | TiN | 2.8 | — | — | — | — | p1 | 3.1 |
| 288 | M1 | A15 | TiN | 4.8 | — | — | — | — | p1 | 3.2 |
| 289 | M1 | A15 | TiN | 9.5 | — | — | — | — | p1 | 3.2 |
| 290 | M1 | A15 | — | — | — | — | — | — | p1 | 3.0 |
| 291 | M1 | A15 | TiN | 0.08 | — | — | — | — | p1 | 3.0 |
| 292 | M1 | A15 | TiN | 11.0 | — | — | — | — | p1 | 3.0 |
| 293 | M1 | A15 | TiN | 0.5 | — | — | — | — | p1 | 1.5 |
| 294 | M1 | A15 | TiN | 0.5 | — | — | — | — | p1 | 3.9 |
| 295 | M1 | A15 | TiN | 0.5 | — | — | — | — | p1 | 5.5 |
| 296 | M1 | A15 | TiN | 0.5 | — | — | — | — | p1 | 8.0 |
| 297 | M1 | A15 | TiN | 0.5 | — | — | — | — | p1 | 11.0 |
| 298 | M1 | A15 | TiN | 0.12 | C1 | 15 | — | — | p1 | 3.0 |
| 299 | M1 | A15 | TiN | 0.5 | C1 | 15 | — | — | p1 | 3.0 |
| 300 | M1 | A15 | TiN | 0.9 | C1 | 15 | — | — | p1 | 3.0 |
| 301 | M1 | A15 | TiN | 2.8 | C1 | 15 | — | — | p1 | 3.1 |
| 302 | M1 | A15 | TiN | 4.8 | C1 | 15 | — | — | p1 | 3.0 |
| 303 | M1 | A15 | TiN | 9.5 | C1 | 15 | — | — | p1 | 3.0 |
| 304 | M1 | A15 | — | — | C1 | 15 | — | — | p1 | 3.1 |
| 305 | M1 | A15 | TiN | 0.08 | C1 | 15 | — | — | p1 | 3.0 |
| 306 | M1 | A15 | TiN | 11.0 | C1 | 15 | — | — | p1 | 3.1 |
| 307 | M1 | A15 | TiN | 0.5 | C1 | 15 | — | — | p1 | 1.5 |
| 308 | M1 | A15 | TiN | 0.5 | C1 | 40 | — | — | p1 | 3.0 |

| Precoated metal sheet no. | Conductivity Weld-ability | Conductivity Ground-ability | Corrosion resistance Flat part | Corrosion resistance Worked part | Coating film color change | Remarks |
|---|---|---|---|---|---|---|
| 270 | 2 | 1 | 4 | 4 | 5 | Comp. ex. |
| 271 | 2 | 1 | 4 | 4 | 3 | Comp. ex. |
| 272 | 2 | 1 | 4 | 4 | 3 | Comp. ex. |
| 273 | 2 | 1 | 4 | 4 | 2 | Comp. ex. |
| 274 | 2 | 2 | 3 | 3 | 1 | Comp. ex. |
| 275 | 3 | 4 | 2 | 1 | 1 | Comp. ex. |
| 276 | Unweldable | 1 | 4 | 4 | 6 | Comp. ex. (no ceramic particles) |
| 277 | 2 | 1 | 4 | 4 | 5 | Comp. ex. |
| 278 | 3 | 4 | 1 | 1 | 1 | Comp. ex. |
| 279 | 2 | 1 | 3 | 3 | 4 | Comp. ex. |
| 280 | 2 | 1 | 5 | 4 | 3 | Comp. ex. |
| 281 | 2 | 1 | 5 | 4 | 3 | Comp. ex. |
| 282 | 2 | 1 | 5 | 4 | 3 | Comp. ex. |
| 283 | 1 | 1 | 5 | 4 | 3 | Comp. ex. |
| 284 | 1 | 1 | 4 | 4 | 5 | Comp. ex. |
| 285 | 1 | 1 | 4 | 4 | 3 | Comp. ex. |
| 286 | 1 | 1 | 4 | 4 | 3 | Comp. ex. |
| 287 | 1 | 1 | 4 | 4 | 2 | Comp. ex. |
| 288 | 2 | 2 | 4 | 3 | 1 | Comp. ex. |
| 289 | 3 | 4 | 3 | 2 | 1 | Comp. ex. |
| 290 | Unweldable | 1 | 4 | 4 | 6 | Comp. ex. (no ceramic particles) |
| 291 | 1 | 1 | 4 | 4 | 5 | Comp. ex. |
| 292 | 3 | 4 | 2 | 1 | 1 | Comp. ex. |
| 293 | 2 | 1 | 3 | 3 | 3 | Comp. ex. |
| 294 | 2 | 1 | 5 | 4 | 3 | Comp. ex. |
| 295 | 1 | 1 | 5 | 4 | 3 | Comp. ex. |
| 296 | 1 | 1 | 5 | 4 | 3 | Comp. ex. |
| 297 | 1 | 1 | 5 | 4 | 3 | Comp. ex. |
| 298 | 1 | 1 | 4 | 4 | 4 | Comp. ex. |
| 299 | 1 | 1 | 4 | 4 | 3 | Comp. ex. |
| 300 | 1 | 1 | 4 | 4 | 3 | Comp. ex. |
| 301 | 1 | 1 | 4 | 4 | 2 | Comp. ex. |
| 302 | 1 | 2 | 4 | 3 | 1 | Comp. ex. |
| 303 | 3 | 4 | 3 | 3 | 1 | Comp. ex. |
| 304 | Unweldable | 1 | 4 | 4 | 6 | Comp. ex. (no ceramic particles) |
| 305 | 1 | 1 | 4 | 4 | 5 | Comp. ex. |

TABLE 7-continued

| | | | | | | |
|---|---|---|---|---|---|---|
| 306 | 3 | 4 | 2 | 2 | 1 | Comp. ex. |
| 307 | 2 | 1 | 3 | 3 | 4 | Comp. ex. |
| 308 | 1 | 1 | 3 | 3 | 3 | Comp. ex. |

TABLE 8

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 309 | M1 | A16 | TiN | 0.12 | — | — | — | — | — | 3.0 |
| 310 | M1 | A16 | TiN | 0.5 | — | — | — | — | — | 2.9 |
| 311 | M1 | A16 | TiN | 0.9 | — | — | — | — | — | 2.9 |
| 312 | M1 | A16 | TiN | 2.8 | — | — | — | — | — | 3.2 |
| 313 | M1 | A16 | TiN | 4.8 | — | — | — | — | — | 3.0 |
| 314 | M1 | A16 | TiN | 9.5 | — | — | — | — | — | 3.0 |
| 315 | M1 | A16 | — | — | — | — | — | — | — | 3.0 |
| 316 | M1 | A16 | TiN | 0.08 | — | — | — | — | — | 3.0 |
| 317 | M1 | A16 | TiN | 11.0 | — | — | — | — | — | 3.1 |
| 318 | M1 | A16 | TiN | 0.5 | — | — | — | — | — | 1.6 |
| 319 | M1 | A16 | TiN | 0.5 | — | — | — | — | — | 4.1 |
| 320 | M1 | A16 | TiN | 0.5 | — | — | — | — | — | 5.5 |
| 321 | M1 | A16 | TiN | 0.5 | — | — | — | — | — | 8.1 |
| 322 | M1 | A16 | TiN | 0.5 | — | — | — | — | — | 11.0 |
| 323 | M1 | A16 | TiN | 0.12 | — | — | — | — | p1 | 3.0 |
| 324 | M1 | A16 | TiN | 0.5 | — | — | — | — | p1 | 3.0 |
| 325 | M1 | A16 | TiN | 0.9 | — | — | — | — | p1 | 3.0 |
| 326 | M1 | A16 | TiN | 2.8 | — | — | — | — | p1 | 2.9 |
| 327 | M1 | A16 | TiN | 4.8 | — | — | — | — | p1 | 2.9 |
| 328 | M1 | A16 | TiN | 9.5 | — | — | — | — | p1 | 2.9 |
| 329 | M1 | A16 | — | — | — | — | — | — | p1 | 3.0 |
| 330 | M1 | A16 | TiN | 0.08 | — | — | — | — | p1 | 3.0 |
| 331 | M1 | A16 | TiN | 11.0 | — | — | — | — | p1 | 3.1 |
| 332 | M1 | A16 | TiN | 0.5 | — | — | — | — | p1 | 1.5 |
| 333 | M1 | A16 | TiN | 0.5 | — | — | — | — | p1 | 4.1 |
| 334 | M1 | A16 | TiN | 0.5 | — | — | — | — | p1 | 5.5 |
| 335 | M1 | A16 | TiN | 0.5 | — | — | — | — | p1 | 7.9 |
| 336 | M1 | A16 | TiN | 0.5 | — | — | — | — | p1 | 11.0 |
| 337 | M1 | A16 | TiN | 0.12 | C1 | 15 | — | — | p1 | 3.0 |
| 338 | M1 | A16 | TiN | 0.5 | C1 | 15 | — | — | p1 | 3.1 |
| 339 | M1 | A16 | TiN | 2.8 | C1 | 15 | — | — | p1 | 3.2 |
| 340 | M1 | A16 | TiN | 4.8 | C1 | 15 | — | — | p1 | 2.9 |
| 341 | M1 | A16 | — | — | C1 | 15 | — | — | p1 | 3.0 |
| 342 | M1 | A16 | TiN | 0.08 | C1 | 15 | — | — | p1 | 3.0 |
| 343 | M1 | A16 | TiN | 11.0 | C1 | 15 | — | — | p1 | 3.1 |
| 344 | M1 | A16 | TiN | 0.5 | C1 | 15 | — | — | p1 | 1.5 |
| 345 | M1 | A16 | TiN | 0.5 | C1 | 15 | — | — | p1 | 4.0 |
| 346 | M1 | A16 | TiN | 0.5 | C1 | 15 | — | — | p1 | 5.4 |
| 347 | M1 | A16 | TiN | 0.5 | C1 | 15 | — | — | p1 | 8.0 |
| 348 | M1 | A16 | TiN | 0.5 | C1 | 15 | — | — | p1 | 10.9 |
| 349 | M1 | A16 | TiN | 0.5 | C1 | 40 | — | — | p1 | 3.0 |
| 350 | M1 | A16 | TiN | 0.12 | — | — | s1 | — | p1 | 3.1 |
| 351 | M1 | A16 | TiN | 0.5 | — | — | s1 | — | p1 | 3.1 |
| 352 | M1 | A16 | TiN | 0.12 | — | — | s2 | — | p1 | 3.1 |
| 353 | M1 | A16 | TiN | 0.5 | — | — | s2 | — | p1 | 3.1 |
| 354 | M1 | A16 | TiN | 0.12 | — | — | — | i2 | p1 | 3.0 |
| 355 | M1 | A16 | TiN | 0.12 | — | — | — | i3 | p1 | 3.0 |
| 356 | M1 | A16 | TaN | 0.12 | — | — | — | — | — | 3.1 |
| 357 | M1 | A16 | TaN | 0.5 | — | — | — | — | — | 3.1 |
| 358 | M1 | A16 | TaN | 2.8 | — | — | — | — | — | 2.8 |
| 359 | M1 | A16 | TaN | 4.8 | — | — | — | — | — | 2.8 |
| 360 | M1 | A16 | TaN | 9.5 | — | — | — | — | — | 3.1 |
| 361 | M1 | A16 | TaN | 0.08 | — | — | — | — | — | 3.1 |
| 362 | M1 | A16 | TaN | 11.0 | — | — | — | — | — | 3.0 |
| 363 | M1 | A16 | TaN | 0.12 | — | — | — | — | p1 | 3.2 |
| 364 | M1 | A16 | TaN | 0.5 | — | — | — | — | p1 | 3.0 |
| 365 | M1 | A16 | TaN | 2.8 | — | — | — | — | p1 | 3.0 |
| 366 | M1 | A16 | TaN | 4.8 | — | — | — | — | p1 | 3.0 |
| 367 | M1 | A16 | TaN | 9.5 | — | — | — | — | p1 | 3.1 |
| 368 | M1 | A16 | TaN | 0.08 | — | — | — | — | p1 | 3.0 |
| 369 | M1 | A16 | TaN | 11.0 | — | — | — | — | p1 | 3.0 |

TABLE 8-continued

| Precoated metal sheet no. | Conductivity Weld-ability | Ground-ability | Corrosion resistance Flat part | Worked part | Coating film color change | Remarks |
|---|---|---|---|---|---|---|
| 309 | 3 | 3 | 6 | 5 | 6 | Inv. ex. |
| 310 | 4 | 6 | 6 | 5 | 5 | Inv. ex. |
| 311 | 4 | 6 | 6 | 5 | 5 | Inv. ex. |
| 312 | 4 | 6 | 6 | 5 | 4 | Inv. ex. |
| 313 | 4 | 6 | 5 | 4 | 3 | Inv. ex. |
| 314 | 4 | 6 | 5 | 4 | 3 | Inv. ex. |
| 315 | Unweldable | 1 | 6 | 5 | 6 | Comp. ex. (no ceramic particles) |
| 316 | 2 | 2 | 6 | 5 | 6 | Comp. ex. |
| 317 | 4 | 6 | 3 | 2 | 1 | Comp. ex. |
| 318 | 4 | 6 | 5 | 4 | 6 | Inv. ex. |
| 319 | 4 | 6 | 6 | 5 | 6 | Inv. ex. |
| 320 | 4 | 6 | 6 | 5 | 6 | Inv. ex. |
| 321 | 3 | 5 | 6 | 5 | 6 | Inv. ex. |
| 322 | 3 | 4 | 6 | 5 | 6 | Inv. ex. |
| 323 | 3 | 3 | 6 | 5 | 6 | Inv. ex. |
| 324 | 4 | 6 | 6 | 5 | 5 | Inv. ex. |
| 325 | 4 | 6 | 6 | 5 | 5 | Inv. ex. |
| 326 | 4 | 6 | 6 | 5 | 4 | Inv. ex. |
| 327 | 4 | 6 | 5 | 4 | 3 | Inv. ex. |
| 328 | 4 | 6 | 3 | 3 | 3 | Inv. ex. |
| 329 | Unweldable | 1 | 6 | 5 | 6 | Comp. ex. (no ceramic particles) |
| 330 | 2 | 2 | 6 | 5 | 6 | Comp. ex. |
| 331 | 4 | 6 | 2 | 1 | 1 | Comp. ex. |
| 332 | 4 | 6 | 5 | 4 | 6 | Inv. ex. |
| 333 | 4 | 6 | 6 | 5 | 6 | Inv. ex. |
| 334 | 4 | 6 | 6 | 5 | 6 | Inv. ex. |
| 335 | 3 | 5 | 6 | 5 | 6 | Inv. ex. |
| 336 | 3 | 4 | 6 | 5 | 6 | Inv. ex. |
| 337 | 3 | 3 | 6 | 6 | 6 | Inv. ex. |
| 338 | 4 | 6 | 6 | 6 | 5 | Inv. ex. |
| 339 | 4 | 6 | 6 | 6 | 4 | Inv. ex. |
| 340 | 4 | 6 | 6 | 5 | 3 | Inv. ex. |
| 341 | Unweldable | 1 | 6 | 6 | 6 | Comp. ex. (no ceramic particles) |
| 342 | 2 | 2 | 6 | 6 | 6 | Comp. ex. |
| 343 | 4 | 6 | 4 | 2 | 1 | Comp. ex. |
| 344 | 4 | 6 | 6 | 5 | 6 | Inv. ex. |
| 345 | 4 | 6 | 6 | 6 | 6 | Inv. ex. |
| 346 | 4 | 6 | 6 | 6 | 6 | Inv. ex. |
| 347 | 3 | 5 | 6 | 6 | 6 | Inv. ex. |
| 348 | 3 | 4 | 6 | 6 | 6 | Inv. ex. |
| 349 | 4 | 6 | 5 | 4 | 5 | Inv. ex. |
| 350 | 3 | 3 | 6 | 6 | 6 | Inv. ex. |
| 351 | 4 | 6 | 6 | 6 | 6 | Inv. ex. |
| 352 | 3 | 3 | 6 | 6 | 6 | Inv. ex. |
| 353 | 4 | 6 | 6 | 6 | 5 | Inv. ex. |
| 354 | 3 | 3 | 6 | 6 | 6 | Inv. ex. |
| 355 | 3 | 3 | 6 | 6 | 6 | Inv. ex. |
| 356 | 1 | 1 | 6 | 5 | 6 | Comp. ex. |
| 357 | 1 | 1 | 5 | 5 | 5 | Comp. ex. |
| 358 | 1 | 2 | 5 | 5 | 4 | Comp. ex. |
| 359 | 2 | 2 | 5 | 4 | 2 | Comp. ex. |
| 360 | 2 | 2 | 3 | 2 | 1 | Comp. ex. |
| 361 | 1 | 1 | 6 | 5 | 6 | Comp. ex. |
| 362 | 2 | 3 | 3 | 1 | 1 | Comp. ex. |
| 363 | 1 | 1 | 6 | 5 | 6 | Comp. ex. |
| 364 | 2 | 1 | 5 | 4 | 5 | Comp. ex. |
| 365 | 2 | 1 | 5 | 4 | 4 | Comp. ex. |
| 366 | 2 | 2 | 5 | 3 | 2 | Comp. ex. |
| 367 | 2 | 2 | 3 | 3 | 1 | Comp. ex. |
| 368 | 1 | 1 | 6 | 5 | 6 | Comp. ex. |
| 369 | 2 | 3 | 3 | 1 | 1 | Comp. ex. |

TABLE 9

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 370 | M1 | A17 | TiN | 0.12 | — | — | — | — | — | 3.0 |
| 371 | M1 | A17 | TiN | 0.5 | — | — | — | — | — | 3.0 |
| 372 | M1 | A17 | TiN | 2.8 | — | — | — | — | — | 3.0 |
| 373 | M1 | A17 | TiN | 4.8 | — | — | — | — | — | 3.0 |
| 374 | M1 | A17 | TiN | 9.5 | — | — | — | — | — | 3.2 |
| 375 | M1 | A17 | — | — | — | — | — | — | — | 3.0 |
| 376 | M1 | A17 | TiN | 0.08 | — | — | — | — | — | 3.0 |
| 377 | M1 | A17 | TiN | 11.0 | — | — | — | — | — | 3.0 |
| 378 | M1 | A17 | TiN | 0.5 | — | — | — | — | — | 1.5 |
| 379 | M1 | A17 | TiN | 0.5 | — | — | — | — | — | 3.9 |
| 380 | M1 | A17 | TiN | 0.5 | — | — | — | — | — | 8.0 |
| 381 | M1 | A17 | TiN | 0.5 | — | — | — | — | — | 11.0 |
| 382 | M1 | A17 | TiN | 0.12 | — | — | — | — | p1 | 2.9 |
| 383 | M1 | A17 | TiN | 0.5 | — | — | — | — | p1 | 3.0 |
| 384 | M1 | A17 | TiN | 2.8 | — | — | — | — | p1 | 3.1 |
| 385 | M1 | A17 | TiN | 4.8 | — | — | — | — | p1 | 3.2 |
| 386 | M1 | A17 | TiN | 9.5 | — | — | — | — | p1 | 3.2 |
| 387 | M1 | A17 | — | — | — | — | — | — | p1 | 3.0 |
| 388 | M1 | A17 | TiN | 0.08 | — | — | — | — | p1 | 3.1 |
| 389 | M1 | A17 | TiN | 11.0 | — | — | — | — | p1 | 3.0 |
| 390 | M1 | A17 | TiN | 0.12 | — | — | s1 | — | p1 | 3.0 |
| 391 | M1 | A17 | TiN | 0.5 | — | — | s1 | — | p1 | 3.1 |
| 392 | M1 | A17 | TiN | 2.8 | — | — | s1 | — | p1 | 3.1 |
| 393 | M1 | A17 | TiN | 4.8 | — | — | s1 | — | p1 | 3.0 |
| 394 | M1 | A17 | TiN | 9.5 | — | — | s1 | — | p1 | 3.0 |
| 395 | M1 | A17 | — | — | — | — | s1 | — | p1 | 3.1 |
| 396 | M1 | A17 | TiN | 0.08 | — | — | s1 | — | p1 | 3.0 |
| 397 | M1 | A17 | TiN | 11.0 | — | — | s1 | — | p1 | 3.0 |
| 398 | M1 | A17 | TiN | 0.12 | — | — | — | i3 | p1 | 3.0 |
| 399 | M1 | A17 | TiN | 0.5 | — | — | — | i3 | p1 | 2.9 |
| 400 | M1 | A17 | TiN | 2.8 | — | — | — | i3 | p1 | 2.9 |
| 401 | M1 | A17 | TiN | 4.8 | — | — | — | i3 | p1 | 3.0 |
| 402 | M1 | A17 | TiN | 9.5 | — | — | — | i3 | p1 | 3.0 |
| 403 | M1 | A17 | — | — | — | — | — | i3 | p1 | 3.1 |
| 404 | M1 | A17 | TiN | 0.08 | — | — | — | i3 | p1 | 3.1 |
| 405 | M1 | A17 | TiN | 11.0 | — | — | — | i3 | p1 | 3.0 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 370 | 4 | 5 | 4 | 3 | 5 | Inv. ex. |
| 371 | 4 | 6 | 4 | 3 | 5 | Inv. ex. |
| 372 | 4 | 6 | 4 | 3 | 4 | Inv. ex. |
| 373 | 4 | 6 | 4 | 3 | 3 | Inv. ex. |
| 374 | 4 | 6 | 4 | 2 | 3 | Inv. ex. |
| 375 | Unweldable | 1 | 4 | 3 | 6 | Comp. ex. (no ceramic particles) |
| 376 | 2 | 2 | 4 | 3 | 5 | Comp. ex. |
| 377 | 4 | 6 | 2 | 1 | 1 | Comp. ex. |
| 378 | 4 | 6 | 4 | 3 | 4 | Inv. ex. |
| 379 | 4 | 6 | 4 | 3 | 4 | Inv. ex. |
| 380 | 3 | 5 | 5 | 4 | 4 | Inv. ex. |
| 381 | 3 | 4 | 5 | 5 | 4 | Inv. ex. |
| 382 | 4 | 5 | 4 | 3 | 5 | Inv. ex. |
| 383 | 4 | 6 | 4 | 3 | 4 | Inv. ex. |
| 384 | 4 | 6 | 4 | 3 | 3 | Inv. ex. |
| 385 | 4 | 6 | 4 | 3 | 3 | Inv. ex. |
| 386 | 4 | 6 | 4 | 2 | 3 | Inv. ex. |
| 387 | Unweldable | 1 | 4 | 3 | 6 | Comp. ex. (no ceramic particles) |
| 388 | 2 | 2 | 4 | 3 | 5 | Comp. ex. |
| 389 | 4 | 6 | 2 | 1 | 1 | Comp. ex. |
| 390 | 4 | 6 | 5 | 5 | 4 | Inv. ex. |
| 391 | 4 | 6 | 5 | 5 | 4 | Inv. ex. |
| 392 | 4 | 6 | 5 | 5 | 3 | Inv. ex. |
| 393 | 4 | 6 | 5 | 4 | 3 | Inv. ex. |
| 394 | 4 | 6 | 4 | 2 | 3 | Inv. ex. |
| 395 | Unweldable | 1 | 5 | 5 | 6 | Comp. ex. (no ceramic particles) |
| 396 | 2 | 2 | 5 | 5 | 4 | Comp. ex. |
| 397 | 4 | 6 | 3 | 1 | 1 | Comp. ex. |
| 398 | 4 | 5 | 5 | 5 | 4 | Inv. ex. |
| 399 | 4 | 6 | 5 | 5 | 4 | Inv. ex. |
| 400 | 4 | 6 | 5 | 5 | 3 | Inv. ex. |

TABLE 9-continued

| | | | | | | |
|---|---|---|---|---|---|---|
| 401 | 4 | 6 | 5 | 4 | 3 | Inv. ex. |
| 402 | 4 | 6 | 4 | 3 | 2 | Inv. ex. |
| 403 | Unweldable | 1 | 5 | 5 | 6 | Comp. ex. (no ceramic particles) |
| 404 | 2 | 2 | 5 | 5 | 4 | Comp. ex. |
| 405 | 4 | 6 | 3 | 2 | 1 | Comp. ex. |

TABLE 10

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 406 | M1 | A18 | TiN | 0.12 | — | — | — | — | — | 3.0 |
| 407 | M1 | A18 | TiN | 0.5 | — | — | — | — | — | 3.1 |
| 408 | M1 | A18 | TiN | 2.8 | — | — | — | — | — | 3.0 |
| 409 | M1 | A18 | TiN | 4.8 | — | — | — | — | — | 3.1 |
| 410 | M1 | A18 | — | — | — | — | — | — | — | 3.0 |
| 411 | M1 | A18 | TiN | 0.08 | — | — | — | — | — | 3.0 |
| 412 | M1 | A18 | TiN | 11.0 | — | — | — | — | — | 3.0 |
| 413 | M1 | A18 | TiN | 0.5 | — | — | — | — | — | 1.5 |
| 414 | M1 | A18 | TiN | 0.5 | — | — | — | — | — | 4.0 |
| 415 | M1 | A18 | TiN | 0.5 | — | — | — | — | — | 8.0 |
| 416 | M1 | A18 | TiN | 0.5 | — | — | — | — | — | 11.2 |
| 417 | M1 | A18 | TiN | 0.12 | — | — | — | — | p1 | 2.9 |
| 418 | M1 | A18 | TiN | 0.5 | — | — | — | — | p1 | 2.9 |
| 419 | M1 | A18 | TiN | 2.8 | — | — | — | — | p1 | 3.1 |
| 420 | M1 | A18 | TiN | 4.8 | — | — | — | — | p1 | 3.0 |
| 421 | M1 | A18 | — | — | — | — | — | — | p1 | 3.0 |
| 422 | M1 | A18 | TiN | 0.08 | — | — | — | — | p1 | 3.0 |
| 423 | M1 | A18 | TiN | 11.0 | — | — | — | — | p1 | 3.0 |
| 424 | M1 | A18 | TiN | 0.12 | — | — | s3 | — | p1 | 3.0 |
| 425 | M1 | A18 | TiN | 0.5 | — | — | s3 | — | p1 | 3.0 |
| 426 | M1 | A18 | TiN | 2.8 | — | — | s3 | — | p1 | 3.1 |
| 427 | M1 | A18 | TiN | 4.8 | — | — | S3 | — | p1 | 3.0 |
| 428 | M1 | A18 | — | — | — | — | s3 | — | p1 | 3.0 |
| 429 | M1 | A18 | TiN | 0.08 | — | — | s3 | — | p1 | 2.9 |
| 430 | M1 | A18 | TiN | 11.0 | — | — | s3 | — | p1 | 3.0 |
| 431 | M1 | A18 | TiN | 0.12 | — | — | — | i1 | p1 | 3.0 |
| 432 | M1 | A18 | TiN | 0.5 | — | — | — | i1 | p1 | 3.1 |
| 433 | M1 | A18 | TiN | 2.8 | — | — | — | i1 | p1 | 3.0 |
| 434 | M1 | A18 | TiN | 4.8 | — | — | — | i1 | p1 | 3.0 |
| 435 | M1 | A18 | — | — | — | — | — | i1 | p1 | 3.1 |
| 436 | M1 | A18 | TiN | 0.08 | — | — | — | i1 | p1 | 3.1 |
| 437 | M1 | A18 | TiN | 11.0 | — | — | — | i1 | p1 | 3.0 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 406 | 2 | 1 | 4 | 3 | 4 | Comp. ex. |
| 407 | 2 | 1 | 4 | 3 | 3 | Comp. ex. |
| 408 | 2 | 1 | 4 | 3 | 2 | Comp. ex. |
| 409 | 2 | 2 | 4 | 2 | 1 | Comp. ex. |
| 410 | Unweldable | 1 | 4 | 3 | 6 | Comp. ex. (no ceramic particles) |
| 411 | 1 | 1 | 4 | 3 | 4 | Comp. ex. |
| 412 | 3 | 4 | 3 | 1 | 1 | Comp. ex. |
| 413 | 2 | 1 | 4 | 3 | 3 | Comp. ex. |
| 414 | 2 | 1 | 4 | 3 | 3 | Comp. ex. |
| 415 | 1 | 1 | 4 | 3 | 3 | Comp. ex. |
| 416 | 1 | 1 | 4 | 4 | 3 | Comp. ex. |
| 417 | 1 | 1 | 4 | 3 | 4 | Comp. ex. |
| 418 | 2 | 1 | 4 | 3 | 3 | Comp. ex. |
| 419 | 2 | 1 | 4 | 3 | 2 | Comp. ex. |
| 420 | 2 | 2 | 4 | 2 | 1 | Comp. ex. |
| 421 | Unweldable | 1 | 4 | 3 | 6 | Comp. ex. (no ceramic particles) |
| 422 | 2 | 1 | 4 | 3 | 4 | Comp. ex. |
| 423 | 3 | 4 | 2 | 1 | 1 | Comp. ex. |
| 424 | 1 | 1 | 5 | 4 | 4 | Comp. ex. |
| 425 | 1 | 1 | 5 | 4 | 3 | Comp. ex. |
| 426 | 2 | 1 | 5 | 4 | 2 | Comp. ex. |
| 427 | 2 | 2 | 5 | 2 | 1 | Comp. ex. |
| 428 | Unweldable | 1 | 5 | 4 | 6 | Comp. ex. (no ceramic particles) |
| 429 | 1 | 1 | 5 | 3 | 4 | Comp. ex. |

TABLE 10-continued

| | | | | | | |
|---|---|---|---|---|---|---|
| 430 | 4 | 3 | 3 | 1 | 1 | Comp. ex. |
| 431 | 1 | 1 | 5 | 4 | 4 | Comp. ex. |
| 432 | 1 | 1 | 5 | 4 | 3 | Comp. ex. |
| 433 | 2 | 1 | 5 | 4 | 2 | Comp. ex. |
| 434 | 2 | 2 | 5 | 2 | 1 | Comp. ex. |
| 435 | Unweldable | 1 | 5 | 3 | 6 | Comp. ex. (no ceramic particles) |
| 436 | 1 | 1 | 5 | 3 | 4 | Comp. ex. |
| 437 | 3 | 4 | 4 | 1 | 1 | Comp. ex. |

TABLE 11

| Precoated metal sheet no. | Metal sheet | Resin (A1) | Ceramic particles Type | Ceramic particles Content (vol %) | Curing agent (C) Type | Curing agent (C) Content (mass %) | Silane coupling agent | Rust preventive agent | Coloring pigment | Coating film thickness (μm) |
|---|---|---|---|---|---|---|---|---|---|---|
| 438 | M1 | A19 | TiN | 0.12 | — | — | — | — | — | 3.0 |
| 439 | M1 | A19 | TiN | 0.5 | — | — | — | — | — | 3.0 |
| 440 | M1 | A19 | TiN | 0.9 | — | — | — | — | — | 3.0 |
| 441 | M1 | A19 | TiN | 2.8 | — | — | — | — | — | 3.1 |
| 442 | M1 | A19 | TiN | 4.8 | — | — | — | — | — | 3.1 |
| 443 | M1 | A19 | TiN | 9.5 | — | — | — | — | — | 3.1 |
| 444 | M1 | A19 | — | — | — | — | — | — | — | 3.0 |
| 445 | M1 | A19 | TiN | 0.08 | — | — | — | — | — | 2.8 |
| 446 | M1 | A19 | TiN | 11.0 | — | — | — | — | — | 3.0 |
| 447 | M1 | A19 | TiN | 0.12 | — | — | — | — | p1 | 3.0 |
| 448 | M1 | A19 | TiN | 0.5 | — | — | — | — | p1 | 3.1 |
| 449 | M1 | A19 | TiN | 0.9 | — | — | — | — | p1 | 3.0 |
| 450 | M1 | A19 | TiN | 2.8 | — | — | — | — | p1 | 3.1 |
| 451 | M1 | A19 | TiN | 4.8 | — | — | — | — | p1 | 2.9 |
| 452 | M1 | A19 | TiN | 9.5 | — | — | — | — | p1 | 2.9 |
| 453 | M1 | A19 | — | — | — | — | — | — | p1 | 3.1 |
| 454 | M1 | A19 | TiN | 0.08 | — | — | — | — | p1 | 3.0 |
| 455 | M1 | A19 | TiN | 11.0 | — | — | — | — | p1 | 3.0 |
| 456 | M1 | A19 | TiN | 0.12 | C1 | 15 | — | — | p1 | 3.0 |
| 457 | M1 | A19 | TiN | 0.5 | C1 | 15 | — | — | p1 | 3.1 |
| 458 | M1 | A19 | TiN | 2.8 | C1 | 15 | — | — | p1 | 3.0 |
| 459 | M1 | A19 | TiN | 4.8 | C1 | 15 | — | — | p1 | 2.9 |
| 460 | M1 | A19 | — | — | C1 | 15 | — | — | p1 | 3.1 |
| 461 | M1 | A19 | TiN | 0.08 | C1 | 15 | — | — | p1 | 3.0 |
| 462 | M1 | A19 | TiN | 11.0 | C1 | 15 | — | — | p1 | 3.0 |
| 463 | M1 | A19 | TiN | 0.5 | C1 | 40 | — | — | p1 | 3.0 |
| 464 | M1 | A19 | TiN | 0.12 | — | — | s1 | — | p1 | 3.1 |
| 465 | M1 | A19 | TiN | 0.5 | — | — | s1 | — | p1 | 3.0 |
| 466 | M1 | A19 | TiN | 0.12 | — | — | s2 | — | p1 | 3.0 |
| 467 | M1 | A19 | TiN | 0.5 | — | — | s2 | — | p1 | 3.1 |
| 468 | M1 | A19 | TiN | 0.12 | — | — | — | i2 | p1 | 3.1 |
| 469 | M1 | A19 | TiN | 0.12 | — | — | — | i3 | p1 | 3.0 |
| 470 | M1 | A19 | TaN | 0.12 | — | — | — | — | — | 3.1 |
| 471 | M1 | A19 | TaN | 0.5 | — | — | — | — | — | 3.1 |
| 472 | M1 | A19 | TaN | 2.8 | — | — | — | — | — | 3.0 |
| 473 | M1 | A19 | TaN | 4.8 | — | — | — | — | — | 2.8 |
| 474 | M1 | A19 | TaN | 9.5 | — | — | — | — | — | 3.0 |
| 475 | M1 | A19 | TaN | 0.08 | — | — | — | — | — | 3.0 |
| 476 | M1 | A19 | TaN | 11.0 | — | — | — | — | — | 3.0 |
| 477 | M1 | A19 | TaN | 0.12 | — | — | — | — | p1 | 3.1 |
| 478 | M1 | A19 | TaN | 0.5 | — | — | — | — | p1 | 3.0 |
| 479 | M1 | A19 | TaN | 2.8 | — | — | — | — | p1 | 3.1 |
| 480 | M1 | A19 | TaN | 4.8 | — | — | — | — | p1 | 2.9 |
| 481 | M1 | A19 | TaN | 9.5 | — | — | — | — | p1 | 3.1 |
| 482 | M1 | A19 | TaN | 0.08 | — | — | — | — | p1 | 2.8 |
| 483 | M1 | A19 | TaN | 11.0 | — | — | — | — | p1 | 2.9 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 438 | 3 | 4 | 6 | 5 | 6 | Inv. ex. |
| 439 | 4 | 6 | 6 | 5 | 5 | Inv. ex. |
| 440 | 4 | 6 | 6 | 5 | 5 | Inv. ex. |
| 441 | 4 | 6 | 5 | 5 | 4 | Inv. ex. |
| 442 | 4 | 6 | 5 | 4 | 3 | Inv. ex. |
| 443 | 4 | 6 | 5 | 4 | 3 | Inv. ex. |
| 444 | Unweldable | 1 | 6 | 5 | 6 | Comp. ex. (no ceramic particles) |

TABLE 11-continued

| | | | | | | |
|---|---|---|---|---|---|---|
| 445 | 2 | 2 | 6 | 5 | 6 | Comp. ex. |
| 446 | 4 | 6 | 3 | 1 | 1 | Comp. ex. |
| 447 | 3 | 4 | 6 | 5 | 6 | Inv. ex. |
| 448 | 4 | 6 | 6 | 5 | 5 | Inv. ex. |
| 449 | 4 | 6 | 6 | 5 | 5 | Inv. ex. |
| 450 | 4 | 6 | 6 | 5 | 4 | Inv. ex. |
| 451 | 4 | 6 | 5 | 4 | 3 | Inv. ex. |
| 452 | 4 | 6 | 3 | 2 | 3 | Inv. ex. |
| 453 | Unweldable | 1 | 6 | 5 | 6 | Comp. ex. (no ceramic particles) |
| 454 | 2 | 2 | 6 | 5 | 6 | Comp. ex. |
| 455 | 4 | 6 | 2 | 1 | 1 | Comp. ex. |
| 456 | 3 | 4 | 6 | 6 | 6 | Inv. ex. |
| 457 | 4 | 6 | 6 | 6 | 5 | Inv. ex. |
| 458 | 4 | 6 | 6 | 6 | 4 | Inv. ex. |
| 459 | 4 | 6 | 6 | 5 | 3 | Inv. ex. |
| 460 | Unweldable | 1 | 6 | 6 | 6 | Comp. ex. (no ceramic particles) |
| 461 | 2 | 2 | 6 | 6 | 6 | Comp. ex. |
| 462 | 4 | 6 | 4 | 1 | 1 | Comp. ex. |
| 463 | 4 | 6 | 5 | 4 | 5 | Inv. ex. |
| 464 | 3 | 4 | 6 | 6 | 6 | Inv. ex. |
| 465 | 4 | 6 | 6 | 6 | 6 | Inv. ex. |
| 466 | 3 | 4 | 6 | 6 | 6 | Inv. ex. |
| 467 | 4 | 6 | 6 | 6 | 5 | Inv. ex. |
| 468 | 3 | 3 | 6 | 6 | 6 | Inv. ex. |
| 469 | 3 | 4 | 6 | 6 | 6 | Inv. ex. |
| 470 | 1 | 1 | 6 | 5 | 6 | Comp. ex. |
| 471 | 1 | 1 | 5 | 5 | 5 | Comp. ex. |
| 472 | 1 | 2 | 5 | 5 | 3 | Comp. ex. |
| 473 | 2 | 2 | 5 | 4 | 2 | Comp. ex. |
| 474 | 2 | 2 | 3 | 2 | 1 | Comp. ex. |
| 475 | 1 | 1 | 6 | 5 | 6 | Comp. ex. |
| 476 | 3 | 3 | 3 | 1 | 1 | Comp. ex. |
| 477 | 1 | 1 | 6 | 5 | 6 | Comp. ex. |
| 478 | 1 | 1 | 5 | 4 | 5 | Comp. ex. |
| 479 | 1 | 1 | 5 | 4 | 4 | Comp. ex. |
| 480 | 2 | 2 | 5 | 3 | 2 | Comp. ex. |
| 481 | 2 | 2 | 3 | 3 | 1 | Comp. ex. |
| 482 | 1 | 1 | 6 | 5 | 6 | Comp. ex. |
| 483 | 2 | 4 | 3 | 1 | 1 | Comp. ex. |

TABLE 12

| Precoated metal sheet no. | Metal sheet | Resin (A1) | Ceramic particles | | Curing agent (C) | | Silane coupling agent | Rust preventive agent | Coloring pigment | Coating film thickness (μm) |
|---|---|---|---|---|---|---|---|---|---|---|
| | | | Type | Content (vol %) | Type | Content (mass %) | | | | |
| 484 | M1 | A16/A19 mixture | TiN | 0.12 | — | — | — | — | — | 3.0 |
| 485 | M1 | A16/A19 mixture | TiN | 0.5 | — | — | — | — | — | 3.0 |
| 486 | M1 | A16/A19 mixture | TiN | 0.9 | — | — | — | — | — | 3.1 |
| 487 | M1 | A16/A19 mixture | TiN | 2.8 | — | — | — | — | — | 3.2 |
| 488 | M1 | A16/A19 mixture | TiN | 4.8 | — | — | — | — | — | 3.0 |
| 489 | M1 | A16/A19 mixture | TiN | 9.5 | — | — | — | — | — | 2.9 |
| 490 | M1 | A16/A19 mixture | — | — | — | — | — | — | — | 3.0 |
| 491 | M1 | A16/A19 mixture | TiN | 0.08 | — | — | — | — | — | 2.9 |
| 492 | M1 | A16/A19 mixture | TiN | 11.0 | — | — | — | — | — | 3.2 |
| 493 | M1 | A16/A19 mixture | TiN | 0.12 | — | — | — | — | p1 | 3.0 |
| 494 | M1 | A16/A19 mixture | TiN | 0.5 | — | — | — | — | p1 | 3.1 |
| 495 | M1 | A16/A19 mixture | TiN | 0.9 | — | — | — | — | p1 | 3.0 |
| 496 | M1 | A16/A19 mixture | TiN | 2.8 | — | — | — | — | p1 | 3.1 |
| 497 | M1 | A16/A19 mixture | TiN | 4.8 | — | — | — | — | p1 | 2.9 |
| 498 | M1 | A16/A19 mixture | TiN | 9.5 | — | — | — | — | p1 | 2.9 |
| 499 | M1 | A16/A19 mixture | — | — | — | — | — | — | p1 | 3.1 |
| 500 | M1 | A16/A19 mixture | TiN | 0.08 | — | — | — | — | p1 | 3.0 |
| 501 | M1 | A16/A19 mixture | TiN | 11.0 | — | — | — | — | p1 | 3.0 |
| 502 | M1 | A16/A19 mixture | TiN | 0.12 | C1 | 15 | — | — | p1 | 3.0 |
| 503 | M1 | A16/A19 mixture | TiN | 0.5 | C1 | 15 | — | — | p1 | 3.1 |
| 504 | M1 | A16/A19 mixture | TiN | 2.8 | C1 | 15 | — | — | p1 | 3.0 |
| 505 | M1 | A16/A19 mixture | TiN | 4.8 | C1 | 15 | — | — | p1 | 2.9 |
| 506 | M1 | A16/A19 mixture | — | — | C1 | 15 | — | — | p1 | 3.1 |
| 507 | M1 | A16/A19 mixture | TiN | 0.08 | C1 | 15 | — | — | p1 | 3.0 |
| 508 | M1 | A16/A19 mixture | TiN | 11.0 | C1 | 15 | — | — | p1 | 3.0 |
| 509 | M1 | A16/A19 mixture | TiN | 0.5 | C1 | 40 | — | — | p1 | 3.0 |
| 510 | M1 | A16/A19 mixture | TiN | 0.12 | — | — | s1 | — | p1 | 3.1 |
| 511 | M1 | A16/A19 mixture | TiN | 0.5 | — | — | s1 | — | p1 | 3.0 |
| 512 | M1 | A16/A19 mixture | TiN | 0.12 | — | — | s2 | — | p1 | 3.0 |

TABLE 12-continued

| | | | | | | | | | | |
|---|---|---|---|---|---|---|---|---|---|---|
| 513 | M1 | A16/A19 mixture | TiN | 0.5 | — | — | s2 | — | p1 | 3.0 |
| 514 | M1 | A16/A19 mixture | TaN | 0.12 | — | — | — | — | — | 2.7 |
| 515 | M1 | A16/A19 mixture | TaN | 0.5 | — | — | — | — | — | 3.0 |
| 516 | M1 | A16/A19 mixture | TaN | 2.8 | — | — | — | — | — | 3.0 |
| 517 | M1 | A16/A19 mixture | TaN | 4.8 | — | — | — | — | — | 3.1 |
| 518 | M1 | A16/A19 mixture | TaN | 9.5 | — | — | — | — | — | 3.2 |
| 519 | M1 | A16/A19 mixture | TaN | 0.08 | — | — | — | — | — | 2.9 |
| 520 | M1 | A16/A19 mixture | TaN | 11.0 | — | — | — | — | — | 3.0 |
| 521 | M1 | A16/A19 mixture | TaN | 0.12 | — | — | — | — | p1 | 3.1 |
| 522 | M1 | A16/A19 mixture | TaN | 0.5 | — | — | — | — | p1 | 3.2 |
| 523 | M1 | A16/A19 mixture | TaN | 2.8 | — | — | — | — | p1 | 3.1 |
| 524 | M1 | A16/A19 mixture | TaN | 4.8 | — | — | — | — | p1 | 2.8 |
| 525 | M1 | A16/A19 mixture | TaN | 9.5 | — | — | — | — | p1 | 3.1 |
| 526 | M1 | A16/A19 mixture | TaN | 0.08 | — | — | — | — | p1 | 2.9 |
| 527 | M1 | A16/A19 mixture | TaN | 11.0 | — | — | — | — | p1 | 3.0 |

| Precoated metal sheet no. | Conductivity | | Corrosion resistance | | Coating film color change | Remarks |
|---|---|---|---|---|---|---|
| | Weldability | Groundability | Flat part | Worked part | | |
| 484 | 3 | 4 | 6 | 5 | 6 | Inv. ex. |
| 485 | 4 | 6 | 6 | 5 | 6 | Inv. ex. |
| 486 | 4 | 6 | 6 | 5 | 6 | Inv. ex. |
| 487 | 4 | 6 | 6 | 5 | 5 | Inv. ex. |
| 488 | 4 | 6 | 6 | 4 | 3 | Inv. ex. |
| 489 | 4 | 6 | 5 | 3 | 3 | Inv. ex. |
| 490 | Unweldable | 1 | 6 | 5 | 6 | Comp. ex. (no ceramic particles) |
| 491 | 2 | 2 | 6 | 5 | 6 | Comp. ex. |
| 492 | 4 | 6 | 3 | 1 | 2 | Comp. ex. |
| 493 | 3 | 4 | 6 | 5 | 6 | Inv. ex. |
| 494 | 4 | 6 | 6 | 5 | 5 | Inv. ex. |
| 495 | 4 | 6 | 6 | 5 | 5 | Inv. ex. |
| 496 | 4 | 6 | 5 | 5 | 4 | Inv. ex. |
| 497 | 4 | 6 | 5 | 4 | 3 | Inv. ex. |
| 498 | 4 | 6 | 3 | 2 | 3 | Inv. ex. |
| 499 | Unweldable | 1 | 6 | 5 | 6 | Comp. ex. (no ceramic particles) |
| 500 | 2 | 2 | 6 | 5 | 6 | Comp. ex. |
| 501 | 4 | 6 | 2 | 1 | 1 | Comp. ex. |
| 502 | 3 | 4 | 6 | 6 | 6 | Inv. ex. |
| 503 | 4 | 6 | 6 | 6 | 5 | Inv. ex. |
| 504 | 4 | 6 | 6 | 6 | 5 | Inv. ex. |
| 505 | 4 | 6 | 6 | 4 | 4 | Inv. ex. |
| 506 | Unweldable | 1 | 6 | 6 | 6 | Comp. ex. (no ceramic particles) |
| 507 | 2 | 2 | 6 | 6 | 6 | Comp. ex. |
| 508 | 4 | 6 | 3 | 1 | 2 | Comp. ex. |
| 509 | 4 | 6 | 6 | 5 | 5 | Inv. ex. |
| 510 | 3 | 5 | 6 | 6 | 6 | Inv. ex. |
| 511 | 4 | 6 | 6 | 6 | 6 | Inv. ex. |
| 512 | 3 | 4 | 6 | 6 | 6 | Inv. ex. |
| 513 | 4 | 6 | 6 | 5 | 5 | Inv. ex. |
| 514 | 1 | 1 | 6 | 5 | 6 | Comp. ex. |
| 515 | 1 | 2 | 5 | 5 | 5 | Comp. ex. |
| 516 | 2 | 2 | 5 | 4 | 3 | Comp. ex. |
| 517 | 2 | 2 | 5 | 4 | 2 | Comp. ex. |
| 518 | 2 | 2 | 3 | 2 | 1 | Comp. ex. |
| 519 | 1 | 1 | 6 | 5 | 6 | Comp. ex. |
| 520 | 4 | 3 | 3 | 1 | 1 | Comp. ex. |
| 521 | 1 | 1 | 6 | 5 | 6 | Comp. ex. |
| 522 | 1 | 1 | 5 | 4 | 5 | Comp. ex. |
| 523 | 1 | 1 | 5 | 3 | 4 | Comp. ex. |
| 524 | 2 | 2 | 4 | 3 | 2 | Comp. ex. |
| 525 | 2 | 2 | 3 | 2 | 1 | Comp. ex. |
| 526 | 1 | 1 | 6 | 5 | 6 | Comp. ex. |
| 527 | 2 | 4 | 2 | 1 | 1 | Comp. ex. |

TABLE 13

| Precoated metal sheet no. | Metal sheet | Resin (A1) | Ceramic particles | | Curing agent (C) | | Silane coupling agent | Rust preventive agent | Coloring pigment | Coating film thickness (μm) |
|---|---|---|---|---|---|---|---|---|---|---|
| | | | Type | Content (vol %) | Type | Content (mass %) | | | | |
| 528 | M2 | A11 | TiN | 0.12 | — | — | — | — | — | 3.1 |
| 529 | M2 | A11 | TiN | 0.5 | — | — | — | — | — | 3.0 |

TABLE 13-continued

| | | | | | | | | | | |
|---|---|---|---|---|---|---|---|---|---|---|
| 530 | M2 | A11 | TiN | 0.9 | — | — | — | — | — | 3.0 |
| 531 | M2 | A11 | TiN | 2.8 | — | — | — | — | — | 3.2 |
| 532 | M2 | A11 | TiN | 4.8 | — | — | — | — | — | 3.0 |
| 533 | M2 | A11 | TiN | 9.5 | — | — | — | — | — | 3.0 |
| 534 | M2 | A11 | — | — | — | — | — | — | — | 2.9 |
| 535 | M2 | A11 | TiN | 0.08 | — | — | — | — | — | 2.9 |
| 536 | M2 | A11 | TiN | 11.0 | — | — | — | — | — | 3.0 |
| 537 | M3 | A11 | TiN | 0.12 | — | — | — | — | — | 2.9 |
| 538 | M3 | A11 | TiN | 0.5 | — | — | — | — | — | 2.9 |
| 539 | M3 | A11 | TiN | 0.9 | — | — | — | — | — | 3.0 |
| 540 | M3 | A11 | TiN | 2.8 | — | — | — | — | — | 3.1 |
| 541 | M3 | A11 | TiN | 4.8 | — | — | — | — | — | 3.2 |
| 542 | M3 | A11 | TiN | 9.5 | — | — | — | — | — | 3.0 |
| 543 | M3 | A11 | — | — | — | — | — | — | — | 3.0 |
| 544 | M3 | A11 | TiN | 0.08 | — | — | — | — | — | 3.1 |
| 545 | M3 | A11 | TiN | 11.0 | — | — | — | — | — | 2.9 |
| 546 | M4 | A11 | TiN | 0.12 | — | — | — | — | — | 3.0 |
| 547 | M4 | A11 | TiN | 0.5 | — | — | — | — | — | 3.1 |
| 548 | M4 | A11 | TiN | 0.9 | — | — | — | — | — | 2.9 |
| 549 | M4 | A11 | TiN | 2.8 | — | — | — | — | — | 2.8 |
| 550 | M4 | A11 | TiN | 4.8 | — | — | — | — | — | 2.9 |
| 551 | M4 | A11 | TiN | 9.5 | — | — | — | — | — | 3.0 |
| 552 | M4 | A11 | — | — | — | — | — | — | — | 3.0 |
| 553 | M4 | A11 | TiN | 0.08 | — | — | — | — | — | 3.1 |
| 554 | M4 | A11 | TiN | 11.0 | — | — | — | — | — | 2.9 |

| Precoated metal sheet no. | Conductivity Weldability | Conductivity Groundability | Corrosion resistance Flat part | Corrosion resistance Worked part | Coating film color change | Remarks |
|---|---|---|---|---|---|---|
| 528 | 4 | 4 | 6 | 4 | 6 | Inv. ex. |
| 529 | 4 | 5 | 6 | 4 | 5 | Inv. ex. |
| 530 | 4 | 6 | 5 | 4 | 5 | Inv. ex. |
| 531 | 4 | 6 | 5 | 4 | 4 | Inv. ex. |
| 532 | 4 | 6 | 4 | 3 | 3 | Inv. ex. |
| 533 | 4 | 6 | 3 | 3 | 2 | Inv. ex. |
| 534 | Unweldable | 1 | 6 | 4 | 6 | Comp. ex. (no ceramic particles) |
| 535 | 2 | 2 | 6 | 4 | 6 | Comp. ex. |
| 536 | 4 | 6 | 2 | 2 | 1 | Comp. ex. |
| 537 | 4 | 4 | 6 | 4 | 6 | Inv. ex. |
| 538 | 4 | 5 | 6 | 4 | 5 | Inv. ex. |
| 539 | 4 | 5 | 6 | 4 | 5 | Inv. ex. |
| 540 | 4 | 6 | 5 | 4 | 4 | Inv. ex. |
| 541 | 4 | 6 | 4 | 3 | 3 | Inv. ex. |
| 542 | 4 | 6 | 3 | 3 | 2 | Inv. ex. |
| 543 | Unweldable | 1 | 6 | 4 | 6 | Comp. ex. (no ceramic particles) |
| 544 | 2 | 2 | 6 | 4 | 6 | Comp. ex. |
| 545 | 4 | 6 | 2 | 2 | 1 | Comp. ex. |
| 546 | 4 | 4 | 6 | 5 | 6 | Inv. ex. |
| 547 | 4 | 5 | 6 | 5 | 5 | Inv. ex. |
| 548 | 4 | 5 | 6 | 5 | 5 | Inv. ex. |
| 549 | 4 | 6 | 5 | 5 | 4 | Inv. ex. |
| 550 | 4 | 6 | 4 | 4 | 3 | Inv. ex. |
| 551 | 4 | 6 | 3 | 3 | 2 | Inv. ex. |
| 552 | Unweldable | 1 | 6 | 5 | 6 | Comp. ex. (no ceramic particles) |
| 553 | 2 | 2 | 6 | 5 | 6 | Comp. ex. |
| 554 | 4 | 6 | 3 | 2 | 1 | Comp. ex. |

In the precoated metal sheets of the invention examples, regardless of the types of the metal sheet, resin (A1), and non-oxide ceramic particles (B), excellent conductivity and corrosion resistance can both be realized. Furthermore, in the precoated metal sheets of the invention examples, regardless of the coating film not containing a coloring pigment (clear coating) or containing a coloring pigment (color coating), it is learned that the color of the non-oxide ceramic particles (B) has little detrimental effect on the coating film color and the non-oxide ceramic particles do not hinder the aesthetic design of the coating film much at all. Such an effect arises since the specific non-oxide ceramic particles (B) for maintaining excellent conductivity are blended into the coating film in only a small amount.

If referring to the group of the carboxyl groups and sulfonic acid groups as the "Group 1" and the group of the ester groups, urethane groups, and urea groups as the "Group 2", in the resins (A1) which are used in the examples, the resins A11 (carboxyl group-containing polyester-based urethane resin), A12 (sulfonic acid group-containing polyester-based urethane resin), A16 (carboxyl group- and urea group-containing polyurethane resin), and A19 (sulfonic acid group-containing polyester resin) include large amounts of both functional groups selected from the Group 1 and functional groups selected from the Group 2 in the resin structures. Further, in the resins (A1), the resin A13 (carboxyl group-containing polyester resin into which hydroxyl groups are introduced) includes sufficient functional groups selected from the Group 2, but are reduced in number of carboxyl groups by the amount of the hydroxyl groups which are introduced into the structure. Therefore, only a small number of functional groups selected from the Group 1 are included. Among the resins (A1), the resin A17 (acryl resin) only contains functional groups selected from the Group 1.

On the other hand, the resin A15 (nonionic polyether-based urethane resin) only contains functional groups selected from the Group 2, while the resin A18 (amino group-containing epoxy resin) does not include functional groups of either the Group 1 and Group 2. Neither are resins (A1) of the present invention. Reflecting such features of the resin structure, coating films which are comprised of the resins A11, A12, A16, and A19 which contain functional groups of both the Group 1 and the Group 2 in large numbers tend to have corrosion resistances which are considerably better than coating films which are not so, for example, a coating film which is comprised of the resin A18 which does not contain either the Group 1 and Group 2.

The reason is, as explained in the section on <Organic Resin (A)>, if the resin structure contains carboxyl groups or sulfonic acid groups, the adhesion with the substrate metal sheet (in the case of priming, the primed layer) is improved and there is the effect of improving the corrosion resistance. In addition, if the structure contains groups which have a relatively high cohesive energy such as ester groups, urethane groups, and urea groups, the adhesion and blocking of corrosive factors (denseness of coating) are improved and there is the effect of further improving the corrosion resistance.

Further, the coating films which are comprised of A11, A12, A16, A19, or A16 and A19 in a mixed resin which contain large amounts of carboxyl groups or sulfonic acid groups in the resin structure are improved in conductivity over coating films comprised of A15 or A18 which do not contain these functional groups. Further, the color of the non-oxide ceramic particles (B) has little detrimental effect on the coating film color and does little to obstruct the design of the appearance of the coating film. As stated in the section on <Organic Resin (A)>, carboxyl groups and sulfonic acid groups are adsorbed on the surfaces of the polar non-oxide ceramic particles (B) and have the effect of preventing agglomeration of the non-oxide ceramic particles (B) with each other and of maintaining the dispersability. For this reason, the particles (B) which are uniformly dispersed in the coating film give rise to good coating film conductivity (weldability and groundability) and simultaneously do little in the way of causing uneven color or streaks etc. in the coating film surface and as a result appear to suppress notable changes in color.

When blending into the precoating-use composition a curing agent (C), silane coupling agent, and rust preventive agent, compared to when not, the corrosion resistance tends to improve.

When using particles of a non-oxide ceramic with an electrical resistivity of over $185 \times 10^{-6}$ Ωcm (TaN, BN), the obtained precoated metal sheet does not have the desired conductivity.

When the volume ratio of the resin (A1) and the non-oxide ceramic particles (B) is outside the range of the present invention, the conductivity and corrosion resistance cannot both be realized. In particular, when the non-oxide ceramic particles (B) are too great (when the volume ratio of (B) to the total weight of the resin (A1) and non-oxide ceramic particles (B) is over 10 vol %), the desired conductivity is obtained, but the color of the non-oxide ceramic particles (B) easily have a detrimental effect on the coating film color.

When the coating film thickness is less than the preferable thickness range, the corrosion resistance tends to be low, while when it is greater than it, the conductivity tends to fall.

INDUSTRIAL APPLICABILITY

As explained above, according to the present invention, a precoated metal sheet which is excellent in coating film conductivity (groundability and weldability) and corrosion resistance is obtained. Further, this precoated metal sheet has only a small amount of non-oxide ceramic particles which are required for securing conductivity contained in the coating film, so the coloring ability of the coating film by a coloring pigment is excellent and the non-oxide ceramic particles do not hinder the design of the appearance of the coating film. For this reason, for example, it is possible to provide a material more inexpensively than conventional precoated metal sheet for applications such as parts for indoor home electrical appliances, interior building materials, etc. where groundability, weldability, and corrosion resistance are necessary and the aesthetic design is also important.

The invention claimed is:

1. A conductive, corrosion resistant precoated metal sheet comprising a metal sheet, on at least one surface of which is formed a coating film (α) which contains an organic resin (A) and non-oxide ceramic particles (B) with a 25° C. electrical resistivity of $0.1 \times 10^{-6}$ to $185 \times 10^{-6}$ Ωcm selected from borides, nitrides, and silicides, a volume ratio of the organic resin (A) and the non-oxide ceramic particles (B) in said coating film (α) at 25° C. being 90:10 to 99.9:0.1, said organic resin (A) including a derivative (A2) of a resin (A1) which includes at least one type of functional group selected from a carboxyl group and sulfonic acid group in a structure of the resin (A1), wherein said derivative (A2) of the resin (A1) is a resin ($A2_{Si}$) of the following general formula (I):

General formula (I)

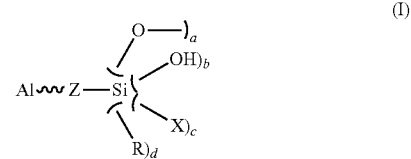

wherein "A1" represents a resin (A1) "Z—" represents a $C_1$ to $C_9$, $N_0$ to $N_2$, $O_0$ to $O_2$ hydrocarbon chain, and the notation "A1~Z" represents a covalent bond of "A1" and "Z" through functional groups of the two; and wherein "—O—" is an ether bond, "—OH" is a hydroxyl group, and "—X" is a $C_1$ to $C_3$ hydrolysable alkoxy group, hydrolysable halogen group, or hydrolysable acetoxy group, "—R" is a $C_1$ to $C_3$ alkyl group, "a", "b", "c", and "d," which represent the numbers of substituents, are all integers of 0 to 3, and a+b+c+d=3.

2. The conductive, corrosion resistant precoated metal sheet as set forth in claim 1 characterized in that said non-oxide ceramic particles (B) have a 25° C. electrical resistivity of $0.1 \times 10^{-6}$ to $100 \times 10^{-6}$ Ωcm.

3. The conductive, corrosion resistant precoated metal sheet as set forth in claim 1 characterized in that said coating film (α) has a thickness of 2 to 10 μm.

4. The conductive, corrosion resistant precoated metal sheet as set forth in claim 1 characterized in that said resin (A1) or derivative (A2) of said resin (A1) further includes at least one type of functional group selected from an ester group, urethane group, and urea group in the structure of the resin (A1) or the derivative (A2).

5. The conductive, corrosion resistant precoated metal sheet as set forth in claim 4 characterized in that said resin (A1) is a polyurethane resin (Alu) which includes a urea group in the structure of the polyurethane resin (Alu).

6. The conductive, corrosion resistant precoated metal sheet as set forth in claim 5 characterized in that said resin (A1) is a mixed resin of a polyurethane resin (Alu) which includes a urea group in the structure of the polyurethane resin (Alu) and a polyester resin (Ale) which includes an aromatic dicarboxylic acid as a carboxylic acid component and includes a sulfonic acid group in the structure of the polyester resin (Ale).

7. The conductive, corrosion resistant precoated metal sheet as set forth in claim 1 characterized in that said organic resin (A) is a resin which is cured by a curing agent (C).

8. The conductive, corrosion resistant precoated metal sheet as set forth in claim 7 characterized in that said curing agent (C) contains a melamine resin (C1).

9. The conductive, corrosion resistant precoated metal sheet as set forth in claim 1 characterized in that said non-oxide ceramic particles (B) are a boride ceramic $Mo_2B$, $MoB$, $MoB_2$, $NbB$, $NbB_2$, $TaB$, $TaB_2$, $TiB$, $TiB_2$, $VB$, $VB_2$, $W_2Bs$, or $ZrB_2$; a nitride ceramic $Mo_2N$, $Nb_2N$, $NbN$, $Ta_2N$, $TiN$, or $ZrN$; a silicide ceramic $Mo_3Si$, $MoSi_2$, $NbSi_2$, $Ta_2Si$, $TaSi_2$, $TiSi$, $TiSi_2$, $V_5Si_3$, $VSi_2$, $W_3Si$, $WSi_2$, $ZrSi$, or $ZrSi_2$; or a mixture of two or more types selected from these.

10. The conductive, corrosion resistant precoated metal sheet as set forth in claim 2 characterized in that said coating film ($\alpha$) has a thickness of 2 to 10 μm.

11. The conductive, corrosion resistant precoated metal sheet as set forth in claim 2 characterized in that said resin (A1) or derivative (A2) of said resin (A1) further includes at least one type of functional group selected from an ester group, urethane group, and urea group in the structure of the resin (A1) or the derivative (A2).

12. The conductive, corrosion resistant precoated metal sheet as set forth in claim 11 characterized in that said resin (A1) is a polyurethane resin (Alu) which includes a urea group in the structure of the polyurethane resin (Alu).

13. The conductive, corrosion resistant precoated metal sheet as set forth in claim 12 characterized in that said resin (A1) is a mixed resin of a polyurethane resin (Alu) which includes a urea group in the structure of the polyurethane resin (Alu) and a polyester resin (Ale) which includes an aromatic dicarboxylic acid as a carboxylic acid component and includes a sulfonic acid group in the structure of the polyester resin (Ale).

14. The conductive, corrosion resistant precoated metal sheet as set forth in claim 2 characterized in that said organic resin (A) is a resin which is cured by a curing agent (C).

15. The conductive, corrosion resistant precoated metal sheet as set forth in claim 14 characterized in that said curing agent (C) contains a melamine resin (C1).

16. The conductive, corrosion resistant precoated metal sheet as set forth in claim 2 characterized in that said non-oxide ceramic particles (B) are a boride ceramic $Mo_2B$, $MoB$, $MoB_2$, $NbB$, $NbB_2$, $TaB$, $TaB_2$, $TiB$, $TiB_2$, $VB$, $VB_2$, $W_2B_5$, or $ZrB_2$; a nitride ceramic $Mo_2N$, $Nb_2N$, $NbN$, $Ta_2N$, $TiN$, or $ZrN$; a silicide ceramic $Mo_3Si$, $MoSi_2$, $NbSi_2$, $Ta_2Si$, $TaSi_2$, $TiSi$, $TiSi_2$, $V_5Si_3$, $VSi_2$, $W_3Si$, $WSi_2$, $ZrSi$, or $ZrSi_2$; or a mixture of two or more types selected from these.

* * * * *